United States Patent
Cirik et al.

(10) Patent No.: US 11,095,419 B2
(45) Date of Patent: Aug. 17, 2021

(54) SIMULTANEOUS BANDWIDTH PARTS SWITCHING

(71) Applicants: Ali Cagatay Cirik, Herndon, VA (US); Esmael Dinan, McLean, VA (US); Hua Zhou, Herndon, VA (US); Hyoungsuk Jeon, Centreville, VA (US); Alireza Babaei, Fairfax, VA (US); Kyungmin Park, Vienna, VA (US); Kai Xu, Herndon, VA (US)

(72) Inventors: Ali Cagatay Cirik, Herndon, VA (US); Esmael Dinan, McLean, VA (US); Hua Zhou, Herndon, VA (US); Hyoungsuk Jeon, Centreville, VA (US); Alireza Babaei, Fairfax, VA (US); Kyungmin Park, Vienna, VA (US); Kai Xu, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 26 days.

(21) Appl. No.: 16/732,576

(22) Filed: Jan. 2, 2020

(65) Prior Publication Data
US 2020/0213067 A1     Jul. 2, 2020

Related U.S. Application Data

(60) Provisional application No. 62/787,592, filed on Jan. 2, 2019.

(51) Int. Cl.
*H04L 5/00* (2006.01)
*H04W 76/27* (2018.01)
(Continued)

(52) U.S. Cl.
CPC .......... *H04L 5/0092* (2013.01); *H04L 1/0026* (2013.01); *H04L 1/1678* (2013.01);
(Continued)

(58) Field of Classification Search
CPC .......... H04W 72/042; H04W 72/0453; H04W 74/006; H04W 76/27; H04W 76/28; H04L 5/001; H04L 5/0096; H04L 5/0098
See application file for complete search history.

(56) References Cited

U.S. PATENT DOCUMENTS

2019/0254056 A1*   8/2019   Salah .................. H04W 72/042
2019/0357085 A1*   11/2019   Chervyakov ....... H04W 72/042
(Continued)

OTHER PUBLICATIONS

3GPP TSG RAN WG1 Meeting #95 R1-1814380; Spokane, USA, Nov. 12-16, 2018; Title: CR to 38.213 capturing the RAN1#94bis and RAN1#95 meeting agreements; Work item code: NR_newRAT-Core Date: Nov. 21, 2018; Release: Rel-15.
(Continued)

*Primary Examiner* — Pao Sinkantarakorn
(74) *Attorney, Agent, or Firm* — Jacob Mangan; Kavon Nasabzadeh; Philip R. Smith

(57) ABSTRACT

A wireless device receives one or more first radio resource control (RRC) messages. The first RRC messages comprise one or more configuration parameters of a first cell and a second cell. A second RRC message is received. The second RRC message indicates a first change of a first active bandwidth part (BWP) of the first cell. Processing of the second RRC message is completed. A determination is made that the completing occurs during a time duration of a second change of a second active BWP of the second cell. Based on the determining, the first change of the first active BWP is delayed until the second change of the second active BWP is completed.

20 Claims, 28 Drawing Sheets

(51) Int. Cl.
    *H04W 72/14* (2009.01)
    *H04W 76/28* (2018.01)
    *H04L 1/18* (2006.01)
    *H04W 72/04* (2009.01)
    *H04W 74/08* (2009.01)
    *H04L 1/00* (2006.01)
    *H04L 25/02* (2006.01)
    *H04L 1/16* (2006.01)

(52) U.S. Cl.
    CPC .......... *H04L 1/1819* (2013.01); *H04L 5/0051* (2013.01); *H04L 5/0098* (2013.01); *H04L 25/0226* (2013.01); *H04W 72/0453* (2013.01); *H04W 72/14* (2013.01); *H04W 74/0833* (2013.01); *H04W 76/27* (2018.02); *H04W 76/28* (2018.02)

(56) References Cited

U.S. PATENT DOCUMENTS

2020/0107308 A1* 4/2020 Liao .................... H04W 72/042
2020/0213066 A1* 7/2020 Ma .................... H04W 72/0453

OTHER PUBLICATIONS

3GPP TSG RAN WG1 Meeting #95 R1-1814400; Spokane, USA, Nov. 12-16, 2018; CR-Form-v11.2; Change Request; 38.212 CR 0005 rev 3 Current version: 15.3.0; Title: Combined CR of all essential corrections to 38.212 from RAN1#94bis and RAN1#95; Source to WG: Huawei; Source to TSG: R1; Work item code: NR_newRAT-Core Date: Nov. 18, 2018; Release: Rel-15.
3GPP TS 38.213 V15.3.0 (Sep. 2018); 3rd Generation Partnership Project; Technical Specification Group Radio Access Network; NR; Physical layer procedures for control; (Release 15).
3GPP TSG-RAN1 Meeting #95 R1-1814395; Spokane, USA, Nov. 12-16, 2018; CR-Form-v11.2; Change Request; 38.214 CR 0006 rev 2 Current version: 15.3.0; Title: Combined CR of all essential corrections to 38.214 from RAN1#94bis and RAN1#95; Source to WG: Nokia; Source to TSG: R1; Work item code: NR_newRAT-Core Date: Nov. 30, 2018; Release: Rel-15.
3GPP TS 38.214 V15.3.0 (Sep. 2018); 3rd Generation Partnership Project; Technical Specification Group Radio Access Network; NR; Physical layer procedures for data; (Release 15).
3GPP TS 38.321 V15.3.0 (Sep. 2018); 3rd Generation Partnership Project; Technical Specification Group Radio Access Network; NR; Medium Access Control (MAC) protocol specification; (Release 15).
3GPP TS 38.331 V15.3.0 (Sep. 2018); 3rd Generation Partnership Project; Technical Specification Group Radio Access Network; NR; Radio Resource Control (RRC) protocol specification; (Release 15).
3GPP TSG-RAN WG2 Meeting #104 R2-1818749; Spokane, WA USA, Nov. 12-16, 2018; Title: Miscellaneous corrections; Source to WG: Samsung; Source to TSG: RAN2; Work item code: NR_newRAT-Core Date: Nov. 15, 2018; Release: Rel-15.
3GPP TSG RAN WG1 Meeting #94bis R1-1810342; Chengdu, China, Oct. 8-12, 2018; Agenda item: 7.1.3.4; Source: ZTE; Title: Remaining issues on BWP; Document for: Discussion/Decision.
3GPP TSG RAN WG1 Meeting #94bis R1-1810467; Chengdu, China, Oct. 8-12, 2018; Agenda Item: 7.1.3.4; Source: MediaTek Inc.; Title: Remaining Issues on Bandwidth Part in R15 NR; Document for: Discussion.
3GPP TSG RAN WG1 Meeting #94bis R1-1811893; Chengdu, China, Oct. 8-12, 2018; Agenda Item: 7.1.3.4; Source: MediaTek Inc.; Title: Summary of Bandwidth Part Remaining Issues; Document for: Discussion.
3GPP TSG RAN WG1 Meeting #95 R1-1812341; Spokane, USA, Nov. 12-16, 2018; Agenda Item: 7.1.3.4; Source: MediaTek Inc.; Title: Remaining Issues on Bandwidth Part in R15 NR; Document for: Discussion.
3GPP TSG-RAN WG1 Meeting #95 R1-1812473; Spokane, USA Nov. 12-16, 2018; Source: Intel Corporation; Title: Remaining issues for carrier aggregation and bandwidth parts; Agenda item: 7.1.3.4; Document for: Discussion and Decision.
3GPP TSG RAN WG1 Meeting #95 R1-1812962; Spokane, USA, Nov. 12-16, 2018; Title: Clarification on BWP switching; Source to WG: Samsung; Source to TSG: R1; Work item code: NR_newRAT-Core Date: Nov. 2, 2018; Category: F; Release: Rel-15.
3GPP TSG RAN WG1 Meeting #95; R1-1812962; Spokane, USA, Nov. 12-16, 2018; Agenda Item: 7.1.3.4; Source: Samsung; Title: Remaining Issues on BWP and CA; Document for: Discussion/Decision.
3GPP TSG-RAN WG1 Meeting #95 R1-1813150; Spokane, WA, USA, Nov. 12-16, 2018; Title: On synchronous BWP switching in multiple serving cells; Source to WG: Nokia, Nokia Shanghai Bell; Source to TSG:—Work item code: NR_newRAT-Core; Date: Nov. 2, 2018; Category: F; Release: Rel-15.
3GPP TSG-RAN WG1 Meeting #95 R1-1813150; Spokane, USA, Nov. 12-16, 2018; Source: Nokia, Nokia Shanghai Bell; Title: On maintenance for BWPs and CA; Agenda item: 7.1.3.4.; Document Discussion and Decision.
3GPP TSG-RAN WG1 Meeting #95 R1-1813988; Spokane, USA, Nov. 12-16, 2018; Agenda Item: 7.1.3.4; Source: MediaTek Inc.; Title: Summary of Bandwidth Part Remaining Issues; Document for: Discussion.
3GPP TSG RAN WG1 Meeting #95 R1-1814040; Spokane, USA, Nov. 12-16, 2018; Title: Draft CR on timer-based active BWP switching; Source to WG: MediaTek; Source to TSG: Ran1; Work item code: NR_newRAT-Core Date: Nov. 13, 2018; Category: F; Release: Rel-15.
3GPP TSG RAN WG1 Meeting #95 R1-1814123; Spokane, USA, Nov. 12-16, 2018; Title: Draft CR on timer-based active BWP switching; Source to WG: MediaTek, Huawei, HiSilicon; Source to TSG: RAN1; Work item code: NR_newRAT-Core Date: Nov. 13, 2018; Category: F; Release: Rel-15.
3GPP TSG RAN WG1 Meeting #95 R1-1814199; Spokane, USA, Nov. 12-16, 2018; Title: Draft CR on simultaneous active BWP switchings within a cell or across cells; Source to WG: MediaTek Source to TSG: RAN1; Work item code: NR_newRAT-Core Date: Nov. 15, 2018; Category: F; Release: Rel-15.
3GPP TSG RAN WG1 Meeting #95 R1-1814239; Spokane, USA, Nov. 12-16, 2018; Title: Draft CR on simultaneous active BWP switchings within a cell or across cells; Source to WG: MediaTek; Source to TSG: RAN1; Work item code: NR_newRAT-Core Date: Nov. 15, 2018; Category: F; Release: Rel-15.
3GPP TSG RAN WG1 Meeting #95 R1-1814284; Spokane, USA, Nov. 12-16, 2018; Title: Draft CR on timer-based active BWP switching; Source to WG: MediaTek, Huawei, HiSilicon; Source to TSG: RAN1; Work item code: NR_newRAT-Core Date: Nov. 16, 2018; Category: F; Release: Rel-15.
3GPP TSG-RAN WG2 Meeting #103 R2-1811064; Gothenburg, Sweden, Aug. 23-27, 2018; Title: Clarification on the unit of DRX timers; Source to WG: Samsung; Source to TSG: RAN2; Work item code: NR_newRAT-Core Date: Aug. 9, 2018; Category: F; Release: Rel-15.
3GPP TSG-RAN WG2#103 Tdoc R2-1811628; Gothenburg, Sweden, Aug. 20-24, 2018; Update of R2-1810054; Agenda Item: 10.3.1.10; Source: Ericsson; Title: BWP switch during numerology dependent DRX timers; Document for: Discussion, Decision.
3GPP TSG-RAN WG2 Meeting #103 R2-1811830; Gothenburg, Sweden, Aug. 20-24, 2018; Agenda item: 10.3.1.2; Source: Huawei, HiSilicon; Title: Discussion on timer handling during BWP switching; Document for: Discussion and Decision.
3GPP TSG-RAN2 Meeting #103 R2-1811831; Gothenburg, Sweden, Aug. 20-24, 2018; Title: Clarification on timer handling during BWP switching; Source to WG: Huawei, HiSilicon; Source to TSG: RAN2; Work item code: NR_newRAT-Core Date: Aug. 9, 2018; Category: F; Release: Rel-15.
3GPP TSG-RAN2 #103 R2-1811942; Gothenburg, Sweden, Aug. 20-24, 2018; Agenda item: 10.3.1.10 (NR_newRAT-Core); Source: LG Electronics Inc.; Title: Numerology related timers upon BWP switching; Document for: Discussion and Decision.

(56) References Cited

OTHER PUBLICATIONS

3GPP TSG-RAN WG2 Meeting #103 R2-1812029; Gothenburg, Sweden, Aug. 20-24, 2018; Title: Clarification on HARQ RTT timer and DRX retransmission timer (issue N107); Source to WG: Nokia, Nokia Shanghai Bell; Source to TSG: R2; Work item code: NR_newRAT-Core Date: Aug. 2018; Category: F; Release: Rel-15.
3GPP TSG-RAN WG2 Meeting #103 R2-1813001; Gothenburg, Sweden, Aug. 20-24, 2018; Title: Introduction of DRX ambiguous period; Source to WG: Huawei, HiSilicon; Source to TSG: RAN2; Work item code: NR_newRAT-Core Date: Aug. 10, 2018; Category: F; Release: Rel-15.
3GPP TSG-RAN WG2 Meeting #103 R2-1813041; Gothenburg, Sweden, Aug. 23-27, 2018; Title: Clarification on the duration of timers in MAC; Source to WG: Samsung; Source to TSG: RAN2; Work item code: NR_newRAT-Core Date: Aug. 23, 2018; Category: F; Release: Rel-15.

* cited by examiner

User Plane Protocol Stack

Control Plane Protocol Stack

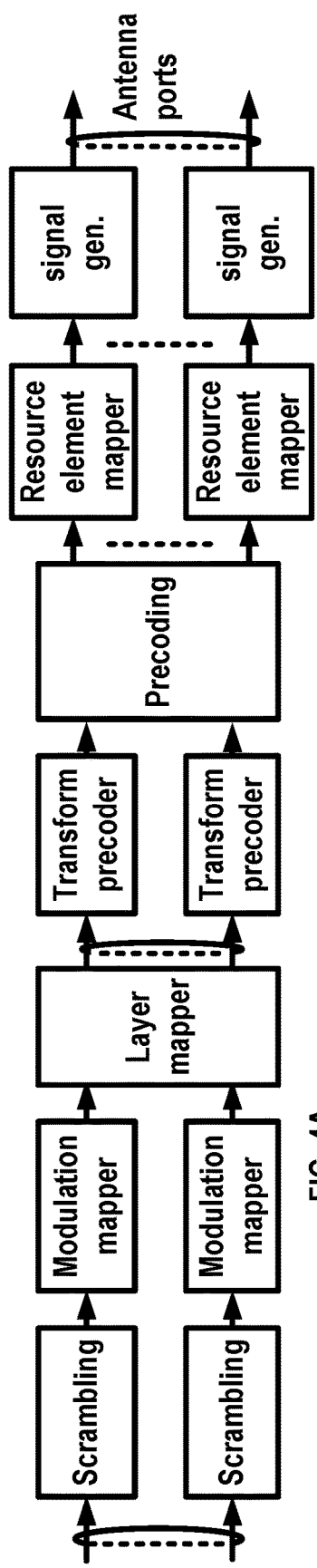
FIG. 4A
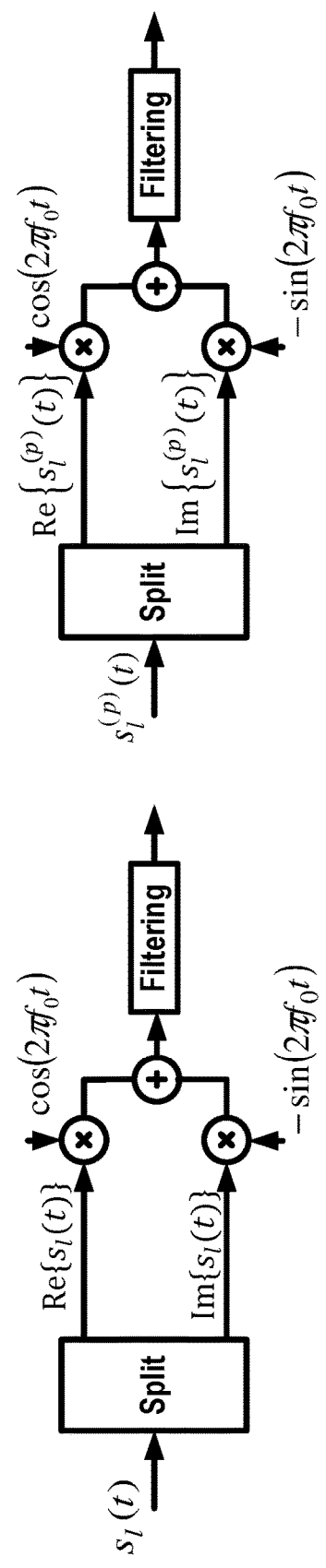
FIG. 4B
FIG. 4D
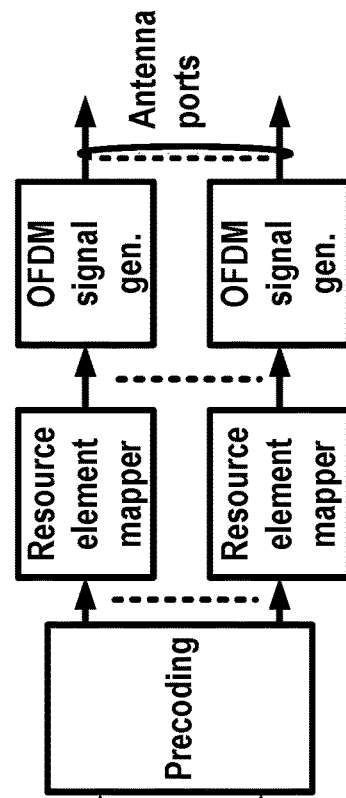
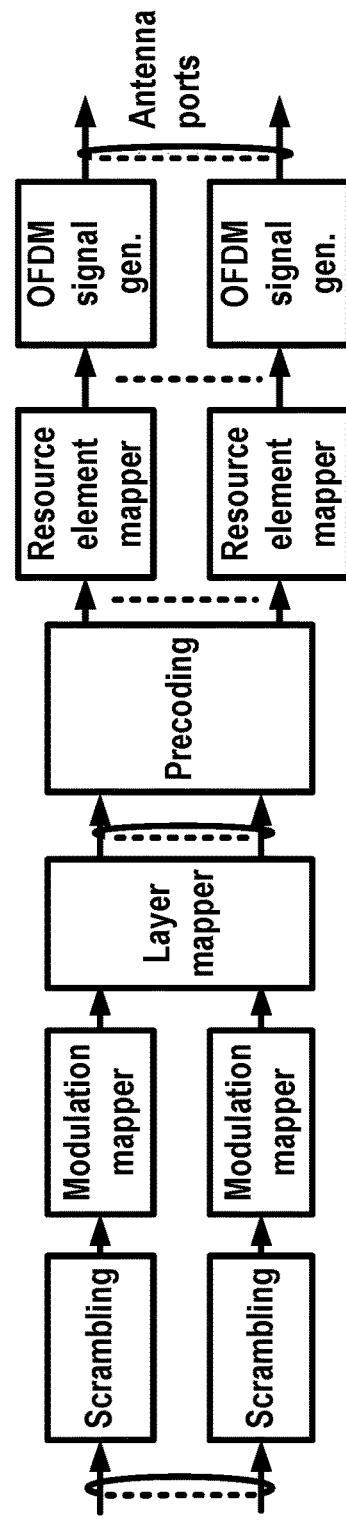
FIG. 4C

US 11,095,419 B2

SIMULTANEOUS BANDWIDTH PARTS SWITCHING

CROSS-REFERENCE TO RELATED APPLICATIONS

This application claims the benefit of U.S. Provisional Application No. 62/787,592, filed Jan. 2, 2019, which is hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

DETAILED DESCRIPTION OF EMBODIMENTS

Figure 1:
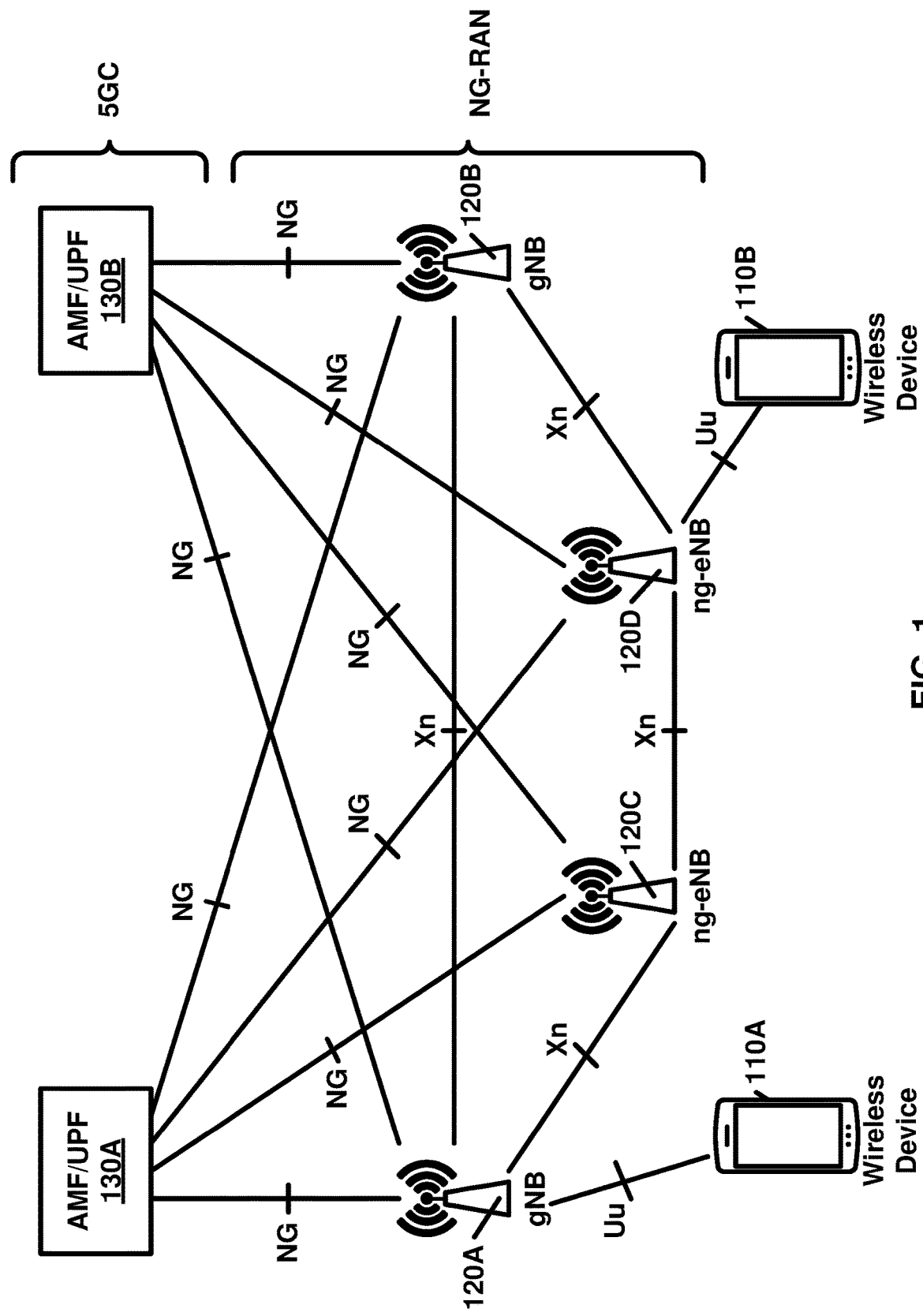
FIG. 1 is a diagram of an example RAN architecture as per an aspect of an embodiment of the present disclosure.

Example embodiments of the present disclosure enable operation of bandwidth parts. Embodiments of the technology disclosed herein may be employed in the technical field of multicarrier communication systems. More particularly, the embodiments of the technology disclosed herein may relate to bandwidth parts in a multicarrier communication system.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
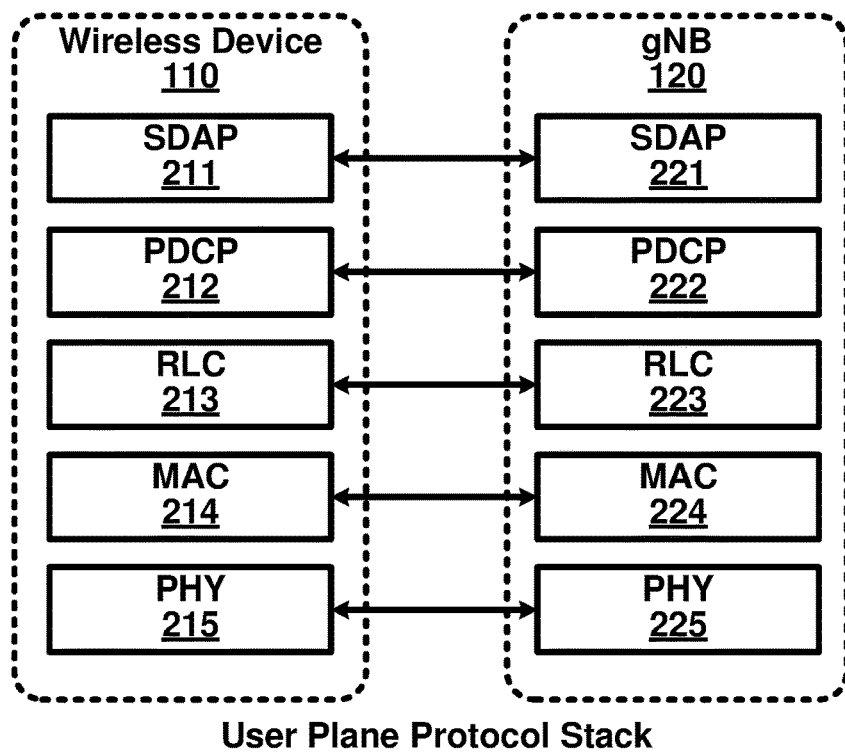
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
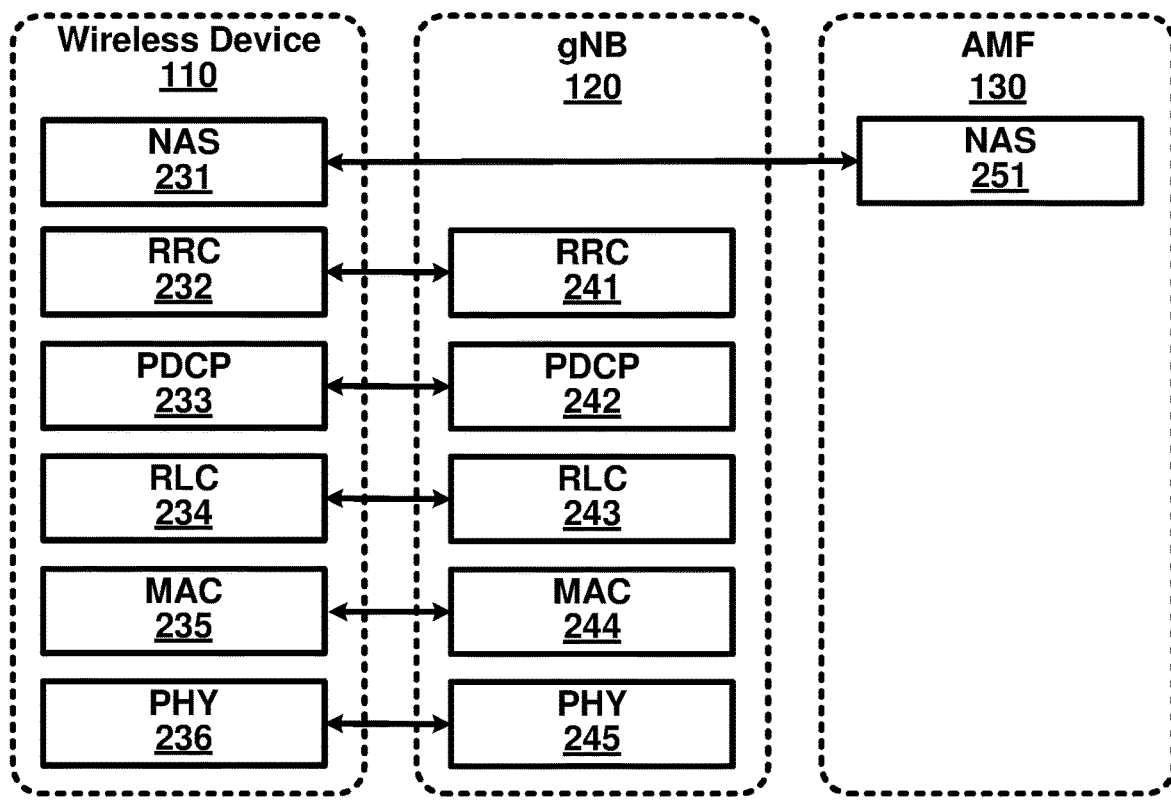
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
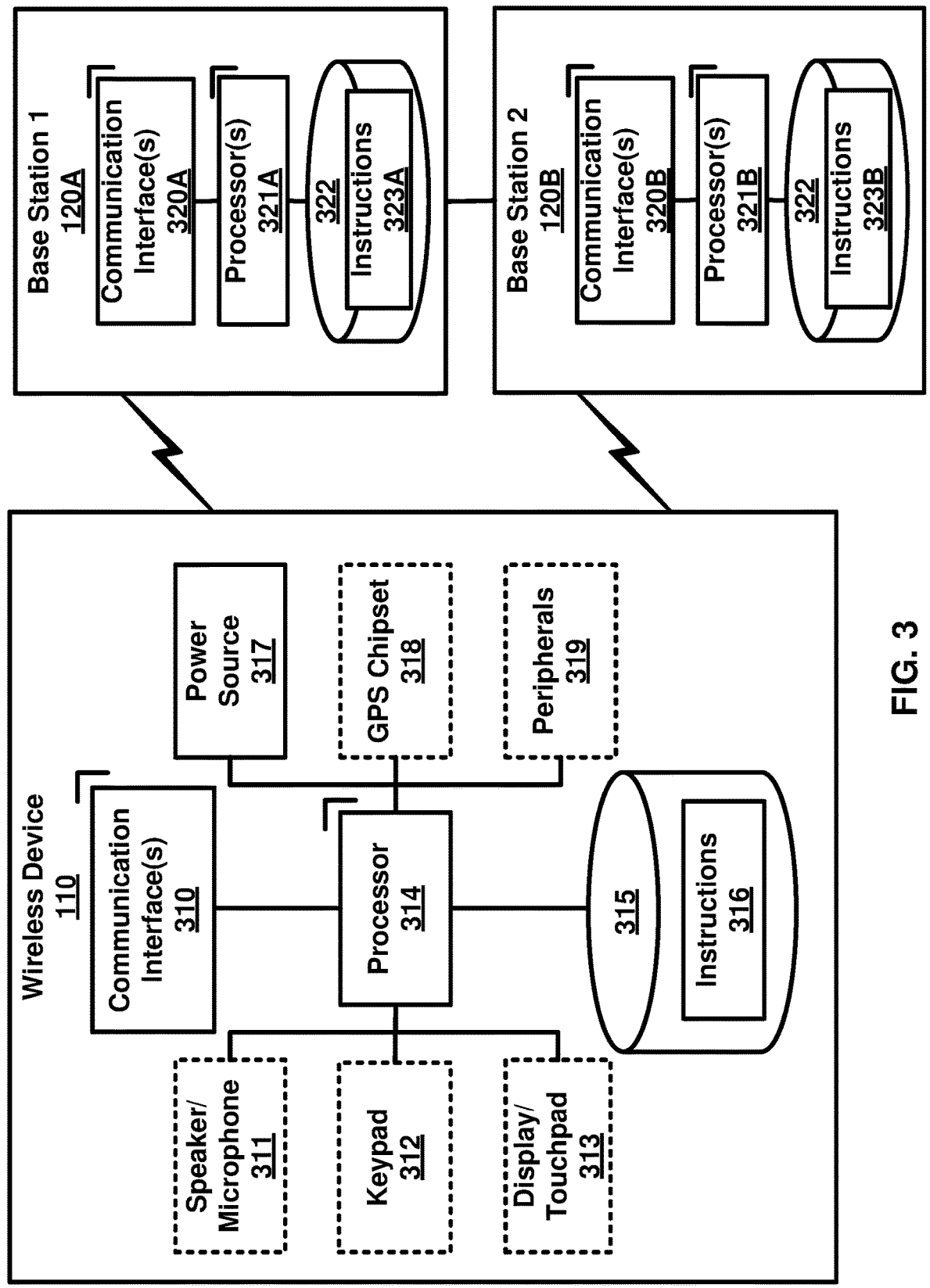
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG.

4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
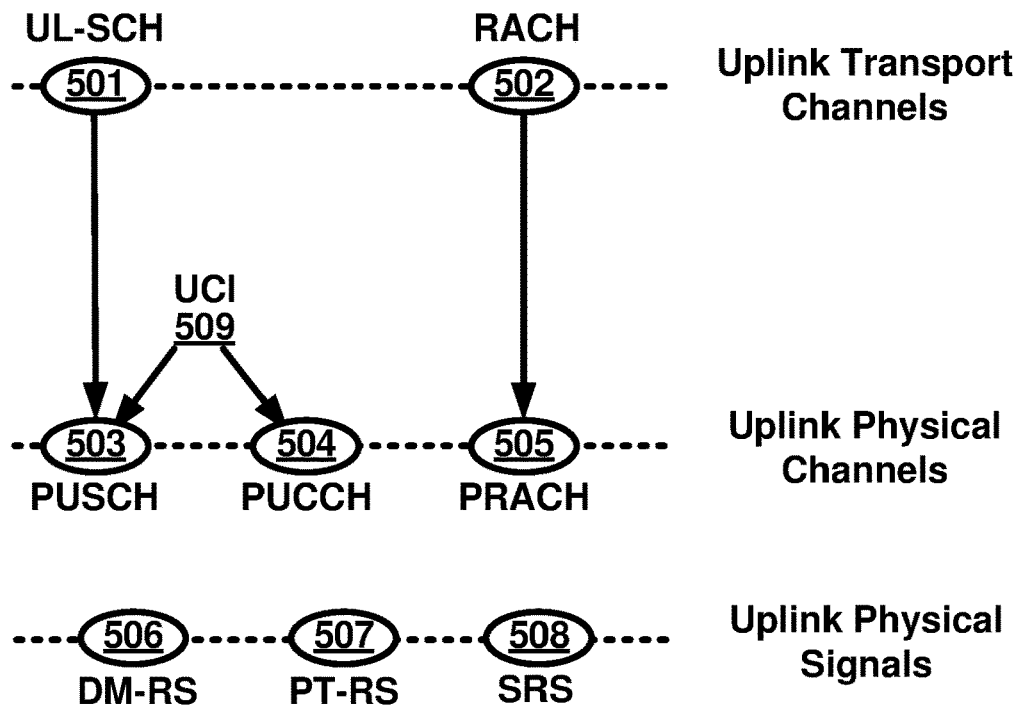
FIG. 5A is a diagram of an example uplink channel mapping and example uplink physical signals as per an aspect of an embodiment of the present disclosure.
Figure 5B:
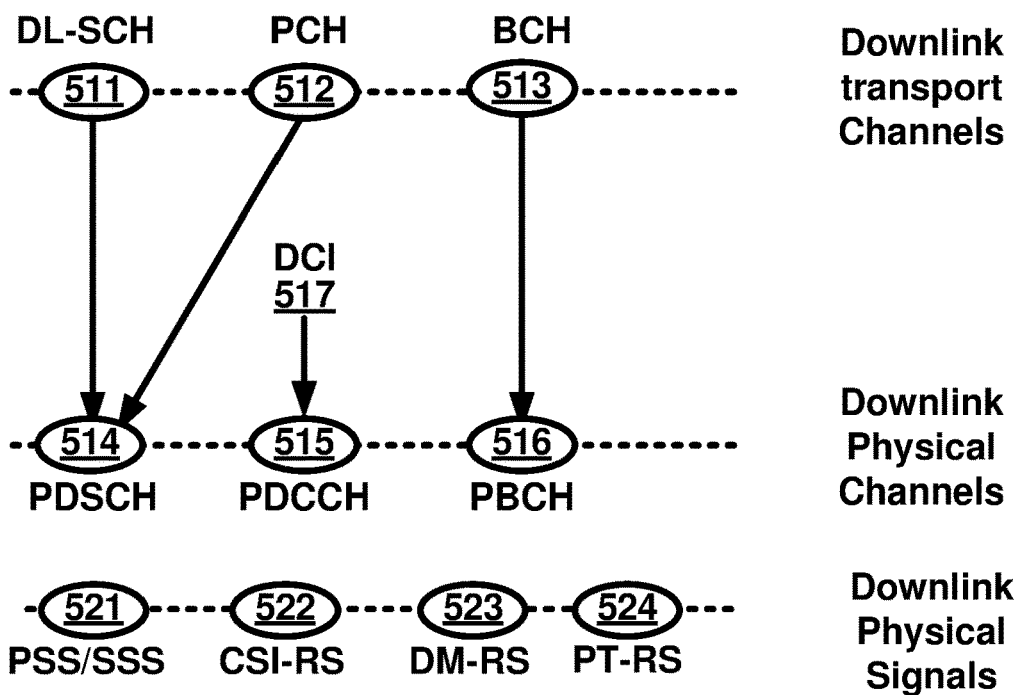
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRB s configured for coreset. In an example, a UE may be configured to employ a same OFDM symbols for downlink CSI-RS 522 and SS/PBCH blocks when the downlink CSI-RS 522 and SS/PBCH blocks are spatially quasi co-located and resource elements associated with the downlink CSI-RS 522 are the outside of PRBs configured for SS/PBCH blocks.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
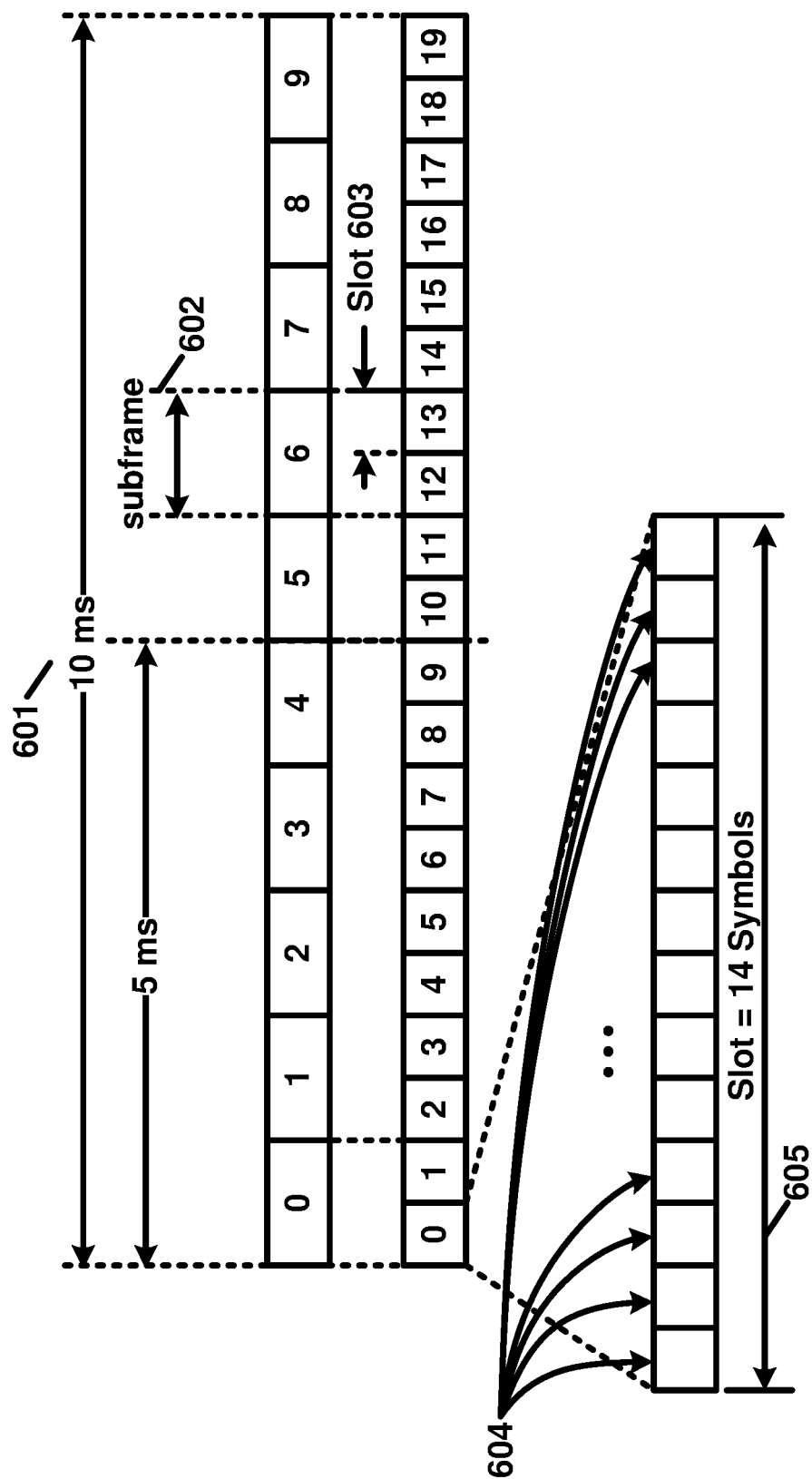
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
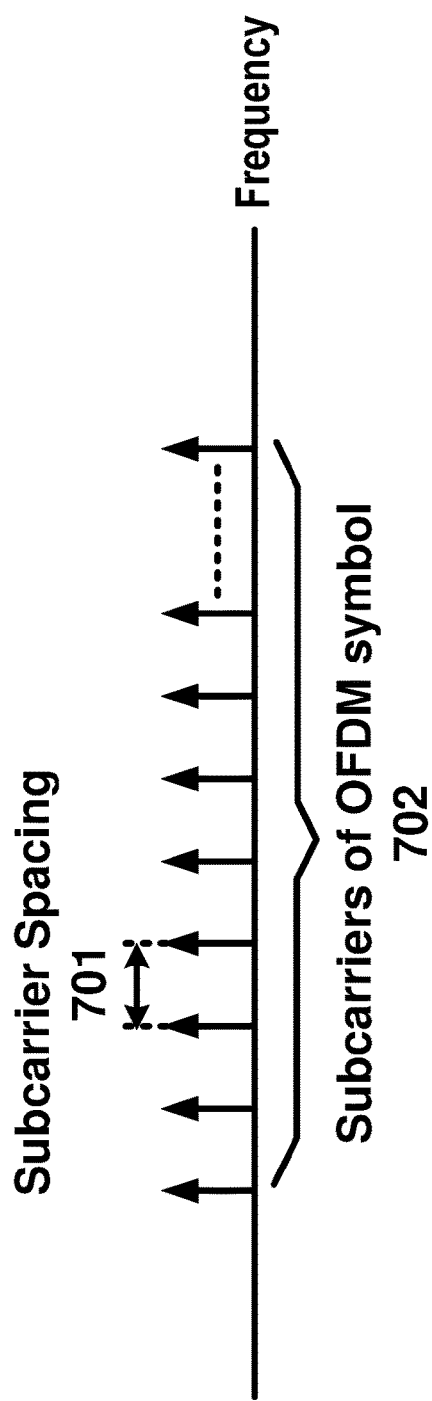
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
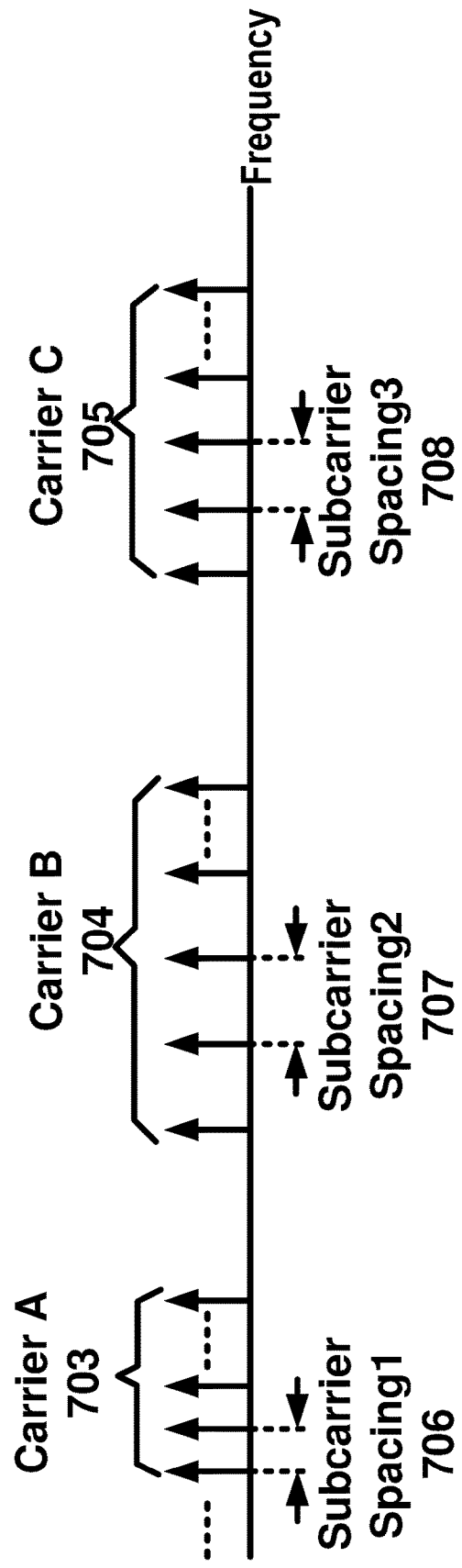

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
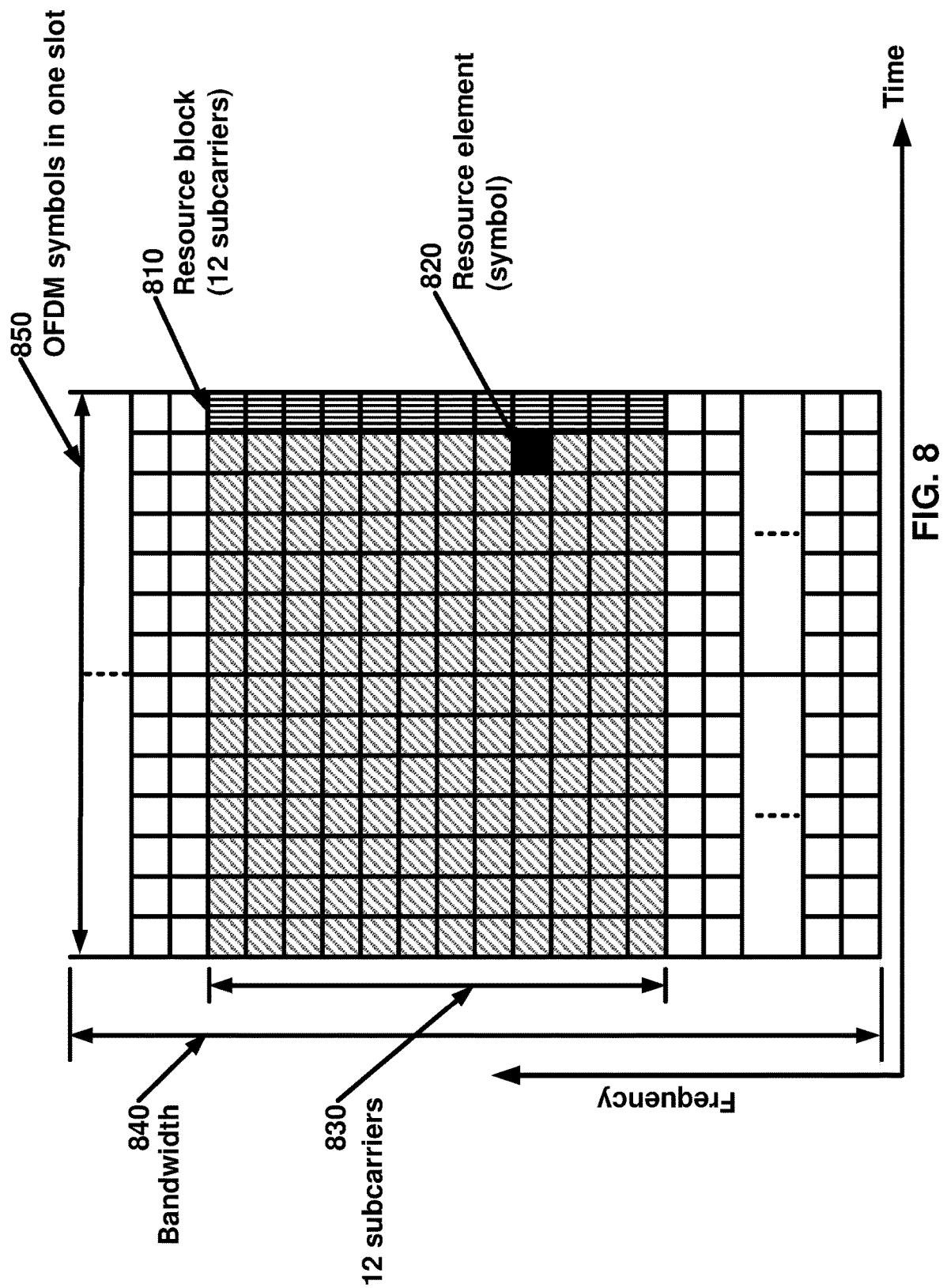
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
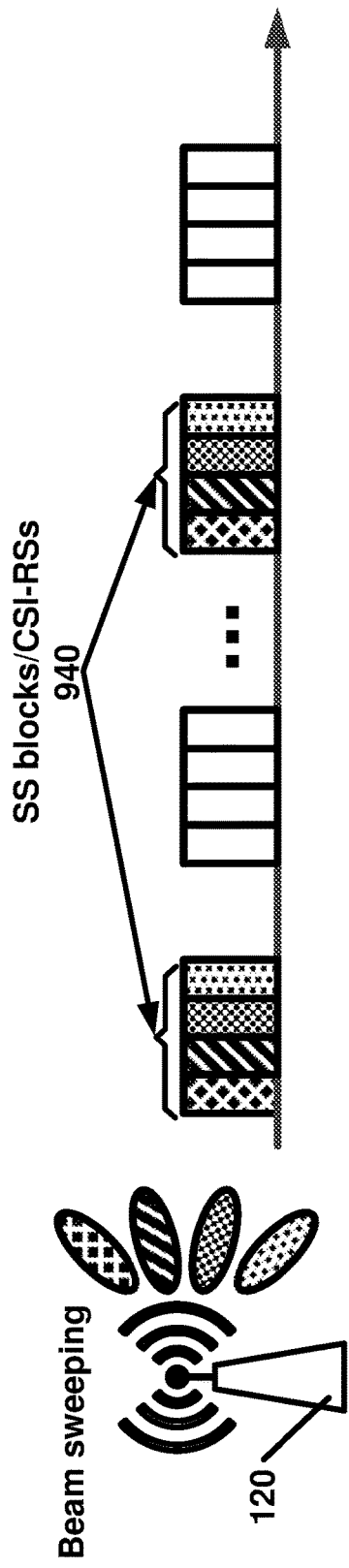
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
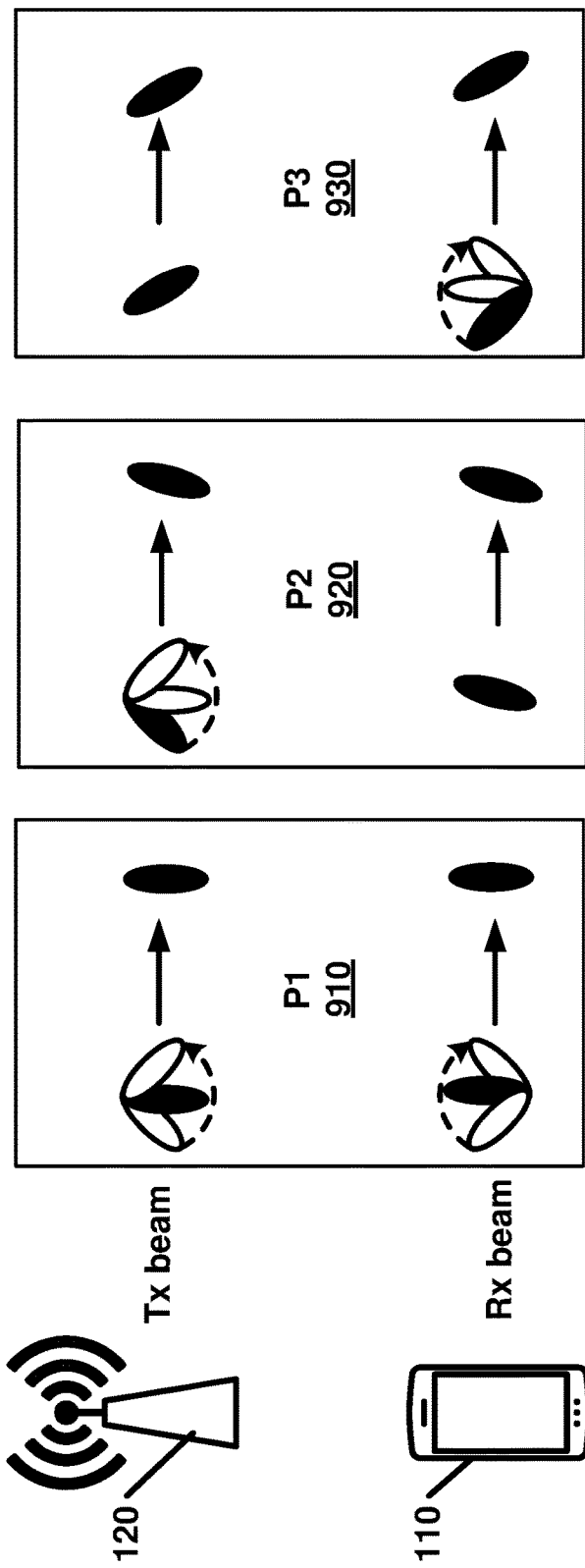
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
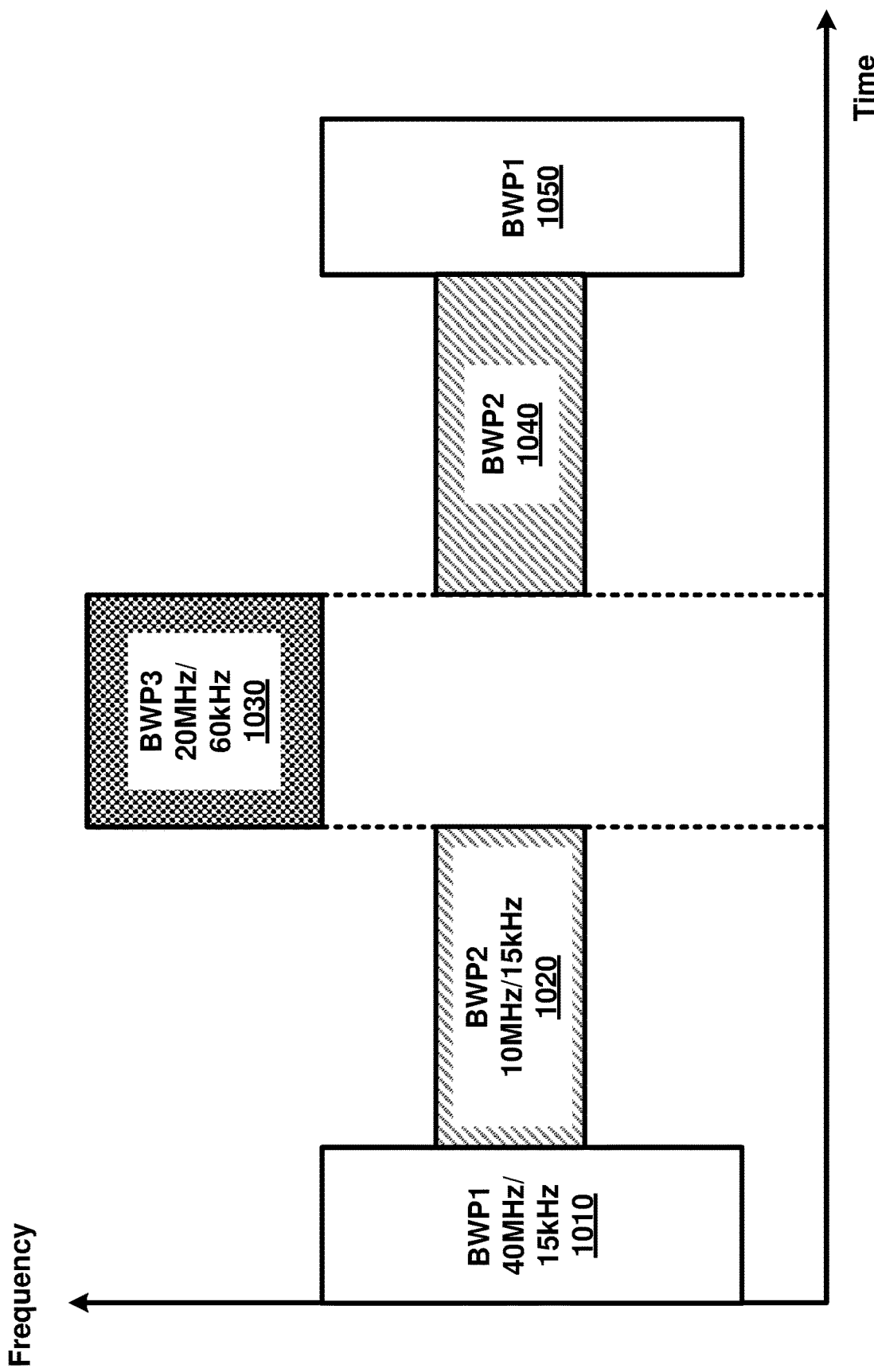
FIG. 10 is an example diagram of configured bandwidth parts (BWPs) as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base station may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
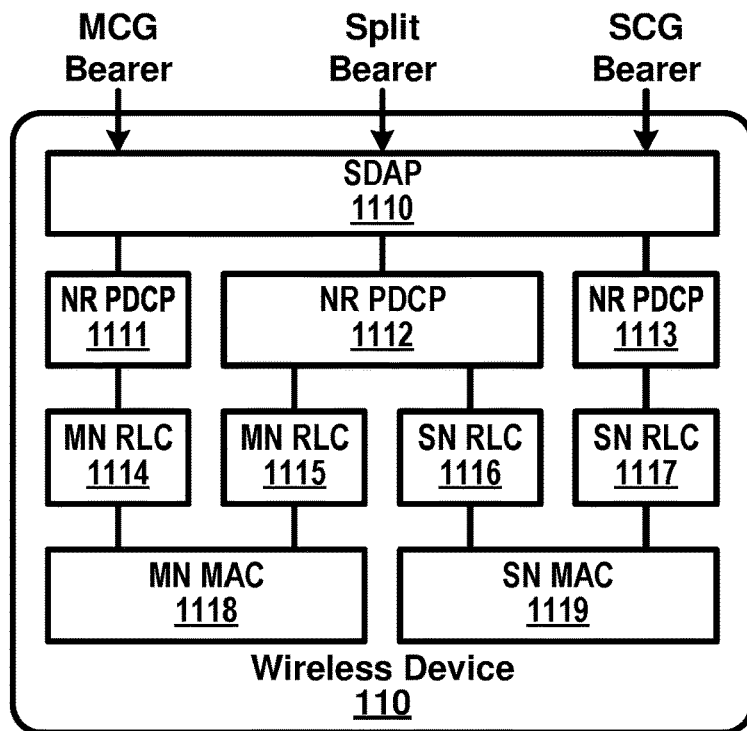
FIG. 11A, and FIG. 11B are diagrams of an example multi connectivity as per an aspect of an embodiment of the present disclosure.
Figure 11B:
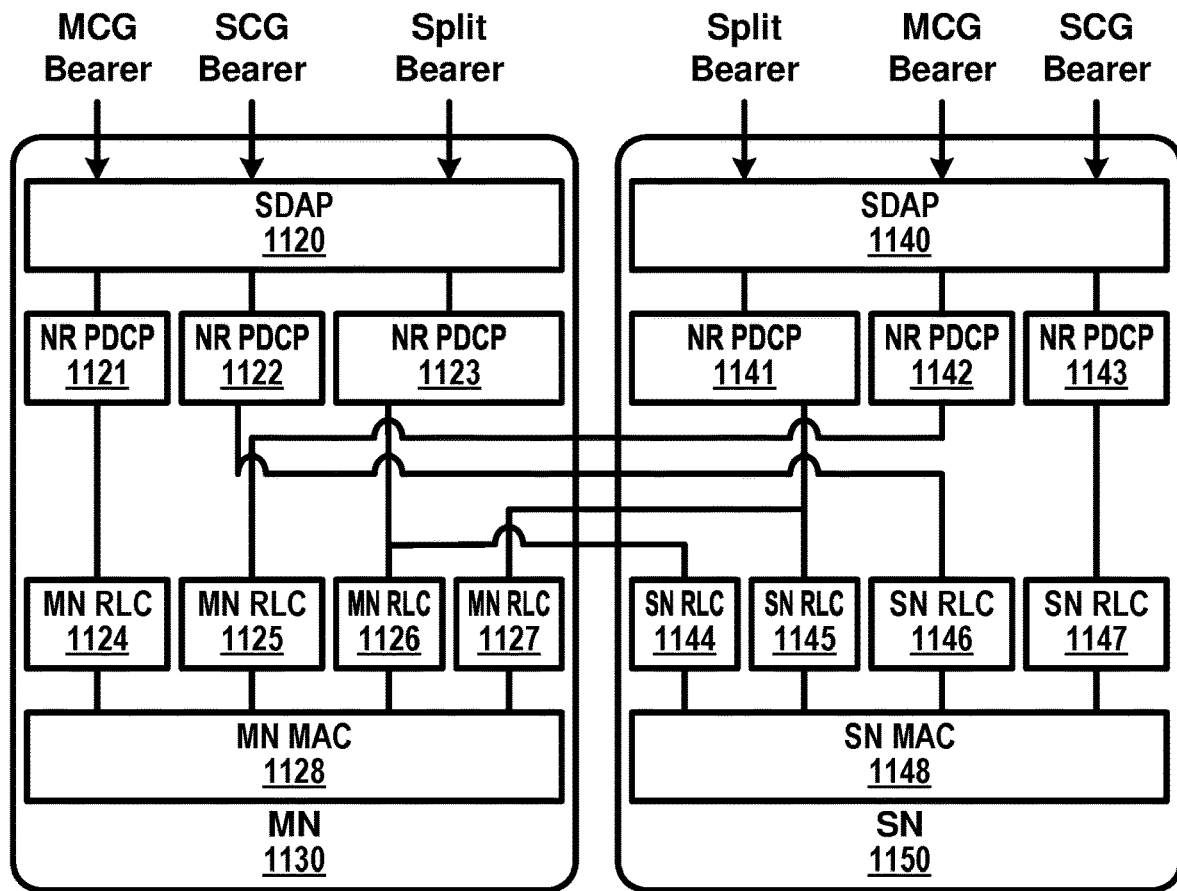

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
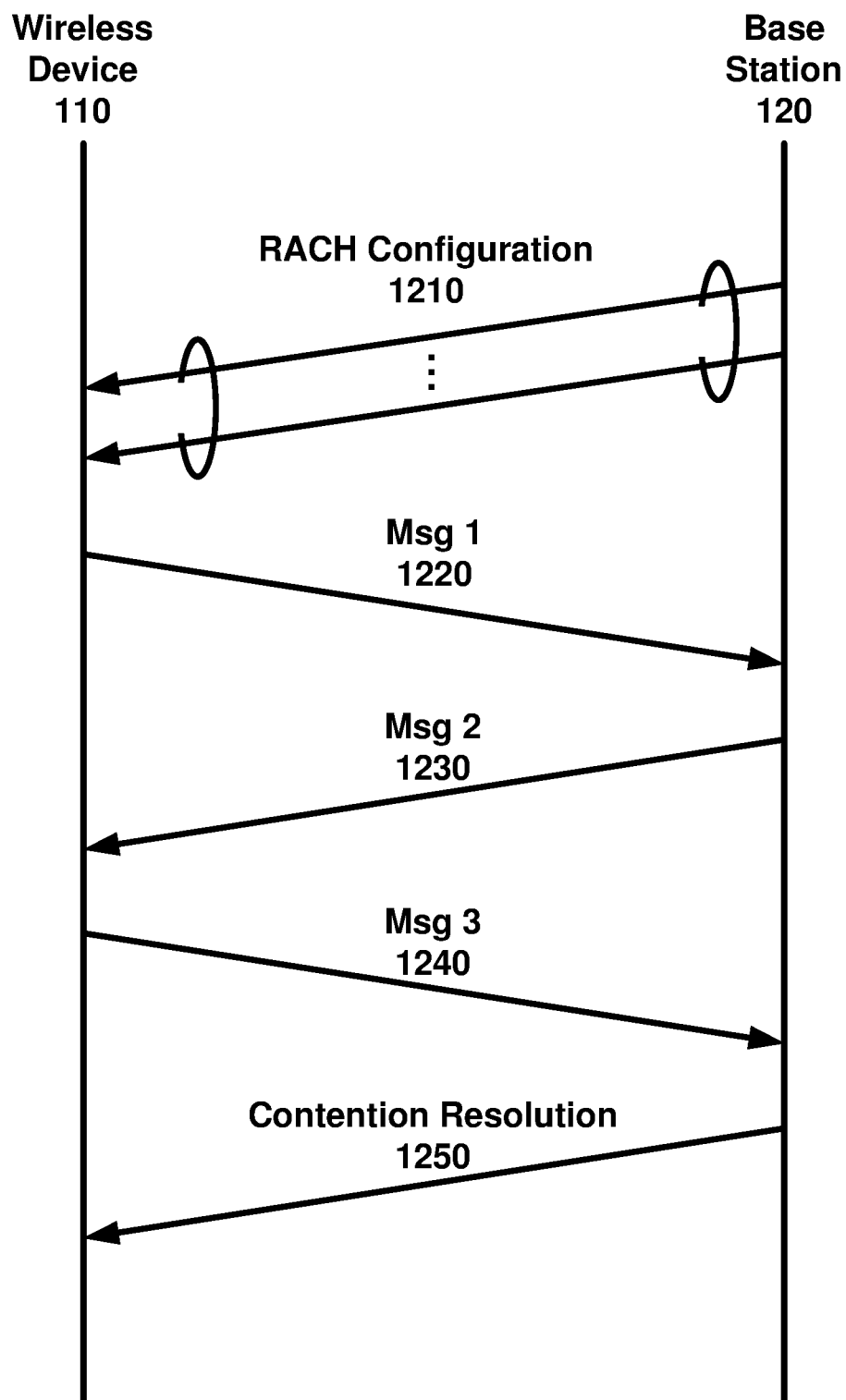
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
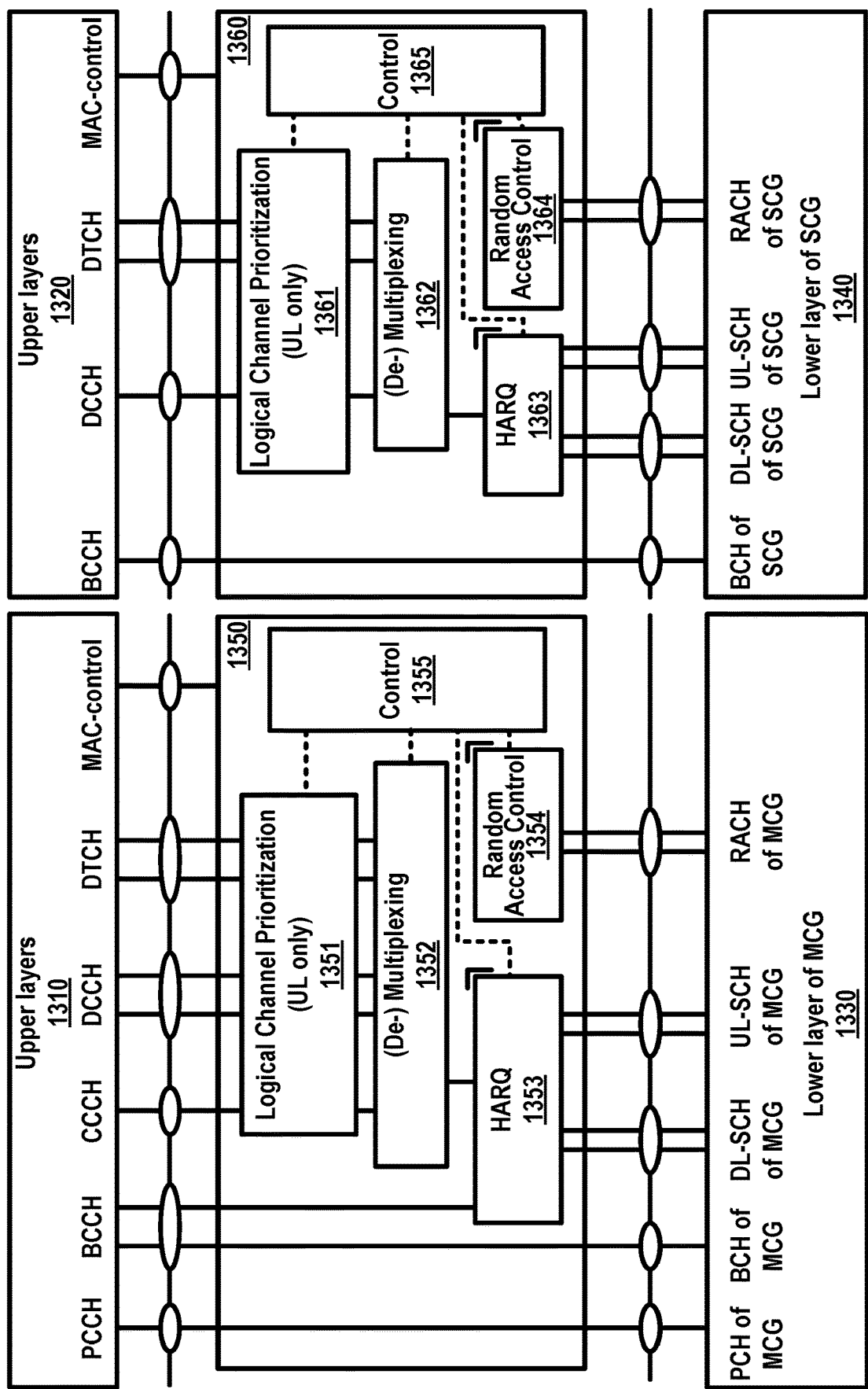
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
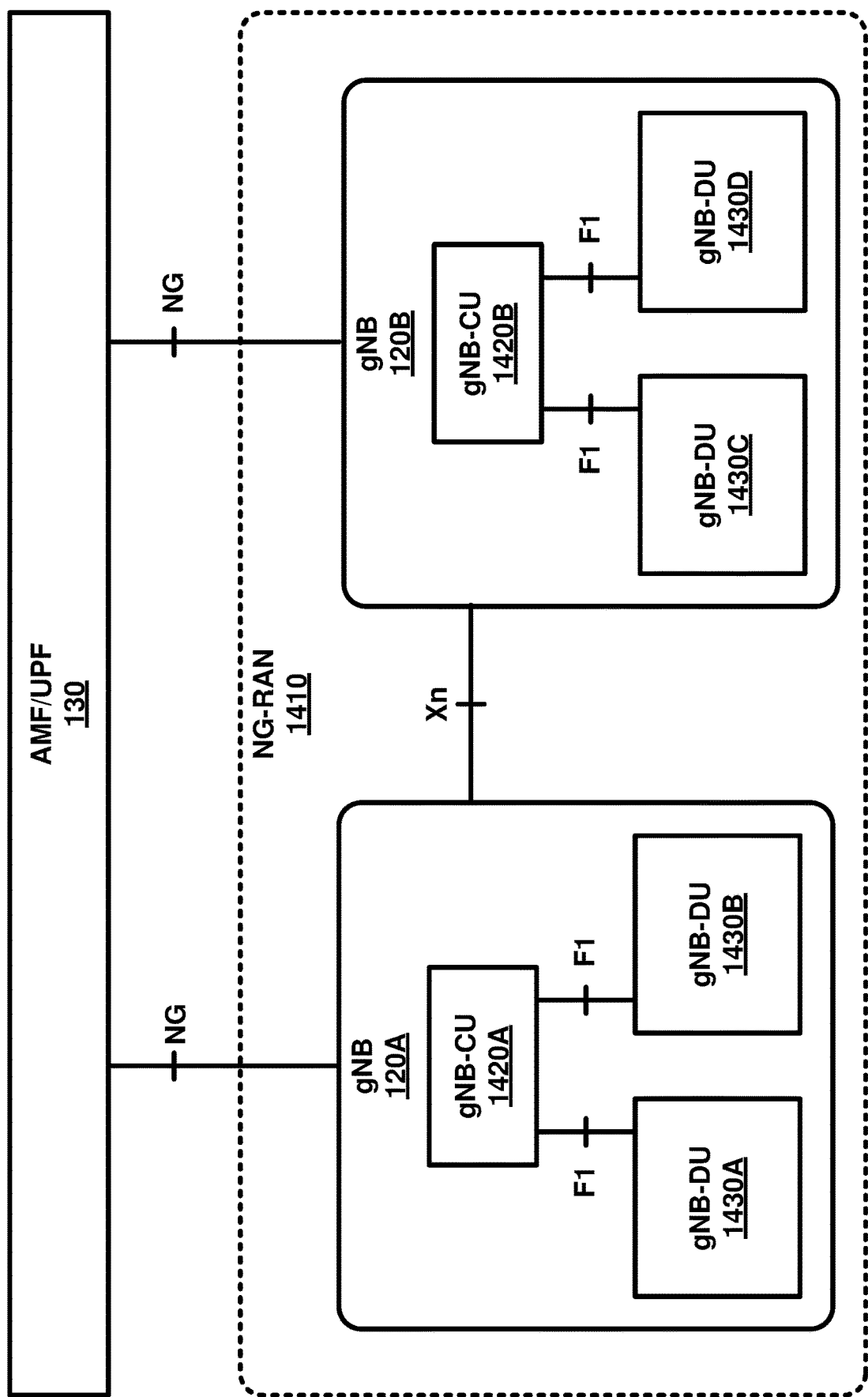
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
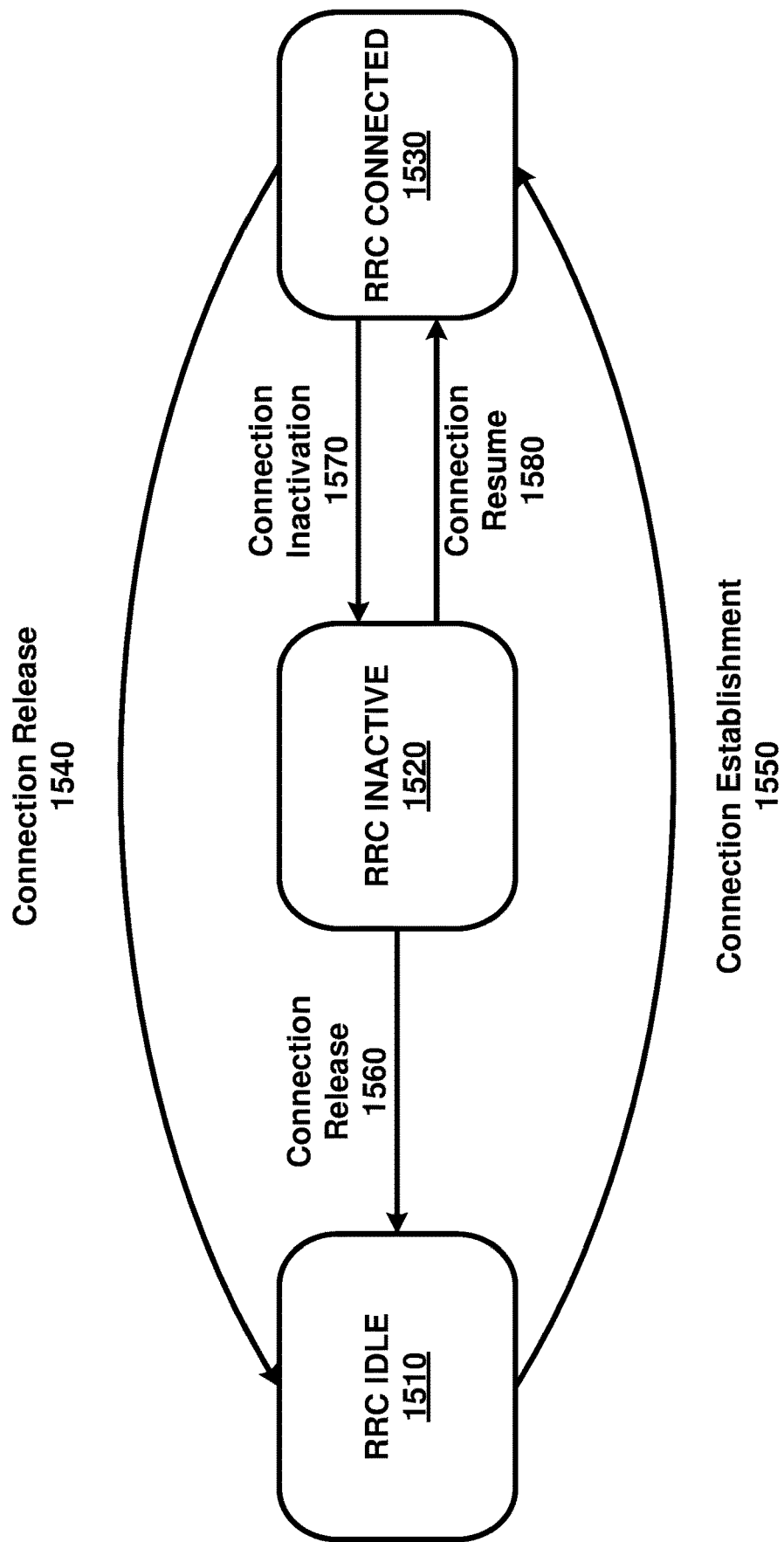
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

Example Downlink Control Information (DCI)

In an example, a gNB may transmit a DCI via a PDCCH for at least one of: scheduling assignment/grant; slot format notification; pre-emption indication; and/or power-control commends. More specifically, the DCI may comprise at least one of: identifier of a DCI format; downlink scheduling assignment(s); uplink scheduling grant(s); slot format indicator; pre-emption indication; power-control for PUCCH/PUSCH; and/or power-control for SRS.

In an example, a downlink scheduling assignment DCI may comprise parameters indicating at least one of: identifier of a DCI format; PDSCH resource indication; transport format; HARQ information; control information related to multiple antenna schemes; and/or a command for power control of the PUCCH.

In an example, an uplink scheduling grant DCI may comprise parameters indicating at least one of: identifier of a DCI format; PUSCH resource indication; transport format; HARQ related information; and/or a power control command of the PUSCH.

In an example, different types of control information may correspond to different DCI message sizes. For example, supporting multiple beams and/or spatial multiplexing in the spatial domain and noncontiguous allocation of RBs in the frequency domain may require a larger scheduling message, in comparison with an uplink grant allowing for frequency-contiguous allocation. DCI may be categorized into different DCI formats, where a format corresponds to a certain message size and/or usage.

In an example, a wireless device may monitor one or more PDCCH for detecting one or more DCI with one or more DCI format, in common search space or wireless device-specific search space. In an example, a wireless device may monitor PDCCH with a limited set of DCI format, to save power consumption. The more DCI format to be detected, the more power be consumed at the wireless device.

In an example, the information in the DCI formats for downlink scheduling may comprise at least one of: identifier of a DCI format; carrier indicator; frequency domain resource assignment; time domain resource assignment; bandwidth part indicator; HARQ process number; one or more MCS; one or more NDI; one or more RV; MIMO related information; Downlink assignment index (DAI); PUCCH resource indicator; PDSCH-to-HARQ_feedback timing indicator; TPC for PUCCH; SRS request; and padding if necessary. In an example, the MIMO related information may comprise at least one of: PMI; precoding information; transport block swap flag; power offset between PDSCH and reference signal; reference-signal scrambling sequence; number of layers; and/or antenna ports for the transmission; and/or Transmission Configuration Indication (TCI).

In an example, the information in the DCI formats used for uplink scheduling may comprise at least one of: an identifier of a DCI format; carrier indicator; bandwidth part indication; resource allocation type; frequency domain resource assignment; time domain resource assignment; MCS; NDI; Phase rotation of the uplink DMRS; precoding information; CSI request; SRS request; Uplink index/DAI; TPC for PUSCH; and/or padding if necessary.

In an example, a gNB may perform CRC scrambling for a DCI, before transmitting the DCI via a PDCCH. The gNB may perform CRC scrambling by binary addition of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, or TPC-SRS-RNTI) and the CRC bits of the DCI. The wireless device may check the CRC bits of the DCI, when detecting the DCI. The wireless device may receive the DCI when the CRC is scrambled by a sequence of bits that is the same as the at least one wireless device identifier.

In an example, in order to support wide bandwidth operation, a gNB may transmit one or more PDCCH in different control resource sets (coresets). A gNB may transmit one or more RRC message comprising configuration parameters of one or more coresets. A coreset may comprise at least one of: a first OFDM symbol; a number of consecutive OFDM symbols; a set of resource blocks; a CCE-to-REG mapping. In an example, a gNB may transmit a PDCCH in a dedicated coreset for particular purpose, for example, for beam failure recovery confirmation.

In an example, a wireless device may monitor PDCCH for detecting DCI in one or more configured coresets, to reduce the power consumption.

Example MAC PDU Structure.

A gNB may transmit one or more MAC PDU to a wireless device. In an example, a MAC PDU may be a bit string that is byte aligned (e.g., multiple of eight bits) in length. In an example, bit strings may be represented by tables in which the most significant bit is the leftmost bit of the first line of the table, and the least significant bit is the rightmost bit on the last line of the table, and more generally, the bit string may be read from the left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., multiple of eight bits) in length. In an example, a MAC SDU may be included into a MAC PDU from the first bit onward.

In an example, a MAC CE may be a bit string that is byte aligned (e.g., multiple of eight bits) in length.

In an example, a MAC subheader may be a bit string that is byte aligned (e.g., multiple of eight bits) in length. In an example, a MAC subheader may be placed immediately in front of the corresponding MAC SDU, or MAC CE, or padding.

In an example, a MAC entity may ignore a value of reserved bits in a DL MAC PDU.

In an example, a MAC PDU may comprise one or more MAC subPDUs. a MAC subPDU of the one or more MAC subPDUs may comprise at least one of: a MAC subheader only (including padding); a MAC subheader and a MAC SDU; a MAC subheader and a MAC CE; and/or a MAC subheader and padding. In an example, the MAC SDU may be of variable size. In an example, a MAC subheader may correspond to a MAC SDU, or a MAC CE, or padding.

In an example, a MAC subheader may comprise: an R field with one bit; a F field with one bit in length; a LCID field with multiple bits in length; a L field with multiple bits in length, when the MAC subheader corresponds to a MAC SDU, or a variable-sized MAC CE, or padding.

In an example, a MAC subheader may comprise an eight-bit L field. In the example, the LCID field may have six bits in length, and the L field may have eight bits in length. In an example, a MAC subheader may comprise a sixteen-bit L field. In the example, the LCID field may have six bits in length, and the L field may have sixteen bits in length.

In an example, a MAC subheader may comprise: a R field with two bits in length; and a LCID field with multiple bits in length, when the MAC subheader corresponds to a fixed sized MAC CE, or padding. In an example, the LCID field may have six bits in length, and the R field may have two bits in length.

In an example DL MAC PDU, multiple MAC CEs may be placed together. A MAC subPDU comprising MAC CE may be placed before any MAC subPDU comprising a MAC SDU, or a MAC subPDU comprising padding.

In an example UL MAC PDU, multiple MAC CEs may be placed together. A MAC subPDU comprising MAC CE may be placed after all MAC subPDU comprising a MAC SDU. The MAC subPDU may be placed before a MAC subPDU comprising padding.

In an example, a MAC entity of a gNB may transmit to a MAC entity of a wireless device one or more MAC CEs. In an example, multiple LCIDs may be associated with the one or more MAC CEs. In the example, the one or more MAC CEs may comprise at least one of: a SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a UE contention resolution identity MAC CE; a timing advance command MAC CE; a DRX command MAC CE; a Long DRX command MAC CE; a SCell activation/deactivation MAC CE (1 Octet); a SCell activation/deactivation MAC CE (4 Octet); and/or a duplication activation/deactivation MAC CE. In an example, a MAC CE may have a LCID in the corresponding MAC subheader. Different MAC CE may have different LCID in the corresponding MAC subheader. For example, the LCID with 111011 in a MAC subheader may indicate a MAC CE associated with the MAC subheader is a long DRX command MAC CE.

In an example, the MAC entity of the wireless device may transmit to the MAC entity of the gNB one or more MAC CEs. In an example, the one or more MAC CEs may comprise at least one of: a short buffer status report (BSR) MAC CE; a long BSR MAC CE; a C-RNTI MAC CE; a configured grant confirmation MAC CE; a single entry PHR MAC CE; a multiple entry PHR MAC CE; a short truncated BSR; and/or a long truncated BSR. In an example, a MAC CE may have a LCID in the corresponding MAC subheader. Different MAC CE may have different LCID in the corresponding MAC subheader. For example, the LCID with 111011 in a MAC subheader may indicate a MAC CE associated with the MAC subheader is a short-truncated command MAC CE.

Example of Carrier Aggregation

In a carrier aggregation (CA), two or more component carriers (CCs) may be aggregated. A wireless device may simultaneously receive or transmit on one or more CCs depending on capabilities of the wireless device. In an example, the CA may be supported for contiguous CCs. In an example, the CA may be supported for non-contiguous CCs.

When configured with a CA, a wireless device may have one RRC connection with a network. During an RRC connection establishment/re-establishment/handover, a cell providing a NAS mobility information may be a serving cell. During an RRC connection re-establishment/handover procedure, a cell providing a security input may be a serving cell. In an example, the serving cell may be referred to as a primary cell (PCell). In an example, a gNB may transmit, to a wireless device, one or more messages comprising configuration parameters of a plurality of one or more secondary cells (SCells), depending on capabilities of the wireless device.

When configured with CA, a base station and/or a wireless device may employ an activation/deactivation mechanism of an SCell for an efficient battery consumption. When a wireless device is configured with one or more SCells, a gNB may activate or deactivate at least one of the one or more SCells. Upon configuration of an SCell, the SCell may be deactivated.

In an example, a wireless device may activate/deactivate an SCell in response to receiving an SCell Activation/Deactivation MAC CE.

In an example, a base station may transmit, to a wireless device, one or more messages comprising an sCellDeactivationTimer timer. In an example, a wireless device may deactivate an SCell in response to an expiry of the sCell-DeactivationTimer timer.

When a wireless device receives an SCell Activation/Deactivation MAC CE activating an SCell, the wireless device may activate the SCell. In response to the activating the SCell, the wireless device may perform operations comprising SRS transmissions on the SCell, CQI/PMI/RI/CRI reporting for the SCell on a PCell, PDCCH monitoring on the SCell, PDCCH monitoring for the SCell on the PCell, and/or PUCCH transmissions on the SCell.

In an example, in response to the activating the SCell, the wireless device may start or restart an sCellDeactivationTimer timer associated with the SCell. The wireless device may start the sCellDeactivationTimer timer in the slot when the SCell Activation/Deactivation MAC CE has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

In an example, when a wireless device receives an SCell Activation/Deactivation MAC CE deactivating an activated SCell, the wireless device may deactivate the activated SCell.

In an example, when an sCellDeactivationTimer timer associated with an activated SCell expires, the wireless device may deactivate the activated SCell. In response to the deactivating the activated SCell, the wireless device may stop the sCellDeactivationTimer timer associated with the activated SCell. In an example, in response to the deactivating the activated SCell, the wireless device may clear one or more configured downlink assignments and/or one or more configured uplink grant Type 2 associated with the activated SCell. In an example, in response to the deactivating the activated SCell, the wireless device may further suspend one or more configured uplink grant Type 1 associated with the activated SCell. The wireless device may flush HARQ buffers associated with the activated SCell.

In an example, when an SCell is deactivated, a wireless device may not perform operations comprising transmitting SRS on the SCell, reporting CQI/PMI/RI/CRI for the SCell on a PCell, transmitting on UL-SCH on the SCell, transmitting on RACH on the SCell, monitoring at least one first PDCCH on the SCell, monitoring at least one second PDCCH for the SCell on the PCell, transmitting a PUCCH on the SCell.

In an example, when at least one first PDCCH on an activated SCell indicates an uplink grant or a downlink assignment, a wireless device may restart an sCellDeactivationTimer timer associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart an sCellDeactivationTimer timer associated with the activated SCell.

In an example, when an SCell is deactivated, if there is an ongoing random access procedure on the SCell, a wireless device may abort the ongoing random access procedure on the SCell.

Example of SCell Activation/Deactivation MAC-CE

An example SCell Activation/Deactivation MAC CE may comprise one octet. A first MAC PDU subheader with a first LCID may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g. one).

An example SCell Activation/Deactivation MAC CE may comprise four octets. A second MAC PDU subheader with a second LCID may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g. 31) and a fourth number of R-fields (e.g. 1).

In an example, a $C_i$ field may indicate an activation/deactivation status of an SCell with an SCell index i, if a SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In an example, an R field may indicate a reserved bit. The R field may be set to zero.

Example of Random-Access Procedure

In an example, a base station may transmit, to a wireless device, one or more messages indicating random access parameters. For example, the one or more messages may be broadcast RRC message, wireless device specific RRC message, and/or combination thereof. For example, the one or more message may comprise at least one of RACH-ConfigCommon, RACH-ConfigGeneric, and RACH-ConfigDedicated. For example, for a contention based random access procedure, a wireless device may receive, from a base station, at least RACH-ConfigCommon and RACH-ConfigGeneric. For example, for a contention free random access procedure, a wireless device may receive, from a base station, at least RACH-ConfigDedicated.

For example, a random access procedure may be initiated in different ways based at least on one of RACH-ConfigCommon, RACH-ConfigGeneric, and RACH-ConfigDedicated. For example, the random access procedure may be initiated by a PDCCH order transmitted by a base station, by the MAC entity of a wireless device, or by RRC. There may be one random access procedure ongoing at any point in time in a MAC entity. The random access procedure on an SCell may be initiated by a PDCCH order with ra-PreambleIndex different from 0b000000. For example, if the MAC entity of a wireless device receives a request for a random access procedure while another is already ongoing in the MAC entity, a wireless device may continue with the ongoing procedure or start with the new procedure (e.g. for SI request).

In an example, a base station may transmit one or more RRC message to configure a wireless device at least one of following parameters:

prach-ConfigIndex: the available set of PRACH occasions for the transmission of the Random Access Preamble preambleReceivedTargetPower: initial Random Access Preamble power;

rsrp-ThresholdSSB: an RSRP threshold for the selection of the SSB and corresponding Random Access Preamble and/or PRACH occasion. If the Random Access procedure is initiated for beam failure recovery, rsrp-ThresholdSSB refers to rsrp-ThresholdSSB in BeamFailureRecoveryConfig IE;

rsrp-ThresholdCSI-RS: an RSRP threshold for the selection of CSI-RS and corresponding Random Access Preamble and/or PRACH occasion. If the Random Access procedure is initiated for beam failure recovery, rsrp-ThresholdCSI-RS shall be set to a value calculated by multiplying rsrp-ThresholdSSB in BeamFailureRecoveryConfig IE by powerControlOffset;

rsrp-ThresholdSSB-SUL: an RSRP threshold for the selection between the NUL carrier and the SUL carrier;
    powerControlOffset: a power offset between rsrp-ThresholdSSB and rsrp-ThresholdCSI-RS to be used when the Random Access procedure is initiated for beam failure recovery;
powerRampingStep: the power-ramping factor;
powerRampingStepHighPriority: the power-ramping factor in case of differentiated Random Access procedure
    ra-PreambleIndex: Random Access Preamble;
    ra-ssb-OccasionMaskIndex: defines PRACH occasion(s) associated with an SSB in which the MAC entity may transmit a Random Access Preamble;
    ra-OccasionList: defines PRACH occasion(s) associated with a CSI-RS in which the MAC entity may transmit a Random Access Preamble;
    preambleTransMax: the maximum number of Random Access Preamble transmission ssb-perRACH-OccasionAndCB-PreamblesPerSSB: defines the number of SSBs mapped to each PRACH occasion and the number of Random Access Preambles mapped to each SSB;
    the set of Random Access Preambles and/or PRACH occasions for SI request, if any; the set of Random Access Preambles and/or PRACH occasions for beam failure recovery request, if any;
    ra-ResponseWindow: the time window to monitor RA response(s);
    ra-ContentionResolutionTimer: the Contention Resolution Timer In an example, a random access procedure may be initiated for beam failure detection and recovery. For example, a wireless device may be configured by RRC with a beam failure recovery procedure which may be used for indicating to the serving base station of a SSB or CSI-RS when beam failure is detected on the serving SSB(s)/CSI-RS(s). Beam failure may be detected by counting beam failure instance indication from the lower layers to the MAC entity. For example, a base station may configure, via RRC, the following parameters in the BeamFailureRecoveryConfig for the Beam Failure Detection and Recovery procedure:
    beamFailureInstanceMaxCount for the beam failure detection;
    beamFailureDetectionTimer for the beam failure detection;
    beamFailureRecoveryTimer for the beam failure recovery procedure;
    rsrp-ThresholdSSB: an RSRP threshold for the beam failure recovery;
    powerRampingStep: powerRampingStep for the beam failure recovery;
    preambleReceivedTargetPower: preambleReceivedTargetPower for the beam failure recovery;
    preambleTransMax: preambleTransMax for the beam failure recovery;
    ra-ResponseWindow: the time window to monitor response(s) for the beam failure recovery using contention-free Random Access Preamble;
    prach-ConfigIndex: prach-ConfigIndex for the beam failure recovery;
    ra-ssb-OccasionMaskIndex: ra-ssb-OccasionMaskIndex for the beam failure recovery;
    ra-OccasionList: ra-OccasionList for the beam failure recovery.

In an example, a wireless device may employ one or more parameters for a random access procedure. For example, a wireless device may employ at least one of PREAMBLE_INDEX; PREAMBLE_TRANSMISSION_COUNTER; PREAMBLE_POWER_RAMPING_COUNTER; PREAMBLE_POWER_RAMPING_STEP; PREAMBLE_RECEIVED_TARGET_POWER; PREAMBLE_BACKOFF; PCMAX; SCALING_FACTOR_BI; and TEMPORARY_C-RNTI.

In an example, a wireless device may perform random access resource selection for selecting one or more preambles and one or more PRACH occasion (or resources comprising time, frequency, and/or code). For example, there may be one or more cases that a random access procedure may be initiated for beam failure recovery; and/or the beamFailureRecoveryTimer is either running or not configured; and/or the contention-free Random Access Resources for beam failure recovery request associated with any of the SSBs and/or CSI-RSs have been explicitly provided by RRC; and/or at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available. In this case, a wireless device may select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList. For example, if CSI-RS is selected, and there is no ra-PreambleIndex associated with the selected CSI-RS, a wireless device may set the PREAMBLE_INDEX to a ra-PreambleIndex corresponding to the SSB in candidateBeamRSList which is quasi-collocated with the selected CSI-RS, otherwise the wireless device may set the PREAMBLE_INDEX to a ra-PreambleIndex corresponding to the selected SSB or CSI-RS from the set of Random Access Preambles for beam failure recovery request.

For example, there may be one or more cases that a random access procedure may be initiated and/or a ra-PreambleIndex has been explicitly provided by either PDCCH or RRC; and/or the ra-PreambleIndex is not 0b000000; and/or contention-free Random Access Resource associated with SSBs or CSI-RSs have not been explicitly provided by RRC. In this case, a wireless device may set the PREAMBLE_INDEX to the signaled ra-PreambleIndex.

For example, there may be one or more cases that a random access procedure may be initiated and/or the contention-free Random Access Resources associated with SSBs have been explicitly provided by RRC and at least one SSB with SS-RSRP above rsrp-ThresholdSSB amongst the associated SSBs is available. In this case, a wireless device may select an SSB with SS-RSRP above rsrp-ThresholdSSB amongst the associated SSBs. For example, the wireless device may set the PREAMBLE_INDEX to a ra-PreambleIndex corresponding to the selected SSB.

For example, there may be one or more cases that a random access procedure may be initiated and the contention-free Random Access Resources associated with CSI-RSs have been explicitly provided by RRC and at least one CSI-RS with CSI-RSRP above rsrp-ThresholdCSI-RS amongst the associated CSI-RSs is available. In this case, a wireless device may select a CSI-RS with CSI-RSRP above rsrp-ThresholdCSI-RS amongst the associated CSI-RSs. for example, the wireless device may set the PREAMBLE_INDEX to a ra-PreambleIndex corresponding to the selected CSI-RS.

For example, there may be one or more cases that a random access procedure may be initiated and at least one of the SSBs with SS-RSRP above rsrp-ThresholdSSB is available. In this case, for example, a wireless device may select an SSB with SS-RSRP above rsrp-ThresholdSSB, otherwise may select any SSB. For example, a random access resource selection is performed when Msg3 is being retransmitted, a wireless device may select the same group of Random Access Preambles as was used for the Random Access Preamble transmission attempt corresponding to the first transmission of Msg3. For example, if the association between Random Access Preambles and SSBs is configured, a wireless device may select a ra-PreambleIndex randomly with equal probability from the Random Access Preambles associated with the selected SSB and the selected Random Access Preambles group. For example, if the association between Random Access Preambles and SSBs is not configured, a wireless device may select a ra-PreambleIndex randomly with equal probability from the Random Access Preambles within the selected Random Access Preambles group. For example, a wireless device may set the PREAMBLE_INDEX to the selected ra-PreambleIndex.

In an example, if an SSB is selected above and an association between PRACH occasions and SSBs is configured, a wireless device may determine the next available PRACH occasion from the PRACH occasions corresponding to the selected SSB permitted by the restrictions given by the ra-ssb-OccasionMaskIndex if configured (the MAC entity of the wireless device may select a PRACH occasion randomly with equal probability amongst the PRACH occasions occurring simultaneously but on different subcarriers, corresponding to the selected SSB; the MAC entity may take into account the possible occurrence of measurement gaps when determining the next available PRACH occasion corresponding to the selected SSB).

In an example, if a CSI-RS is selected above and an association between PRACH occasions and CSI-RSs is configured. a wireless device may determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).

In an example, if a CSI-RS is selected above and there is no contention-free Random Access Resource associated with the selected CSI-RS, a wireless device may determine the next available PRACH occasion from the PRACH occasions, permitted by the restrictions given by the ra-ssb-OccasionMaskIndex if configured, corresponding to the SSB in candidateBeamRSList which is quasi-collocated with the selected CSI-RS (the MAC entity may take into account the possible occurrence of measurement gaps when determining the next available PRACH occasion corresponding to the SSB which is quasi-collocated with the selected CSI-RS).

For example, a wireless device may determine the next available PRACH occasion (the MAC entity shall select a PRACH occasion randomly with equal probability amongst the PRACH occasions occurring simultaneously but on different subcarriers; the MAC entity may take into account the possible occurrence of measurement gaps when determining the next available PRACH occasion).

For example, based on a selected PREABLE INDEX and PRACH occasion, a wireless device may perform the random access preamble transmission. For example, if the notification of suspending power ramping counter has not been received from lower layers; and/or if SSB selected is not changed (i.e. same as the previous Random Access Preamble transmission), a wireless device may increment PREAMBLE_POWER_RAMPING_COUNTER by 1. the wireless device may select a value of DELTA_PREAMBLE that may be predefined and/or semi-statistically configured by a base station and set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP. The wireless device may instruct the physical layer to transmit the Random Access Preamble using the selected PRACH, corresponding RA-RNTI (if available), PREAMBLE_INDEX and PREAMBLE_RECEIVED_TARGET_POWER. For example, the wireless device may compute an RA-RNTI associated with the PRACH occasion in which the Random Access Preamble is transmitted, e.g., The RA-RNTI associated with the PRACH in which the Random Access Preamble is transmitted, may be computed as:

$$RA\text{-}RNTI = 1 + s\_id + 14 \times t\_id + 14 \times 80 \times f\_id + 14 \times 80 \times 8 \times ul\_carrier\_id$$

where s_id is the index of the first OFDM symbol of the specified PRACH (0≤s_id<14), t_id is the index of the first slot of the specified PRACH in a system frame (0≤t_id<80), f_id is the index of the specified PRACH in the frequency domain (0≤f_id<8), and ul_carrier_id is the UL carrier used for Msg1 transmission (0 for NUL carrier, and 1 for SUL carrier).

Figure 16:
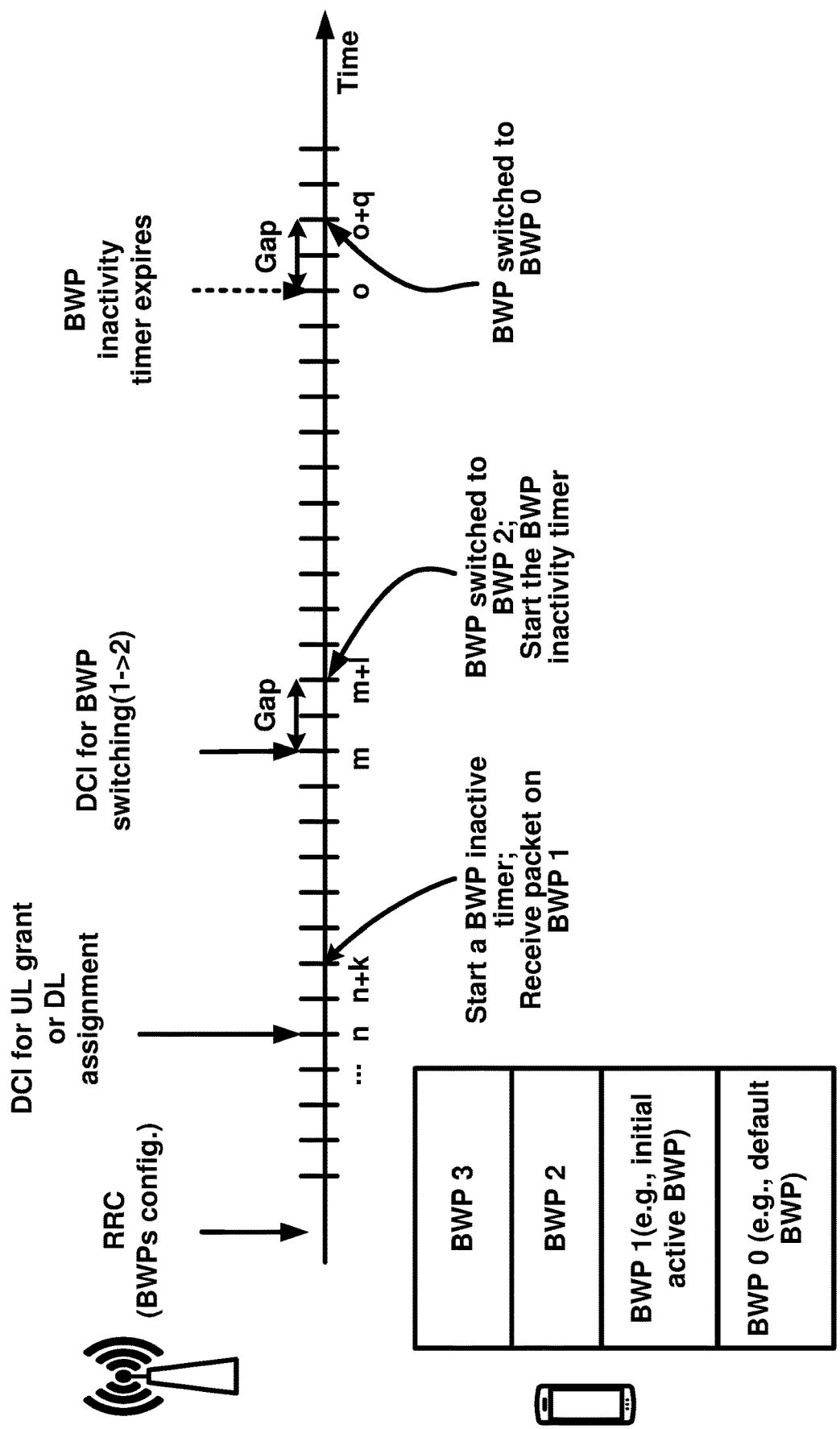
FIG. 16 is an example of a BWP operation as per an aspect of an embodiment of the present disclosure.

FIG. 16 shows an example of a BWP operation on a PCell.

Figure 17:
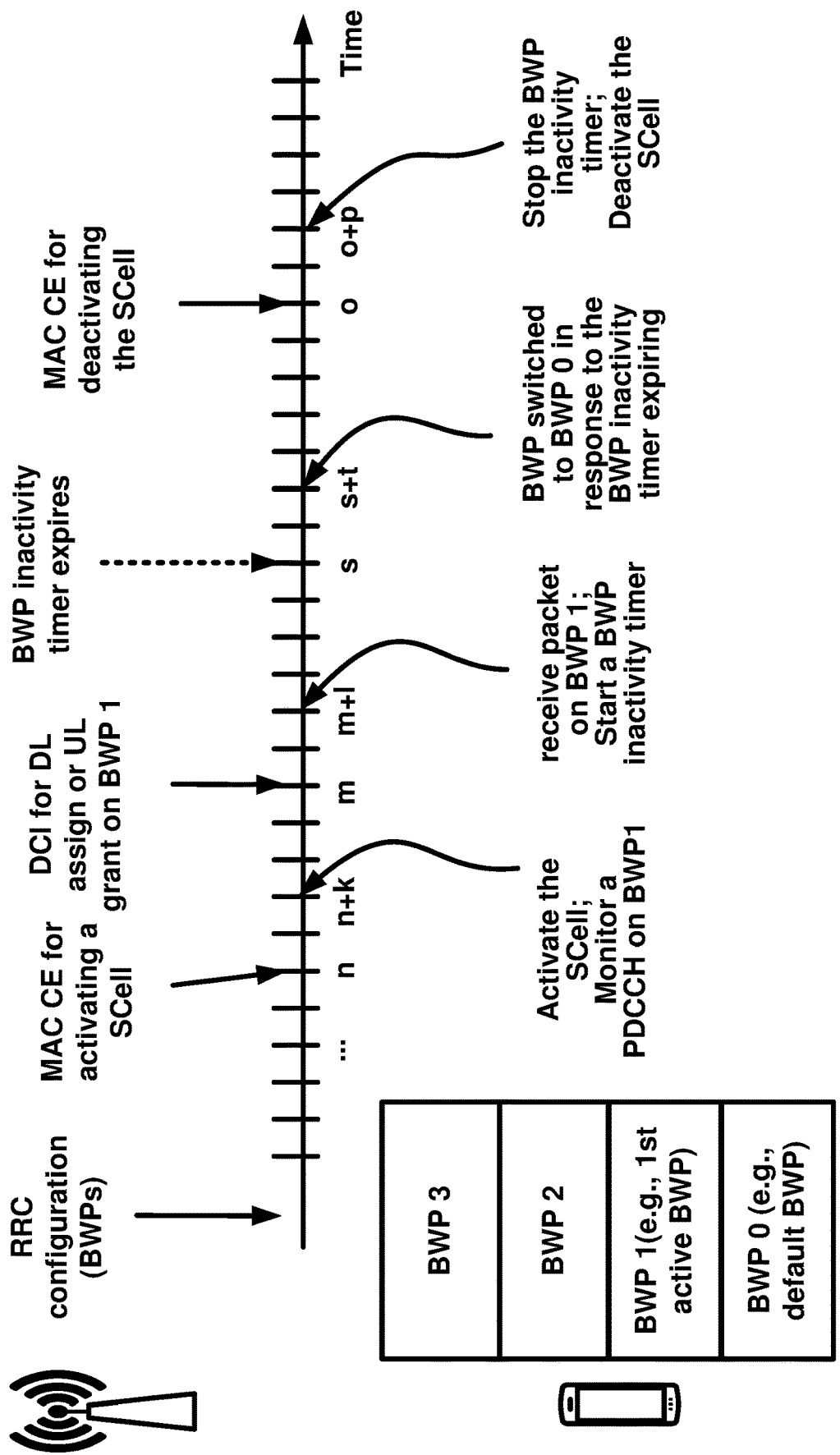
FIG. 17 is an example of a BWP operation as per an aspect of an embodiment of the present disclosure.

FIG. 17 shows an example of a BWP operation on an SCell.

In an example, with Bandwidth Adaptation (BA), a receive and a transmit bandwidth of a wireless device may not be as large as a bandwidth of a cell. The receive bandwidth and/or the transmit bandwidth of the wireless device may be adjusted. In an example, the width of the receive bandwidth and/or the transmit bandwidth may be ordered to change (e.g. or to shrink during period of low activity to save power). In an example, the location of the receive bandwidth and/or the transmit bandwidth may move in the frequency domain (e.g. to increase scheduling flexibility). In an example, the subcarrier spacing of the receive bandwidth and/or the transmit bandwidth may be ordered to change (e.g. to allow different services). A subset of the total cell bandwidth of a cell may be referred to as a Bandwidth Part (BWP). The BA may be achieved by configuring the wireless device with one or more BWPs and telling the wireless device which of the configured one or more BWPs is currently the active BWP.

A base station (gNB) may configure a wireless device (UE) with uplink (UL) bandwidth parts (BWPs) and downlink (DL) BWPs to enable bandwidth adaptation (BA) on a PCell. If carrier aggregation is configured, the gNB may configure the UE with at least DL BWP(s) (i.e. there may be no UL BWPS in the UL) to enable BA on an SCell.

In an example, in FIG. 16, for the PCell, an initial BWP may be a BWP used for initial access. In an example, the wireless device may operate on the initial BWP (e.g., initial UL/DL BWP) during the initial access.

In an example, in FIG. 17, for the SCell, an initial BWP may be a BWP configured for the UE to first operate at the SCell when the SCell is activated. In an example, in response to the SCell being activated, the wireless device may operate on the initial BWP.

In an example, a base station may configure a wireless device with one or more BWPs. In paired spectrum (e.g. FDD), a wireless device may switch a first DL BWP and a first UL BWP of the one or more BWPs independently. In unpaired spectrum (e.g. TDD), a wireless device may switch a second DL BWP and a second UL BWP of the one or more BWPs simultaneously. Switching between the configured one or more BWPs may happen via a DCI or an inactivity timer (e.g., BWP inactivity timer). In an example, when the inactivity timer is configured for a serving cell, an expiry of the inactivity timer associated to that cell may switch an active BWP of the serving cell to a default BWP. The default BWP may be configured by the network.

In an example, for FDD systems, when configured with BA, one UL BWP for each uplink carrier (e.g., SUL, NUL) and one DL BWP may be active at a time in an active serving cell. BWPs other than the one UL BWP and the one DL BWP that the UE may be configured with may be deactivated.

In an example, for TDD systems, one DL/UL BWP pair may be active at a time in an active serving cell. BWPs other than the one DL/UL BWP pair that the UE may be configured with may be deactivated.

In an example, operating on the one UL BWP and the one DL BWP (or the one DL/UL pair) may enable reasonable UE battery consumption. On deactivated BWPs, the UE may not monitor PDCCH, may not transmit on PUCCH, PRACH and UL-SCH.

In an example, when configured with BA, a wireless device may monitor a first PDCCH on an active BWP of a serving cell. In an example, the wireless device may not monitor a second PDCCH on an entire DL frequency/bandwidth of the cell. In an example, the wireless device may not monitor the second PDCCH on deactivated BWPs. In an example, a BWP inactivity timer may be used to switch the active BWP to a default BWP of the serving cell. In an example, the wireless device may (re)-start the BWP inactivity timer in response to successful PDCCH decoding on the serving cell. In an example, the wireless device may switch to the default BWP in response to an expiry of the BWP inactivity timer.

In an example, a wireless device may be configured with one or more BWPs for a serving cell (e.g., PCell, SCell). In an example, the serving cell may be configured with at most a first number (e.g., four) BWPs (e.g., BWP0-BWP3 in FIG. 16 and FIG. 17). In an example, for an activated serving cell, there may be one active BWP at any point in time.

In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by an inactivity timer (e.g. bwp-InactivityTimer). In an example, the BWP switching may be controlled by a MAC entity in response to initiating a Random Access procedure. In an example, the BWP switching may be controlled by an RRC signaling.

In an example, in response to RRC (re-)configuration of firstActiveDownlinkBWP-Id (e.g., included in RRC signaling) and/or firstActiveUplinkBWP-Id (e.g., included in RRC signaling) for a serving cell (e.g., SpCell), the wireless device may activate a DL BWP indicated by the firstActiveDownlinkBWP-Id and/or an UL BWP indicated by the firstActiveUplinkBWP-Id, respectively without receiving a PDCCH indicating a downlink assignment or an uplink grant. In an example, in response to an activation of an SCell, the wireless device may activate a DL BWP indicated by the firstActiveDownlinkBWP-Id and/or an UL BWP indicated by the firstActiveUplinkBWP-Id, respectively without receiving a PDCCH indicating a downlink assignment or an uplink grant.

In an example, an active BWP for a serving cell may be indicated by RRC signaling and/or PDCCH. In an example, for unpaired spectrum (e.g., time-division-duplex (TDD)), a DL BWP may be paired with a UL BWP, and BWP switching may be common (e.g., simultaneous) for the UL BWP and the DL BWP.

In an example, for an active BWP of an activated serving cell (e.g., PCell, SCell) configured with one or more BWPs, a wireless device may perform, on the active BWP, at least one of: transmitting on UL-SCH on the active BWP; transmitting on RACH on the active BWP if PRACH occasions are configured; monitoring a PDCCH on the active BWP; transmitting, if configured, PUCCH on the active BWP; reporting CSI for the active BWP; transmitting, if configured, SRS on the active BWP; receiving DL-SCH on the active BWP; (re-) initializing any suspended configured uplink grants of configured grant Type 1 on the active BWP according to a stored configuration, if any, and to start in a symbol based on some procedures.

In an example, for a deactivated BWP of an activated serving cell configured with one or more BWPs, a wireless device may not perform at least one of: transmitting on UL-SCH on the deactivated BWP; transmitting on RACH on the deactivated BWP; monitoring a PDCCH on the deactivated BWP; transmitting PUCCH on the deactivated BWP; reporting CSI for the deactivated BWP; transmitting SRS on the deactivated BWP, receiving DL-SCH on the deactivated BWP. In an example, for a deactivated BWP of an activated serving cell configured with one or more BWPs, a wireless device may clear any configured downlink assignment and configured uplink grant of configured grant Type 2 on the deactivated BWP; may suspend any configured uplink grant of configured Type 1 on the deactivated (or inactive) BWP.

In an example, a wireless device may initiate a random-access procedure (e.g., contention-based random access, contention-free random access) on a serving cell (e.g., PCell, SCell).

In an example, the base station may configure PRACH occasions for an active UL BWP of the serving cell of the wireless device. In an example, the active UL BWP may be identified with an uplink BWP ID (e.g., bwp-Id configured by higher layers (RRC)). In an example, the serving cell may be an SpCell. In an example, an active DL BWP of the serving cell of the wireless device may be identified with a downlink BWP ID (e.g., bwp-Id configured by higher layers (RRC)). In an example, the uplink BWP ID may be different from the downlink BWP ID. In an example, when the wireless device initiates the random-access procedure and the base station configures PRACH occasions for the active UL BWP and the serving cell is an SpCell, in response to the downlink BWP ID of the active DL BWP being different from the uplink BWP ID of the active UL BWP, a MAC entity of the wireless device may switch from the active DL BWP to a DL BWP, of the serving cell, identified with a second downlink BWP ID. In an example, the switching from the active DL BWP to the DL BWP may comprise setting the DL BWP as a second active DL BWP of the serving cell. In an example, the second downlink BWP ID may be the same as the uplink BWP ID. In response to the switching, the MAC entity may perform the random-access procedure on the DL BWP (e.g., the second active DL BWP) of the serving cell (e.g., SpCell) and the active UL BWP of the serving cell. In an example, in response to the initiating the random-access procedure, the wireless device may stop, if running, a BWP inactivity timer (e.g., bwp-InactivityTimer configured by higher layers (RRC)) associated with the DL BWP of the serving cell.

In an example, the base station may configure PRACH occasions for an active UL BWP of the serving cell of the wireless device. In an example, the serving cell may not be an SpCell. In an example, the serving cell may be an SCell. In an example, when the wireless device initiates the random-access procedure and the base station configures PRACH occasions for the active UL BWP and the serving cell is not an SpCell, a MAC entity of the wireless device may perform the random-access procedure on a first active DL BWP of an SpCell (e.g., PCell) and the active UL BWP of the serving cell. In an example, in response to the initiating the random-access procedure, the wireless device may stop, if running, a second BWP inactivity timer (e.g., bwp-InactivityTimer configured by higher layers (RRC)) associated with a second active DL BWP of the serving cell. In an example, in response to the initiating the random-access procedure and the serving cell being the SCell, the wireless device may stop, if running, a first BWP inactivity timer (e.g., bwp-InactivityTimer configured by higher layers (RRC)) associated with the first active DL BWP of the SpCell.

In an example, the base station may not configure PRACH occasions for an active UL BWP of the serving cell of the wireless device. In an example, when the wireless device initiates the random-access procedure on the serving cell, in response to the PRACH occasions not being configured for the active UL BWP of the serving cell, a MAC entity of the wireless device may switch from the active UL BWP to an uplink BWP (initial uplink BWP) of the serving cell. In an example, the uplink BWP may be indicated by an RRC signaling (e.g., initialUplinkBWP). In an example, the switching from the active UL BWP to the uplink BWP may comprise setting the uplink BWP as a current active UL BWP of the serving cell. In an example, the serving cell may be an SpCell. In an example, when the wireless device initiates the random-access procedure on the serving cell and the PRACH occasions are not configured for the active UL BWP of the serving cell, in response to the serving cell being an SpCell, the MAC entity may switch from an active DL BWP of the serving cell to a downlink BWP (e.g., initial downlink BWP) of the serving cell. In an example, the downlink BWP may be indicated by an RRC signaling (e.g., initialDownlinkBWP). In an example, the switching from the active DL BWP to the downlink BWP may comprise setting the downlink BWP as a current active DL BWP of the serving cell. In response to the switching, the MAC entity may perform the random-access procedure on the uplink BWP of the serving cell and the downlink BWP of the serving cell. In an example, in response to the initiating the random-access procedure, the wireless device may stop, if running, a BWP inactivity timer (e.g., bwp-InactivityTimer configured by higher layers (RRC)) associated with the downlink BWP (e.g., the current active DL BWP) of the serving cell.

In an example, the base station may not configure PRACH occasions for an active UL BWP of the serving cell (e.g., SCell) of the wireless device. In an example, when the wireless device initiates the random-access procedure on the serving cell, in response to the PRACH occasions not being configured for the active UL BWP of the serving cell, a MAC entity of the wireless device may switch from the active UL BWP to an uplink BWP (initial uplink BWP) of the serving cell. In an example, the uplink BWP may be indicated by an RRC signaling (e.g., initialUplinkBWP). In an example, the switching from the active UL BWP to the uplink BWP may comprise setting the uplink BWP as a current active UL BWP of the serving cell. In an example, the serving cell may not be an SpCell. In an example, the serving cell may be an SCell. In an example, in response to the serving cell not being the SpCell, the MAC entity may perform the random-access procedure on the uplink BWP of the serving cell and an active downlink BWP of an SpCell. In an example, in response to the initiating the random-access procedure, the wireless device may stop, if running, a second BWP inactivity timer (e.g., bwp-InactivityTimer configured by higher layers (RRC)) associated with a second active DL BWP of the serving cell. In an example, in response to the initiating the random-access procedure and the serving cell being the SCell, the wireless device may stop, if running, a first BWP inactivity timer (e.g., bwp-InactivityTimer configured by higher layers (RRC)) associated with the active DL BWP of the SpCell.

In an example, a MAC entity of a wireless device may receive a PDCCH for a BWP switching (e.g., UL BWP and/or DL BWP switching) of a serving cell. In an example, there may not be an ongoing random-access procedure associated with the serving cell when the MAC entity receives the PDCCH. In an example, in response to not being an ongoing random-access procedure associated with the serving cell when the MAC entity receives the PDCCH for the BWP switching of the serving cell, the MAC entity may perform the BWP switching to a BWP, of the serving cell, indicated by the PDCCH.

In an example, a MAC entity of a wireless device may receive a PDCCH for a BWP switching (e.g., UL BWP and/or DL BWP switching) of a serving cell. In an example, the PDCCH may be addressed to C-RNTI of the wireless device. In an example, there may be an ongoing random-access procedure associated with the serving cell. In an example, the wireless device may complete the ongoing random-access procedure associated with the serving cell (successfully) in response to the receiving the PDCCH addressed to the C-RNTI. In an example, in response to the completing the ongoing random-access procedure associated with the serving cell (successfully), the MAC entity may perform the BWP switching to a BWP, of the serving cell, indicated by the PDCCH.

In an example, a MAC entity of a wireless device may receive a PDCCH for a BWP switching (e.g., UL BWP and/or DL BWP switching) for a serving cell. In an example, there may be an ongoing random-access procedure associated with the serving cell in the MAC entity when the MAC entity receives the PDCCH. In an example, in response to being an ongoing random-access procedure associated with the serving cell when the MAC entity receives the PDCCH for the BWP switching of the serving cell, it may be up to UE implementation whether to perform the BWP switching or ignore the PDCCH for the BWP switching.

In an example, the MAC entity may perform the BWP switching in response to the receiving the PDCCH for the BWP switching (other than successful contention resolution for the random-access procedure). In an example, the performing the BWP switching may comprise switching to a BWP indicated by the PDCCH. In an example, in response to the performing the BWP switching, the MAC entity may stop the ongoing random access procedure and may initiate a second random-access procedure after the performing the BWP switching.

In an example, the MAC entity may ignore the PDCCH for the BWP switching. In an example, in response to the ignoring the PDCCH for the BWP switching, the MAC entity may continue with the ongoing random access procedure on the serving cell.

In an example, a base station may configure an activated serving cell of a wireless device with a BWP inactivity timer.

In an example, the base station may configure the wireless device with a default DL BWP ID for the activated serving cell (e.g., via RRC signaling including defaultDownlinkBWP-Id parameter). In an example, an active DL BWP of the activated serving cell may not be a BWP indicated by the default DL BWP ID.

In an example, the base station may not configure the wireless device with a default DL BWP ID for the activated serving cell (e.g., via RRC signaling including defaultDownlinkBWP-Id parameter). In an example, an active DL BWP of the activated serving cell may not be an initial downlink BWP (e.g., via RRC signaling including initialDownlinkBWP parameter) of the activated serving cell.

In an example, when the base station configures the wireless device with the default DL BWP ID and the active DL BWP of the activated serving cell is not the BWP indicated by the default DL BWP ID; or when the base station does not configure the wireless device with the default DL BWP ID and the active DL BWP is not the initial downlink BWP, the wireless device may start or restart the BWP inactivity timer associated with the active DL BWP of the activated serving cell in response to receiving a PDCCH, on the active DL BWP, indicating a downlink assignment or an uplink grant (e.g., at time n+k in FIG. 16, m+l in FIG. 17). In an example, the PDCCH may be addressed to C-RNTI. In an example, the PDCCH may be addressed to CS-RNTI.

In an example, when the base station configures the wireless device with the default DL BWP ID and the active DL BWP of the activated serving cell is not the BWP indicated by the default DL BWP ID; or when the base station does not configure the wireless device with the default DL BWP ID and the active DL BWP is not the initial downlink BWP, the wireless device may start or restart the BWP inactivity timer associated with the active DL BWP of the activated serving cell in response to receiving a PDCCH, for the active DL BWP, indicating a downlink assignment or an uplink grant. In an example, the PDCCH may be addressed to C-RNTI. In an example, the PDCCH may be addressed to CS-RNTI.

In an example, the wireless device may receive the PDCCH when there is no ongoing random-access procedure associated with the activated serving cell. In an example, the wireless device may receive the PDCCH when there is an ongoing random-access procedure associated with the activated serving cell and the ongoing random-access procedure is completed successfully in response to the receiving the PDCCH addressed to a C-RNTI of the wireless device.

In an example, when the base station configures the wireless device with the default DL BWP ID and the active DL BWP of the activated serving cell is not the BWP indicated by the default DL BWP ID; or when the base station does not configure the wireless device with the default DL BWP ID and the active DL BWP is not the initial downlink BWP, the wireless device may start or restart the BWP inactivity timer associated with the active DL BWP of the activated serving cell in response to transmitting a first MAC PDU in a configured uplink grant or receiving a second MAC PDU in a configured downlink assignment.

In an example, the wireless device may transmit the first MAC PDU and/or receive the second MAC PDU when there is no ongoing random-access procedure associated with the activated serving cell.

In an example, the BWP inactivity timer associated with the active DL BWP of the activated serving cell may expire (e.g., at time o in FIG. 16, at time s in FIG. 17).

In an example, the base station may configure the wireless device with the default DL BWP ID. In an example, when the base station configures the wireless device with the default DL BWP ID, in response to the BWP inactivity timer expiring, a MAC entity of the wireless device may perform BWP switching to a BWP indicated by the default DL BWP ID.

In an example, the base station may not configure the wireless device with the default DL BWP ID. In an example, when the base station does not configure the wireless device with the default DL BWP ID, in response to the BWP inactivity timer expiring, a MAC entity of the wireless device may perform BWP switching to the initial downlink BWP (e.g., initialDownlinkBWP in RRC signaling).

In an example, a wireless device may initiate a random-access procedure on a secondary cell (e.g., SCell). In an example, the wireless device may monitor for a random-access response for the random-access procedure on a SpCell. In an example, when the wireless device initiates the random-access procedure on the secondary cell, the secondary cell and the SpCell may be associated with the random-access procedure in response to the monitoring the random-access response to the SpCell.

In an example, a wireless device may receive a PDCCH for a BWP switching (e.g., UL and/or DL BWP switching). In an example, a MAC entity of the wireless device may switch from a first active DL BWP of the activated serving cell to a BWP (e.g., DL BWP) of the activated serving cell in response to the receiving the PDCCH. In an example, the switching from the first active DL BWP to the BWP may comprise setting the BWP as a current active DL BWP of the activated serving cell. In an example, the wireless device may deactivate the first active DL BWP in response to the switching.

In an example, the base station may configure the wireless device with a default DL BWP ID. In an example, the BWP may not be indicated (or identified) by the default DL BWP ID. In an example, when the base station configures the wireless device with the default DL BWP ID and the MAC entity of the wireless device switches from the first active DL BWP of the activated serving cell to the BWP, the wireless device may start or restart the BWP inactivity timer associated with the BWP (e.g., the current active DL BWP) in response to the BWP not being the default DL BWP (or the BWP not being indicated by the default DL BWP ID).

In an example, the base station may not configure the wireless device with a default DL BWP ID. In an example, the BWP may not be the initial downlink BWP of the activated serving cell. In an example, when the base station does not configure the wireless device with the default DL BWP ID and the MAC entity of the wireless device switches from the first active DL BWP of the activated serving cell to the BWP, the wireless device may start or restart the BWP inactivity timer associated with the BWP (e.g., the current active DL BWP) in response to the BWP not being the initial downlink BWP.

In an example, when configured with carrier aggregation (CA), a base station may configure a wireless device with a secondary cell (e.g., SCell). In an example, a wireless device may receive an SCell Activation/Deactivation MAC CE activating the secondary cell. In an example, the secondary cell may be deactivated prior to the receiving the SCell Activation/Deactivation MAC CE. In an example, when a wireless device receives the SCell Activation/Deactivation MAC CE activating the secondary cell, the wireless device may activate a downlink BWP of the secondary cell and activate an uplink BWP of the secondary cell in response to the secondary cell being deactivated prior to the receiving the SCell Activation/Deactivation MAC CE. In an example, the downlink BWP may be indicated by the firstActive-DownlinkBWP-Id. In an example, the uplink BWP may be indicated by the firstActiveUplinkBWP-Id.

In an example, the base station may configure a wireless device with a BWP inactivity timer for the activated secondary cell. In an example, an sCellDeactivationTimer associated with the activated secondary cell may expire. In an example, in response to the sCellDeactivationTimer expiring, the wireless device may stop the BWP inactivity timer associated with the activated secondary cell. In an example, in response to the sCellDeactivationTimer expiring, the wireless device may deactivate an active downlink BWP (e.g., and an active UL BWP if exists) associated with the activated secondary cell.

In an example, when configured for operation in bandwidth parts (BWPs) of a serving cell, a wireless device (e.g., a UE) may be configured, by higher layers with a parameter BWP-Downlink, a first set of BWPs (e.g., at most four BWPs) for receptions, by the UE, (e.g., DL BWP set) in a downlink (DL) bandwidth for the serving cell.

In an example, when configured for operation in bandwidth parts (BWPs) of a serving cell, a wireless device (e.g., a UE) may be configured, by higher layers with a parameter BWP-Uplink, a second set of BWPs (e.g., at most four BWPs) for transmissions, by the UE, (e.g., UL BWP set) in a uplink (UL) bandwidth for the serving cell.

In an example, the base station may not provide a wireless device with a higher layer parameter initialDownlinkBWP. In response to the not providing the wireless device with the higher layer parameter initialDownlinkBWP, an initial active DL BWP may be defined, for example, by a location and a number of contiguous PRBs, and a subcarrier spacing (SCS) and a cyclic prefix for PDCCH reception in a control resource set (CORESET) for Type0-PDCCH common search space (CSS) set. In an example, the contiguous PRBs may start from a first PRB with a lowest index among PRBs of the CORESET for the Type0-PDCCH CSS set.

In an example, the base station may provide a wireless device with a higher layer parameter initialDownlinkBWP. In an example, an initial active DL BWP may be provided by the higher layer parameter initialDownlinkBWP in response to the providing.

In an example, for operation on a cell (e.g., primary cell, secondary cell), a base station may provide a wireless device with an initial active UL BWP by a higher layer parameter (e.g., initialUplinkBWP). In an example, when configured with a supplementary uplink carrier (SUL), the base station may provide the wireless device with a second initial active uplink BWP on the supplementary uplink carrier by a second higher layer parameter (e.g., initialUplinkBWP in supplementaryUplink).

In an example, a wireless device may have a dedicated BWP configuration.

In an example, in response to the wireless device having the dedicated BWP configuration, the wireless device may be provided by a higher layer parameter (e.g., firstActive-DownlinkBWP-Id). The higher layer parameter may indicate a first active DL BWP for receptions.

In an example, in response to the wireless device having the dedicated BWP configuration, the wireless device may be provided by a higher layer parameter (e.g., firstActiveUplinkBWP-Id). The higher layer parameter may indicate a first active UL BWP for transmissions on a carrier (e.g., SUL, NUL) of a serving cell (e.g., primary cell, secondary cell).

In an example, for a DL BWP in a first set of BWPs or an UL BWP in a second set of BWPs, a base station may configure a wireless device for a serving cell with at least one of: a subcarrier spacing provided by a higher layer parameter subcarrierSpacing; a cyclic prefix provided by a higher layer parameter cyclicPrefix; an index in the first set of BWPs or in the second set of BWPs by a higher layer parameter bwp-Id (e.g., bwp-Id); a third set of BWP-common and a fourth set of BWP-dedicated parameters by a higher layer parameter bwp-$N_{BWP}^{start}=O_{carrier}+RB_{start}$ In an example, a DL BWP index of a DL BWP may be same as an UL BWP index of an UL BWP. In an example, for an unpaired spectrum operation, a wireless device may not expect to receive a configuration (e.g., RRC configuration), where a first center frequency for the DL BWP is different from a second center frequency for the UL BWP in response to the DL BWP index of the DL BWP being the same as the UL BWP index of the UL BWP.

In an example, for a DL BWP in a first set of BWPs on a serving cell (e.g., primary cell), a base station may configure a wireless device with one or more control resource sets (CORESETs) for every type of common search space (CSS) sets and for UE-specific search space (USS). In an example, the wireless device may not expect to be configured without a common search space set on a primary cell (or on the PSCell), in an active DL BWP.

In an example, a base station may provide a wireless device with a higher layer parameter controlResourceSetZero and a higher layer parameter searchSpaceZero in a higher layer parameter PDCCH-ConfigSIB1 or a higher layer parameter PDCCH-ConfigCommon. In an example, in response to the providing, the wireless device may determine a CORESET for a search space set from the higher layer parameter controlResourcesetZero, and may determine corresponding PDCCH monitoring occasions. An active DL BWP of a serving cell may not be an initial DL BWP of the serving cell. When the active DL BWP is not the initial DL BWP of the serving cell, the wireless device may determine the PDCCH monitoring occasions for the search space set in response to a bandwidth of the CORESET being within the active DL BWP and the active DL BWP having the same SCS configuration and same cyclic prefix as the initial DL BWP.

In an example, for an UL BWP in a second set of BWPs of a serving cell (e.g., primary cell or PUCCH SCell), a base station may configure a wireless device with one or more resource sets (e.g., time-frequency resources/occasions) for PUCCH transmissions.

In an example, a UE may receive PDCCH and PDSCH in a DL BWP according to a configured subcarrier spacing and CP length for the DL BWP.

In an example, a UE may transmit PUCCH and PUSCH in an UL BWP according to a configured subcarrier spacing and CP length for the UL BWP.

In an example, a bandwidth part indicator field may be configured in a DCI format (e.g., DCI format 1_1). In an example, a value of the bandwidth part indicator field may indicate an active DL BWP, from a first set of BWPs, for one or more DL receptions. In an example, the bandwidth part indicator field may indicate a DL BWP different from the active DL BWP. In an example, in response to the bandwidth part indicator field indicating the DL BWP different from the active DL BWP, the wireless device may set the DL BWP as a current active DL BWP. In an example, the setting the DL BWP as a current active DL BWP may comprise activating the DL BWP and deactivating the active DL BWP.

In an example, a bandwidth part indicator field may be configured in a DCI format (e.g., DCI format 0_1). In an example, a value of the bandwidth part indicator field may indicate an active UL BWP, from a second set of BWPs, for one or more UL transmissions. In an example, the bandwidth part indicator field may indicate an UL BWP different from the active UL BWP. In an example, in response to the bandwidth part indicator field indicating the UL BWP different from the active UL BWP, the wireless device may set the UL BWP as a current active UL BWP. In an example, the setting the UL BWP as a current active UL BWP may comprise activating the UL BWP and deactivating the active UL BWP.

In an example, a DCI format (e.g., DCI format 1_1) indicating an active DL BWP change may comprise a time domain resource assignment field. The time domain resource assignment field may provide a slot offset value for a PDSCH reception. In an example, the slot offset value may be smaller than a delay required by a wireless device for the active DL BWP change. In an example, in response to the slot offset value being smaller than the delay required by the wireless device for the active DL BWP change, the wireless device may not expect to detect the DCI format indicating the active DL BWP change.

In an example, a DCI format (e.g., DCI format 0_1) indicating an active UL BWP change may comprise a time domain resource assignment field. The time domain resource assignment field may provide a slot offset value for a PUSCH transmission. In an example, the slot offset value may be smaller than a delay required by a wireless device for the active UL BWP change. In an example, in response to the slot offset value being smaller than the delay required by the wireless device for the active UL BWP change, the wireless device may not expect to detect the DCI format indicating the active UL BWP change.

In an example, a wireless device may receive a PDCCH in a slot of a scheduling cell. In an example, the wireless device may detect a DCI format (e.g., DCI format 1_1), in the PDCCH of the scheduling cell, indicating an active DL BWP change for a serving cell. In an example, the DCI format may comprise a time domain resource assignment field. The time domain resource assignment field may provide a slot offset value for a PDSCH transmission. In an example, the slot offset value may indicate a second slot. In an example, in response to the detecting the DCI format indicating the active DL BWP change, the wireless device may not be required to receive or transmit in the serving cell during a time duration from the end of a third symbol of the slot until the beginning of the second slot.

In an example, a wireless device may receive a PDCCH in a slot of a scheduling cell. In an example, the wireless device may detect a DCI format (e.g., DCI format 0_1), in the PDCCH of the scheduling cell, indicating an active UL BWP change for a serving cell. In an example, the DCI format may comprise a time domain resource assignment field. The time domain resource assignment field may provide a slot offset value for a PUSCH transmission. In an example, the slot offset value may indicate a second slot. In an example, in response to the detecting the DCI format indicating the active UL BWP change, the wireless device may not be required to receive or transmit in the serving cell during a time duration from the end of a third symbol of the slot until the beginning of the second slot.

In an example, a UE may expect to detect a DCI format 0_1 indicating active UL BWP change/switch, or a DCI format 1_1 indicating active DL BWP change/switch, when a corresponding PDCCH for the detected DCI format 0_1 or the detected DCI format 1_1 is received within first 3 symbols of a slot. In an example, a UE may not expect to detect a DCI format 0_1 indicating active UL BWP change/switch, or a DCI format 1_1 indicating active DL BWP change/switch, if a corresponding PDCCH is received after first 3 symbols of a slot.

In an example, an active DL BWP change may comprise switching from the active DL BWP of a serving cell to a DL BWP of the serving cell. In an example, the switching from the active DL BWP to the DL BWP may comprise setting the DL BWP as a current active DL BWP and deactivating the active DL BWP.

In an example, an active UL BWP change may comprise switching from the active UL BWP of a serving cell to a UL BWP of the serving cell. In an example, the switching from the active UL BWP to the UL BWP may comprise setting the UL BWP as a current active UL BWP and deactivating the active UL BWP.

In an example, for a serving cell (e.g., PCell, SCell), a base station may provide a wireless device with a higher layer parameter defaultDownlinkBWP-Id. In an example, the higher layer parameter defaultDownlinkBWP-Id may indicate a default DL BWP among the first set of (configured) BWPs of the serving cell.

In an example, a base station may not provide a wireless device with a higher layer parameter defaultDownlinkBWP-Id. In response to not being provided by the higher layer parameter defaultDownlinkBWP-Id, the wireless device may set the initial active DL BWP as a default DL BWP. In an example, in response to not being provided by the higher layer parameter defaultDownlinkBWP-Id, the default DL BWP may be the initial active DL BWP.

In an example, a base station may provide a wireless device with a higher layer parameter BWP-InactivityTimer. In an example, the higher layer parameter BWP-InactivityTimer may indicate a BWP inactivity timer with a timer value for a serving cell (e.g., primary cell, secondary cell). In an example, when provided with the higher layer parameter BWP-InactivityTimer and the BWP inactivity timer is running, the wireless device may decrement the BWP inactivity timer at the end of a subframe for frequency range 1 (e.g., FR1, sub-6 GHz) or at the end of a half subframe for frequency range 2 (e.g., FR2, millimeter-waves) in response to not restarting the BWP inactivity timer during an interval of the subframe for the frequency range 1 or an interval of the half subframe for the frequency range 2.

In an example, a wireless device may perform an active DL BWP change for a serving cell in response to an expiry of a BWP inactivity timer associated with the serving cell. In an example, the wireless device may not be required to receive or transmit in the serving cell during a time duration from the beginning of a subframe for frequency range 1 or of half of a subframe for frequency range 2. The time duration may start/be immediately after the expiry of the BWP inactivity timer and may last until the beginning of a slot where the wireless device can receive and/or transmit.

In an example, a base station may provide a wireless device with a higher layer parameter firstActiveDownlinkBWP-Id of a serving cell (e.g., secondary cell). In an example, the higher layer parameter firstActiveDownlinkBWP-Id may indicate a DL BWP on the serving cell (e.g., secondary cell). In an example, in response to the being provided by the higher layer parameter firstActiveDownlinkBWP-Id, the wireless device may use the DL BWP as a first active DL BWP on the serving cell.

In an example, a base station may provide a wireless device with a higher layer parameter firstActiveUplinkBWP-Id on a carrier (e.g., SUL, NUL) of a serving cell (e.g., secondary cell). In an example, the higher layer parameter firstActiveUplinkBWP-Id may indicate an UL BWP. In an example, in response to the being provided by the higher layer parameter firstActiveUplinkBWP-Id, the wireless device may use the UL BWP as a first active UL BWP on the carrier of the serving cell.

In an example, for paired spectrum operation, a UE may not expect to transmit a PUCCH with HARQ-ACK information on a PUCCH resource indicated by a DCI format 1_0 or a DCI format 1_1 if the UE changes its active UL BWP on a primary cell between a time of a detection of the DCI format 1_0 or the DCI format 1_1 and a time of a corresponding PUCCH transmission with the HARQ-ACK information.

In an example, a UE may not monitor PDCCH when the UE performs RRM measurements over a bandwidth that is not within the active DL BWP for the UE.

In an example, a DL BWP index (ID) may be an identifier for a DL BWP. One or more parameters in an RRC configuration may use the DL BWP-ID to associate the one or more parameters with the DL BWP. In an example, the DL BWP ID=0 may be associated with the initial DL BWP.

In an example, an UL BWP index (ID) may be an identifier for an UL BWP. One or more parameters in an RRC configuration may use the UL BWP-ID to associate the one or more parameters with the UL BWP. In an example, the UL BWP ID=0 may be associated with the initial UL BWP.

If a higher layer parameter firstActiveDownlinkBWP-Id is configured for an SpCell, a higher layer parameter firstActiveDownlinkBWP-Id indicates an ID of a DL BWP to be activated upon performing the reconfiguration.

If a higher layer parameter firstActiveDownlinkBWP-Id is configured for an SCell, a higher layer parameter firstActiveDownlinkBWP-Id indicates an ID of a DL BWP to be used upon MAC-activation of the SCell.

If a higher layer parameter firstActiveUplinkBWP-Id is configured for an SpCell, a higher layer parameter firstActiveUplinkBWP-Id indicates an ID of an UL BWP to be activated upon performing the reconfiguration.

If a higher layer parameter firstActiveUplinkBWP-Id is configured for an SCell, a higher layer parameter firstActiveUplinkBWP-Id indicates an ID of an UL BWP to be used upon MAC-activation of the SCell.

In an example, a wireless device, to execute a reconfiguration with sync, may consider an uplink BWP indicated in a higher layer parameter firstActiveUplinkBWP-Id to be an active uplink BWP.

In an example, a wireless device, to execute a reconfiguration with sync, may consider a downlink BWP indicated in a higher layer parameter firstActiveDownlinkBWP-Id to be an active downlink BWP.

Figure 18:
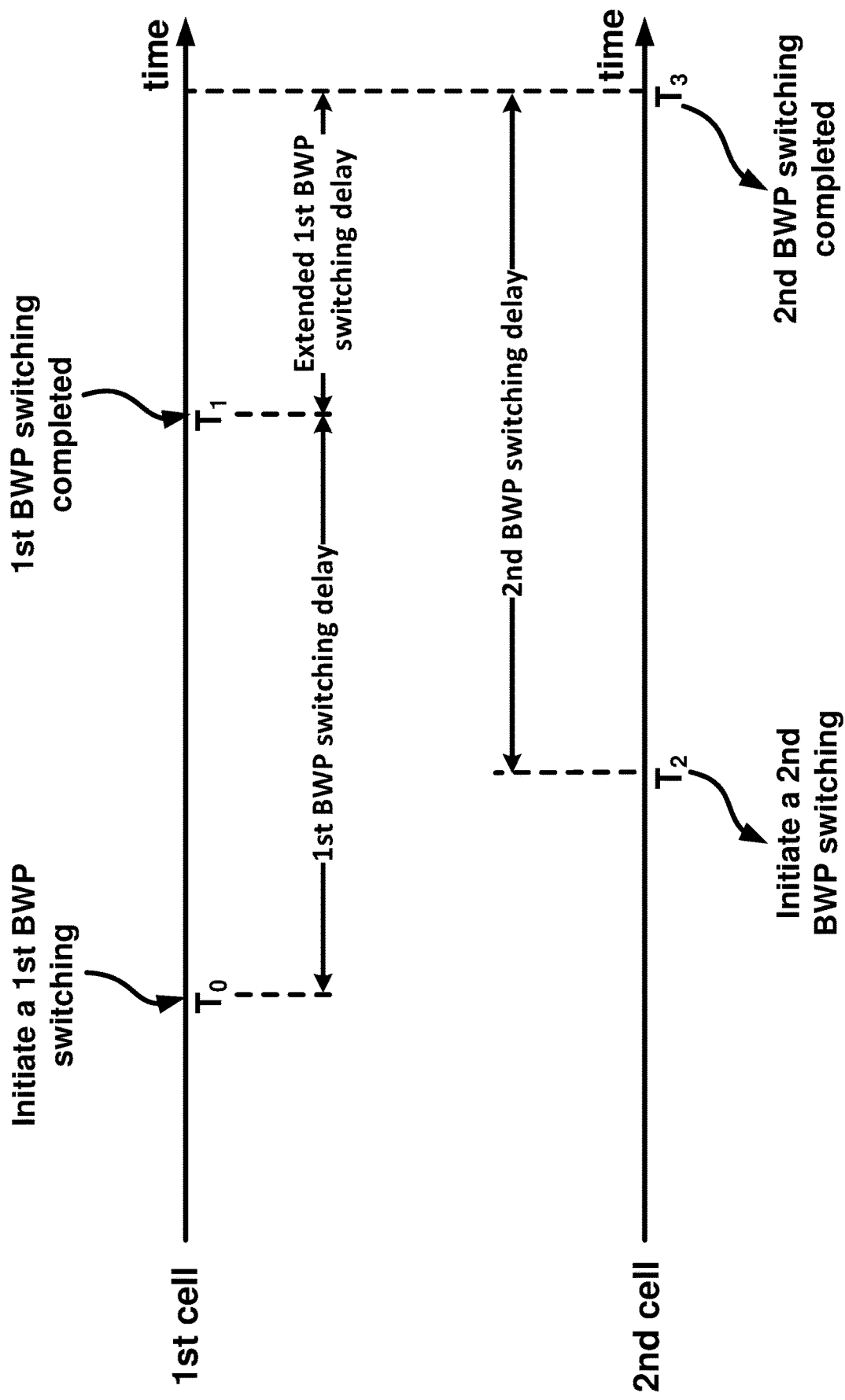
FIG. 18 is an example of a BWP operation as per an aspect of an embodiment of the present disclosure.

FIG. 18 shows an example of a BWP operation as per an aspect of an embodiment of the present disclosure.

In an example, a wireless device may receive, from a base station, one or more configuration parameters for one or more cells. The one or more cells may comprise a first cell (e.g., PCell, SCell) and a second cell (e.g., PCell, SCell).

In an example, the one or more configuration parameters may indicate cell-specific indices (e.g., provided by a higher layer parameter servCellIndex) for the one or more cells. In an example, each cell of the one or more cells may be identified by a respective one cell-specific index of the cell-specific indices. In an example, the first cell (e.g., First cell in FIG. 18) may be identified by a first cell-specific index. In an example, the second cell (e.g., Second cell in FIG. 18) may be identified by a second cell-specific index.

In an example, the first cell and the second cell may be the same. In an example, the first cell and the second cell being the same may comprise that the first cell-specific index of the first cell and the second cell-specific index of the second cell may be the same.

In an example, the first cell and the second cell may be different. In an example, the first cell and the second cell being different may comprise that the first cell-specific index of the first cell and the second cell-specific index of the second cell may be different.

In an example, a base station may configure a wireless device with one or more first BWPs for a first cell. In an example, the one or more first BWPs may comprise one or more first UL BWPs. In an example, the one or more first BWPs may comprise one or more first DL BWPs.

In an example, the base station may configure the wireless device with one or more second BWPs for the second cell. In an example, the one or more second BWPs may comprise one or more second UL BWPs. In an example, the one or more second BWPs may comprise one or more second DL BWPs.

In an example, the wireless device may operate on a first BWP (e.g., UL BWP, DL BWP) of the one or more first BWPs of the first cell. In an example, the operating on the first BWP may comprise setting the first BWP as a first active BWP of the first cell. In an example, the wireless device may initiate/trigger a first BWP switching for the first cell (at time T0 in FIG. 18). In an example, the first BWP switching may comprise switching from the first BWP to a second BWP (e.g., UL BWP, DL BWP) of the one or more first BWPs of the first cell. In an example, the switching from the first BWP to the second BWP may comprise activating the second BWP. In an example, the switching from the first BWP to the second BWP may comprise deactivating the first BWP (or the first active BWP of the first cell). In an example, the switching from the first BWP to the second BWP may comprise setting the second BWP as a second active BWP of the first cell.

In an example, the one or more configuration parameters may further comprise BWP specific indices for the one or more first BWPs of the first cell. In an example, each BWP of the one or more first BWPs may be identified by a respective one BWP specific index of the BWP specific indices (e.g., provided by a higher layer parameter bwp-ID in the one or more configuration parameters).

In an example, the first BWP may be identified by a first BWP specific index. The second BWP may be identified by a second BWP specific index.

In an example, the wireless device may initiate/trigger the first BWP switching in response to receiving a DCI (e.g., DCI format 1_1, DCI format 0_1) on a PDCCH on/for the first cell. In an example, a bandwidth part indicator field may be present/configured in the DCI. In an example, the PDCCH may indicate a downlink assignment or an uplink grant. In an example, the bandwidth part indicator field may indicate the second BWP. In an example, a value of the bandwidth part indicator field may be equal to the second BWP specific index. In an example, the second BWP may be different from the first BWP. In an example, the second BWP being different from the first BWP may comprise that the first BWP specific index of the first BWP may be different from the second BWP specific index of the second BWP. In an example, in response to the bandwidth part indicator field indicating the second BWP different from the first BWP, the wireless device may switch from the first BWP to the second BWP. In an example, the wireless device may set the second BWP as the second active BWP of the first cell.

In an example, the first BWP may be a first DL BWP of the one or more first DL BWPs and the second BWP may be a second DL BWP of the one or more first DL BWPs.

In an example, the first BWP may be a first UL BWP of the one or more first UL BWPs and the second BWP may be a second UL BWP of the one or more first UL BWPs.

In an example, the setting the second BWP as the second active BWP of the first cell may comprise activating the second BWP and deactivating the first active BWP (e.g., the first BWP) of the first cell.

In an example, the base station may configure the wireless device with a first BWP inactivity timer for the first cell. In an example, the first BWP inactivity timer may expire. In an example, the wireless device may initiate/trigger the first BWP switching in response to the first BWP inactivity timer expiring.

In an example, the second BWP may a default BWP (e.g., default downlink BWP) of the first cell. In an example, the second BWP being the default BWP may comprise that the second BWP may be indicated by a default DL BWP ID (e.g., via one or more configuration parameters including defaultDownlinkBWP-Id parameter) for the first cell. In an example, the second BWP being indicated by the default DL BWP ID may comprise that the second BWP specific index and the default DL BWP ID may be the same. In an example, the first BWP may be different from the second BWP. In an example, the first BWP specific index and the default DL BWP ID may be different. In an example, when the wireless device initiates/triggers the first BWP switching in response to the first BWP inactivity timer expiring, the wireless device may switch from the first BWP to the second BWP in response to the second BWP being the default BWP of the first cell.

In an example, the base station may not configure the wireless device with a default DL BWP ID (e.g., via one or more configuration parameters including defaultDownlinkBWP-Id parameter) for the first cell. In an example, the second BWP may be an initial BWP (e.g., initial downlink BWP) of the first cell. In an example, the second BWP being the initial BWP may comprise that the second BWP may be indicated by a higher layer parameter initial downlink BWP (e.g., via the one or more configuration parameters including initialDownlinkBWP parameter) for the first cell. In an example, the first BWP may be different from the second BWP. In an example, the first BWP may be different from the initial BWP. In an example, when the wireless device initiates/triggers the first BWP switching in response to the first BWP inactivity timer expiring and when the base station does not configure the default DL BWP ID for the first cell, the wireless device may switch from the first BWP to the second BWP in response to the second BWP being the initial BWP of the first cell.

In an example, the wireless device may initiate a random-access procedure (e.g., contention-based random-access procedure, contention-free random-access procedure) for the first cell. In an example, when the wireless device initiates the random-access procedure, the first BWP may be a first active DL BWP of the first cell. In an example, when the wireless device initiates the random-access procedure, a third BWP of the one or more first UL BWPs of the first cell may be a first active UL BWP of the first cell.

In an example, the third BWP may be identified by a third BWP specific index (e.g., bwp-Id configured by the one or more configuration parameters). In an example, the third BWP specific index and the first BWP specific index of the first BWP may be different. In an example, the second BWP specific index of the second BWP and the third BWP specific index may be the same. In an example, the first cell may be a SpCell (e.g., PCell). In an example, when the wireless device initiates the random-access procedure for the first cell, in response to the third BWP specific index being different from the first BWP specific index, the wireless device may initiate/trigger the first BWP switching. In an example, the initiating/triggering the first BWP switching may comprise that the wireless device may switch from the first BWP to the second BWP in response to the second BWP specific index and the third BWP specific index being the same.

In an example, the wireless device may initiate/trigger the first BWP switching in response to receiving an RRC signaling.

In an example, the RRC signaling may be an RRC reconfiguration of a firstActiveDownlinkBWP-Id (e.g., included in the RRC signaling) for the first cell. In an example, the firstActiveDownlinkBWP-Id may indicate the second BWP. In an example, the firstActiveDownlinkBWP-Id indicating the second BWP may comprise that the firstActiveDownlinkBWP-Id and the second BWP specific index may be the same. In an example, when the wireless device initiates/triggers the first BWP switching in response to receiving the RRC signaling, the wireless device may switch from the first BWP to the second BWP in response to the firstActiveDownlinkBWP-Id indicating the second BWP.

In an example, the RRC signaling may be an RRC reconfiguration of a firstActiveUplinkBWP-Id (e.g., included in the RRC signaling) for the first cell. In an example, the firstActiveUplinkBWP-Id may indicate the second BWP. In an example, the firstActiveUplinkBWP-Id indicating the second BWP may comprise that the firstActiveUplinkBWP-Id and the second BWP specific index may be the same. In an example, when the wireless device initiates/triggers the first BWP switching in response to receiving the RRC signaling, the wireless device may switch from the first BWP to the second BWP in response to the firstActiveUplinkBWP-Id indicating the second BWP.

In an example, the wireless device may complete the first BWP switching at time T1 in FIG. 18. In an example, a first BWP switching delay of the wireless device may be T1-T0 (e.g., symbols, msec, slots). In an example, the first BWP switching delay may be a time duration to complete the first BWP switching. In an example, in the time duration, the wireless device may switch from the first BWP to the second BWP (in the first BWP switching delay). In an example, the first BWP switching delay for the wireless device may be based on at least one of: a first frequency/band of the first BWP, a first subcarrier spacing of the first BWP, a second frequency/band of the second BWP, a second subcarrier spacing of the second BWP. In an example, the first BWP switching delay for the wireless device may be based on an event (e.g., the DCI, the RRC signaling, initiating the random-access procedure, an expiry of the first BWP inactivity timer) triggering/initiating the first BWP switching. In an example, the first BWP switching delay for the wireless device may be based on UE capability.

In an example, the wireless device may operate on a fourth BWP (e.g., UL BWP, DL BWP) of the one or more second BWPs of the second cell. In an example, the operating on the fourth BWP may comprise setting the fourth BWP as a first active BWP of the second cell. In an example, the wireless device may initiate/trigger a second BWP switching for the second cell (at time T2 in FIG. 18). In an example, the second BWP switching may comprise switching from the fourth BWP to a fifth BWP (e.g., UL BWP, DL BWP) of the one or more second BWPs of the second cell. In an example, the switching from the fourth BWP to the fifth BWP may comprise activating the fifth BWP. In an example, the switching from the fourth BWP to the fifth BWP may comprise deactivating the fourth BWP (or the first active BWP of the second cell). In an example, the switching from the fourth BWP to the fifth BWP may comprise setting the fifth BWP as a second active BWP of the second cell.

In an example, the one or more configuration parameters may further comprise BWP specific indices for the one or more second BWPs of the second cell. In an example, each BWP of the one or more second BWPs may be identified by a respective one BWP specific index of the BWP specific indices (e.g., provided by a higher layer parameter bwp-ID in the one or more configuration parameters).

In an example, the fourth BWP may be identified by a fourth BWP specific index. The fifth BWP may be identified by a fifth BWP specific index.

In an example, the wireless device may initiate/trigger the second BWP switching in response to receiving a second DCI (e.g., DCI format 1_1, DCI format 0_1) on a second PDCCH on/for the second cell. In an example, a bandwidth part indicator field may be present/configured in the second DCI. In an example, the second PDCCH may indicate a downlink assignment or an uplink grant. In an example, the bandwidth part indicator field may indicate the fifth BWP. In an example, a value of the bandwidth part indicator field may be equal to the fifth BWP specific index. In an example, the fifth BWP may be different from the fourth BWP. In an example, the fifth BWP being different from the fourth BWP may comprise that the fourth BWP specific index of the fourth BWP may be different from the fifth BWP specific index of the fifth BWP. In an example, in response to the bandwidth part indicator field indicating the fifth BWP different from the fourth BWP, the wireless device may switch from the fourth BWP to the fifth BWP. In an example, the wireless device may set the fifth BWP as the second active BWP of the second cell.

In an example, the fourth BWP may be a first DL BWP of the one or more second DL BWPs and the fifth BWP may be a second DL BWP of the one or more second DL BWPs.

In an example, the fourth BWP may be a first UL BWP of the one or more second UL BWPs and the fifth BWP may be a second UL BWP of the one or more second UL BWPs.

In an example, the setting the fifth BWP as the second active BWP of the second cell may comprise activating the fifth BWP and deactivating the first active BWP (e.g., the fourth BWP) of the second cell.

In an example, the base station may configure the wireless device with a second BWP inactivity timer for the second cell. In an example, the second BWP inactivity timer may expire. In an example, the wireless device may initiate/trigger the second BWP switching in response to the second BWP inactivity timer expiring.

In an example, the fifth BWP may a default BWP (e.g., default downlink BWP) of the second cell. In an example, the fifth BWP being the default BWP may comprise that the fifth BWP may be indicated by a default DL BWP ID (e.g., via one or more configuration parameters including defaultDownlinkBWP-Id parameter) for the second cell. In an example, the fifth BWP being indicated by the default DL BWP ID may comprise that the fifth BWP specific index and the default DL BWP ID may be the same. In an example, the fourth BWP may be different from the fifth BWP. In an example, the fourth BWP specific index and the default DL BWP ID may be different. In an example, when the wireless device initiates/triggers the second BWP switching in response to the second BWP inactivity timer expiring, the wireless device may switch from the fourth BWP to the fifth BWP in response to the fifth BWP being the default BWP of the second cell.

In an example, the base station may not configure the wireless device with a default DL BWP ID (e.g., via one or more configuration parameters including defaultDownlinkBWP-Id parameter) for the second cell. In an example, the fifth BWP may be an initial BWP (e.g., initial downlink BWP) of the second cell. In an example, the fifth BWP being the initial BWP may comprise that the fifth BWP may be indicated by a higher layer parameter initial downlink BWP (e.g., via the one or more configuration parameters including initialDownlinkBWP parameter) for the second cell. In an example, the fourth BWP may be different from the fifth BWP. In an example, the fourth BWP may be different from the initial BWP. In an example, when the wireless device initiates/triggers the second BWP switching in response to the second BWP inactivity timer expiring and when the base station does not configure the default DL BWP ID for the second cell, the wireless device may switch from the fourth BWP to the fifth BWP in response to the fifth BWP being the initial BWP of the second cell.

In an example, the wireless device may initiate a second random-access procedure (e.g., contention-based random-access procedure, contention-free random-access procedure) for the second cell. In an example, when the wireless device initiates the second random-access procedure, the fourth BWP may be a first active DL BWP of the second cell. In an example, when the wireless device initiates the random-access procedure, a sixth BWP of the one or more second UL BWPs of the second cell may be a first active UL BWP of the second cell.

In an example, the sixth BWP may be identified by a sixth BWP specific index (e.g., bwp-Id configured by the one or more configuration parameters). In an example, the sixth BWP specific index and the fourth BWP specific index of the fourth BWP may be different. In an example, the fifth BWP specific index of the fifth BWP and the sixth BWP specific index may be the same. In an example, the second cell may be a SpCell (e.g., PCell). In an example, when the wireless device initiates the second random-access procedure for the second cell, in response to the sixth BWP specific index being different from the fourth BWP specific index, the wireless device may initiate/trigger the second BWP switching. In an example, the initiating/triggering the second BWP switching may comprise that the wireless device may switch from the fourth BWP to the fifth BWP in response to the fifth BWP specific index and the sixth BWP specific index being the same.

In an example, the wireless device may initiate/trigger the second BWP switching in response to receiving a second RRC signaling.

In an example, the second RRC signaling may be an RRC reconfiguration of a firstActiveDownlinkBWP-Id (e.g., included in the second RRC signaling) for the second cell. In an example, the firstActiveDownlinkBWP-Id may indicate the fifth BWP. In an example, the firstActiveDownlinkBWP-Id indicating the fifth BWP may comprise that the firstActiveDownlinkBWP-Id and the fifth BWP specific index may be the same. In an example, when the wireless device initiates/triggers the second BWP switching in response to receiving the second RRC signaling, the wireless device may switch from the fourth BWP to the fifth BWP in response to the firstActiveDownlinkBWP-Id indicating the fifth BWP.

In an example, the second RRC signaling may be an RRC reconfiguration of a firstActiveUplinkBWP-Id (e.g., included in the second RRC signaling) for the second cell. In an example, the firstActiveUplinkBWP-Id may indicate the fifth BWP. In an example, the firstActiveUplinkBWP-Id indicating the fifth BWP may comprise that the firstActiveUplinkBWP-Id and the fifth BWP specific index may be the same. In an example, when the wireless device initiates/triggers the second BWP switching in response to receiving the second RRC signaling, the wireless device may switch from the fourth BWP to the fifth BWP in response to the firstActiveUplinkBWP-Id indicating the fifth BWP.

In an example, the wireless device may complete the second BWP switching at time T3 in FIG. 18. In an example, a second BWP switching delay of the wireless device may be T3-T2 (e.g., symbols, msec, slots). In an example, the second BWP switching delay may be a second time duration to complete the second BWP switching. In an example, in the second time duration, the wireless device may switch from the fourth BWP to the fifth BWP (in the second BWP switching delay). In an example, the second BWP switching delay for the wireless device may be based on at least one of: a first frequency/band of the fourth BWP, a first subcarrier spacing of the fourth BWP, a second frequency/band of the fifth BWP, a second subcarrier spacing of the fifth BWP. In an example, the second BWP switching delay for the wireless device may be based on an event (e.g., the second DCI, the second RRC signaling, initiating the second random-access procedure, an expiry of the second BWP inactivity timer) triggering/initiating the second BWP switching. In an example, the second BWP switching delay for the wireless device may be based on UE capability.

In an example, the wireless device may determine that the first BWP switching delay of the first cell and the second BWP switching delay of the second cell overlap in a time domain (e.g., between T2 and T1 in FIG. 18). In an example, the time domain may be at least one symbol (e.g., OFDM symbol). In an example, the time domain may be at least one slot. In an example, the time domain may be at least one subframe. In an example, the time domain may be at least one half-subframe.

In an example, the wireless device may determine that the first BWP switching of the first cell and the second BWP switching of the second cell overlap in a time domain (e.g., between T2 and T1 in FIG. 18). In an example, the time domain may be at least one symbol (e.g., OFDM symbol). In an example, the time domain may be at least one slot. In an example, the time domain may be at least one subframe. In an example, the time domain may be at least one half-subframe.

In an example, the wireless device may initiate the first BWP switching of the first cell earlier in time than the second BWP switching of the second cell (e.g., T0<T2 in FIG. 18).

In an example, in response to the determining (the overlapping in the time domain) and the initiating the first BWP switching earlier in time than the second BWP switching, the wireless device may complete the first BWP switching when the wireless device completes the second BWP switching (e.g., T3 in FIG. 18).

In an example, the wireless device may complete the first BWP switching in a first completion time (e.g., time T1 in FIG. 18). In an example, the wireless device may complete the second BWP switching in a second completion time (e.g., time T3 in FIG. 18).

In an example, in response to the determining (the overlapping in the time domain) and the initiating the first BWP switching earlier in time than the second BWP switching, the wireless device may extend the first completion time (e.g., T1 in FIG. 18) of the first BWP switching to the second completion time (e.g., T3 in FIG. 18).

In an example, in response to the determining (the overlapping in the time domain) and the initiating the first BWP switching earlier in time than the second BWP switching, the wireless device may extend the first BWP switching delay of the first BWP switching by an extended first BWP switching delay (e.g., Extended first BWP switching delay in FIG. 18). In FIG. 18, the extended first BWP switching delay may comprise a time difference between the second completion time (e.g., T3 in FIG. 18) and the first completion time (e.g., T1 in FIG. 18).

In an example, the wireless device may process one or more first (RF) settings (e.g., bandwidth, frequency location change) in response to the initiating/triggering the first BWP switching for the first cell. In an example, when the wireless device initiates/triggers the second BWP switching (requiring bandwidth and/or frequency location change) for the second cell, the second BWP switching (e.g., occurring later in time) may trigger reprocessing of the one or more first (RF) settings for an RF setting update. In an example, for the reprocessing of the one or more first (RF) settings for the RF setting update, the wireless device may consider RF settings of the first cell and the second cell (e.g., or all activated cells of the one or more cells). When the first BWP switching of the first cell and the second BWP switching of the second cell overlap in time domain, in response to the reprocessing the one or more first (RF) settings, the wireless device may extend the first BWP switching delay of the first BWP switching by the extended first BWP switching delay In an example, the determining (the overlapping in the time domain) and the initiating the first BWP switching earlier in time than the second BWP switching may result in an extended first BWP switching delay of the first BWP switching.

In an example, when the wireless device initiates/triggers the second BWP switching for the second cell, the wireless device may determine that the first BWP switching of the first cell is ongoing. In an example, a starting time of the second BWP switching (e.g., time T2 in FIG. 18) may fall in the first BWP switching delay of the first BWP switching (e.g., between T0 and T1 in FIG. 18). In response to the starting time of the second BWP switching falling in the first BWP switching delay of the first BWP switching, the wireless device may extend the first completion time (e.g., T1 in FIG. 18) of the first BWP switching to the second completion time (e.g., T3 in FIG. 18). In an example, the extending the first completion time of the first cell may result in a longer switching delay of the first BWP switching (e.g., by an extended first BWP switching delay). In an example, the extending the first completion time may result in an interruption of a data transmission (e.g., uplink, downlink data transmission) for the first cell. In an example, the interruption may comprise missing a downlink data packet (e.g., PDSCH). In an example, the downlink data packet may be scheduled by the DCI triggering the first BWP switching. In an example, the wireless device may not transmit an acknowledgement (ACK) for the downlink data packet in response to the missing the downlink data packet. This would increase the latency of the data transmission. In an example, the interruption may comprise missing a time/frequency resource provided by an uplink grant (provided by the DCI triggering the first BWP switching) to transmit an uplink data packet (PUSCH).

In an example, simultaneous BWP switching (e.g., the first BWP switching, the second BWP switching) across cells (e.g., the first cell, the second cell) may be a significant burden from the UE implementation perspective. Example embodiments enhance existing BWP operation to improve UE implementation for the simultaneous BWP switching across cells or same cell (if multiple active BWPs are supported).

Figure 19:
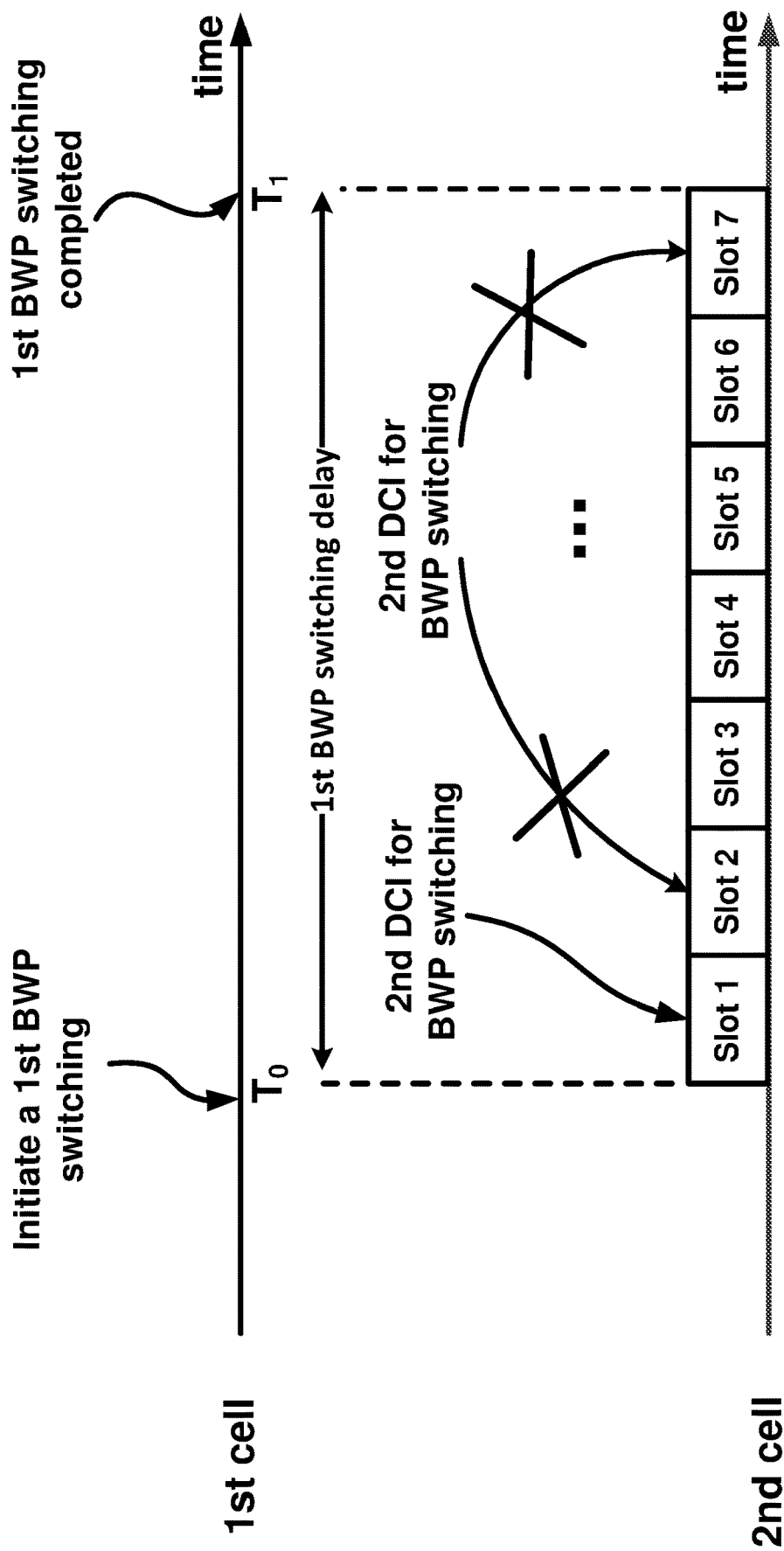
FIG. 19 is an example of a BWP operation as per an aspect of an embodiment of the present disclosure.

FIG. 19 shows an example of a BWP operation as per an aspect of an embodiment of the present disclosure. In an example, the wireless device may initiate/trigger the first BWP switching for the first cell at time T0 in FIG. 19. In an example, the wireless device may complete the first BWP switching at time T1 in FIG. 19. In an example, the first cell and the second cell may operate in frequency range 1 (e.g., FR1, sub-6 GHz). In an example, the first cell and the second cell may operate in frequency range 2 (e.g., FR2, millimeter wave, 24 GHz, 30 GHz, 52 GHz).

In an example, the first cell may operate in FR1 and the second cell may operate in FR2. In an example, the first cell may operate in FR2 and the second cell may operate in FR2.

In an example, the first BWP switching delay (e.g., time duration between T0 and T1 in FIG. 19) of the first BWP switching of the first cell may overlap with a set of slots (e.g., Slot 1, Slot 2, . . . , Slot 7 in FIG. 19) of the second cell. In an example, the set of slots may be determined, by the base station and or by the wireless device, based on a subcarrier spacing (SCS) of the second cell. In an example, the first BWP switching delay may overlap with the set of slots (e.g., Slot 1, Slot 2, . . . , Slot 7 in FIG. 19) for the SCS of the second cell.

In an example, the first BWP switching delay may be a time duration (e.g., time duration between T0 and T1 in FIG. 19). In the time duration, the wireless device may not transmit or receive in the first cell. In an example, the wireless device may initiate/trigger the first BWP switching for an active BWP change of the first cell. In an example, the active BWP change may comprise switching from the first BWP to the second BWP. In an example, the active BWP change may comprise setting the second BWP as the second active BWP of the first cell. In an example, the active BWP change may comprise deactivating the first BWP as the first active BWP of the first cell and activating the second BWP as the second active BWP of the first cell. In an example, in the time duration, the wireless device may not transmit or receive for the active BWP change (e.g., active UL BWP change, active DL BWP change) in the first cell.

In an example, in response to the first BWP switching delay of the first cell overlapping with the set of slots, the wireless device does not expect to detect a second DCI (e.g., DCI format 1_1, DCI format 0_1) for the second cell in a slot. In an example, the slot may be different from a first slot (e.g., Slot 1) of the set of slots. In an example, the slot may be Slot 2, Slot 3, Slot 4, Slot 5, Slot 6 or Slot 7 in FIG. 19. In an example, the first slot may be Slot 1 in FIG. 19. In an example, the second DCI may be a DCI format 1_1 indicating an active DL BWP change for the second cell. In an example, the second DCI may be a DCI format 0_1 indicating an active UL BWP change for the second cell.

In an example, in response to the not expecting to detect the second DCI for the second cell in the slot, the wireless device may not monitor, for the second DCI, a second PDCCH on/for the second cell in the slot.

In an example, when the wireless device receives the second DCI for the second cell in the first slot (e.g., Slot 1 in FIG. 19), the first BWP switching of the first cell and the second BWP switching of the second cell may be aligned. In response to the alignment, the wireless device may initiate/trigger the second BWP switching for the second cell. The second BWP switching may not result in a (long) extended first BWP switching delay.

In an example, the fourth BWP may be a first UL BWP of the one or more second UL BWPs and the fifth BWP may be a second UL BWP of the one or more second UL BWPs. In an example, the fourth BWP may be a first active UL BWP of the second cell. In an example, the active UL BWP change may comprise switching from the fourth BWP to the fifth BWP. In an example, the active UL BWP change may comprise setting the fifth BWP as a second active UL BWP of the second cell. In an example, the active UL BWP change may comprise deactivating the fourth BWP as the first active UL BWP of the second cell and activating the fifth BWP as the second active UL BWP of the second cell.

In an example, the fourth BWP may be a first DL BWP of the one or more second DL BWPs and the fifth BWP may be a second DL BWP of the one or more second DL BWPs. In an example, the fourth BWP may be a first active DL BWP of the second cell. In an example, the active DL BWP change may comprise switching from the fourth BWP to the fifth BWP. In an example, the active DL BWP change may comprise setting the fifth BWP as a second active DL BWP of the second cell. In an example, the active DL BWP change may comprise deactivating the fourth BWP as the first active DL BWP of the second cell and activating the fifth BWP as the second active DL BWP of the second cell.

Figure 20:
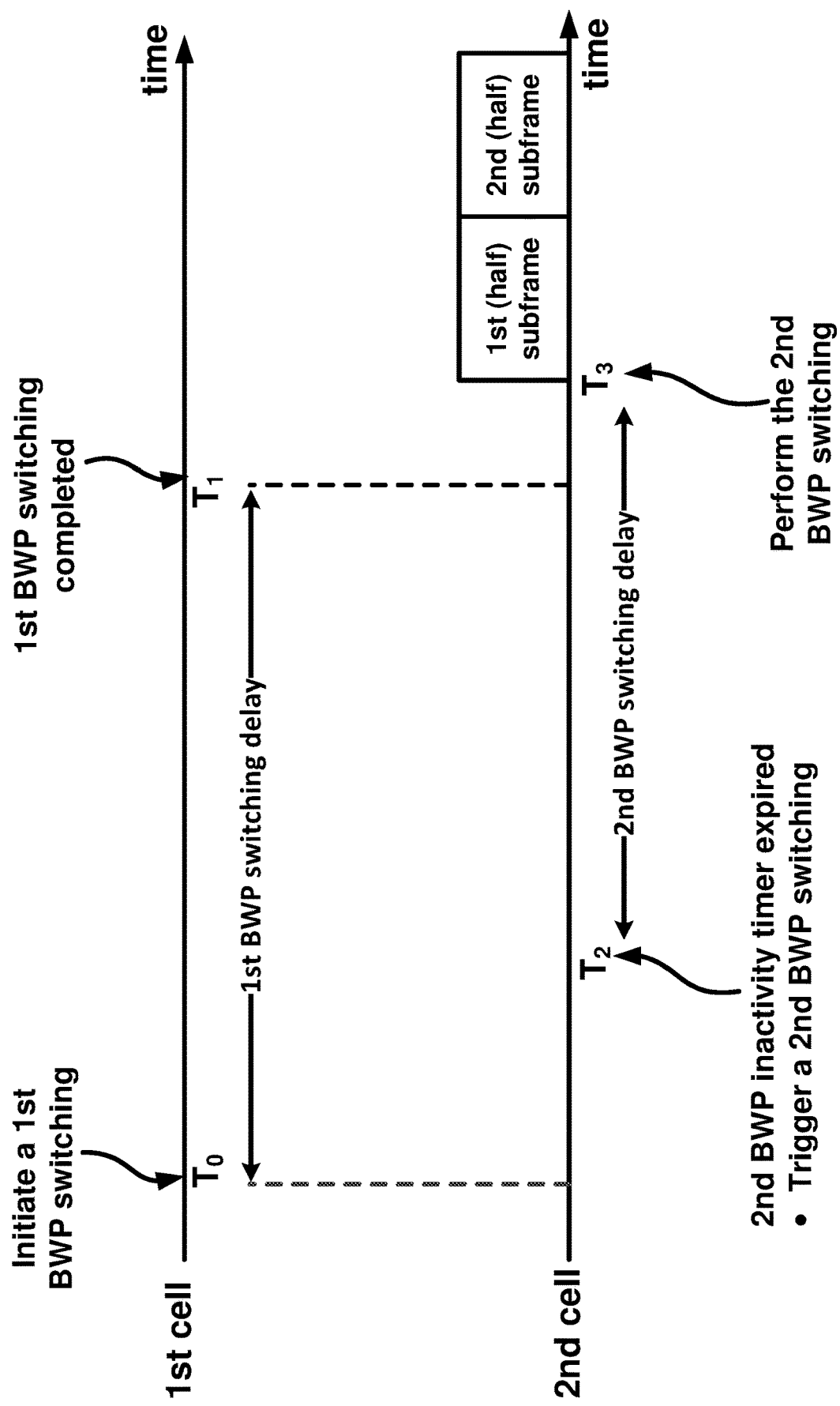
FIG. 20 is an example of a BWP operation as per an aspect of an embodiment of the present disclosure.

FIG. 20 shows an example of a BWP operation as per an aspect of an embodiment of the present disclosure. In an example, the wireless device may initiate/trigger the first BWP switching for the first cell at time T0 in FIG. 20. In an example, the wireless device may complete the first BWP switching at time T1 in FIG. 20.

In an example, the wireless device may complete the first BWP switching in a first completion time (e.g., time T1 in FIG. 20). In an example, for FR1, a first subframe (immediately) after the first completion time may occur in a switching time (e.g., T3 in FIG. 20) of the second cell. In an example, for FR2, a first half a subframe (immediately) after the first completion time may occur in a switching time (e.g., T3 in FIG. 20) of the second cell.

In an example, the second BWP inactivity timer of the second cell may expire at time T2 in FIG. 20. In an example, the wireless device may initiate/trigger the second BWP switching in response to the second BWP inactivity timer expiring. In an example, the wireless device may determine that the second BWP inactivity timer of the second cell expires (e.g., T2 in FIG. 20) within the time duration (e.g., the first BWP switching delay of the first cell between T0 and T1 in FIG. 20). In an example, the second BWP inactivity timer of the second cell may expire (e.g., T2 in FIG. 20) within the time duration (e.g., the first BWP switching delay of the first cell between T0 and T1 in FIG. 20). In an example, in response to the second BWP inactivity timer of the second cell expiring within the time duration, the wireless device may delay the second BWP switching for the second cell till the switching time (e.g., T3 in FIG. 20).

In an example, in response to the delaying the second BWP switching, the wireless device may start switching from the fourth BWP to the fifth BWP (e.g., the default BWP of the second cell, initial downlink BWP of the second cell) at the switching time (e.g., T3 in FIG. 20). In an example, the delaying the second BWP switching may comprise delaying a start time of the second BWP switching from T2 to T3 in FIG. 20.

Figure 21:
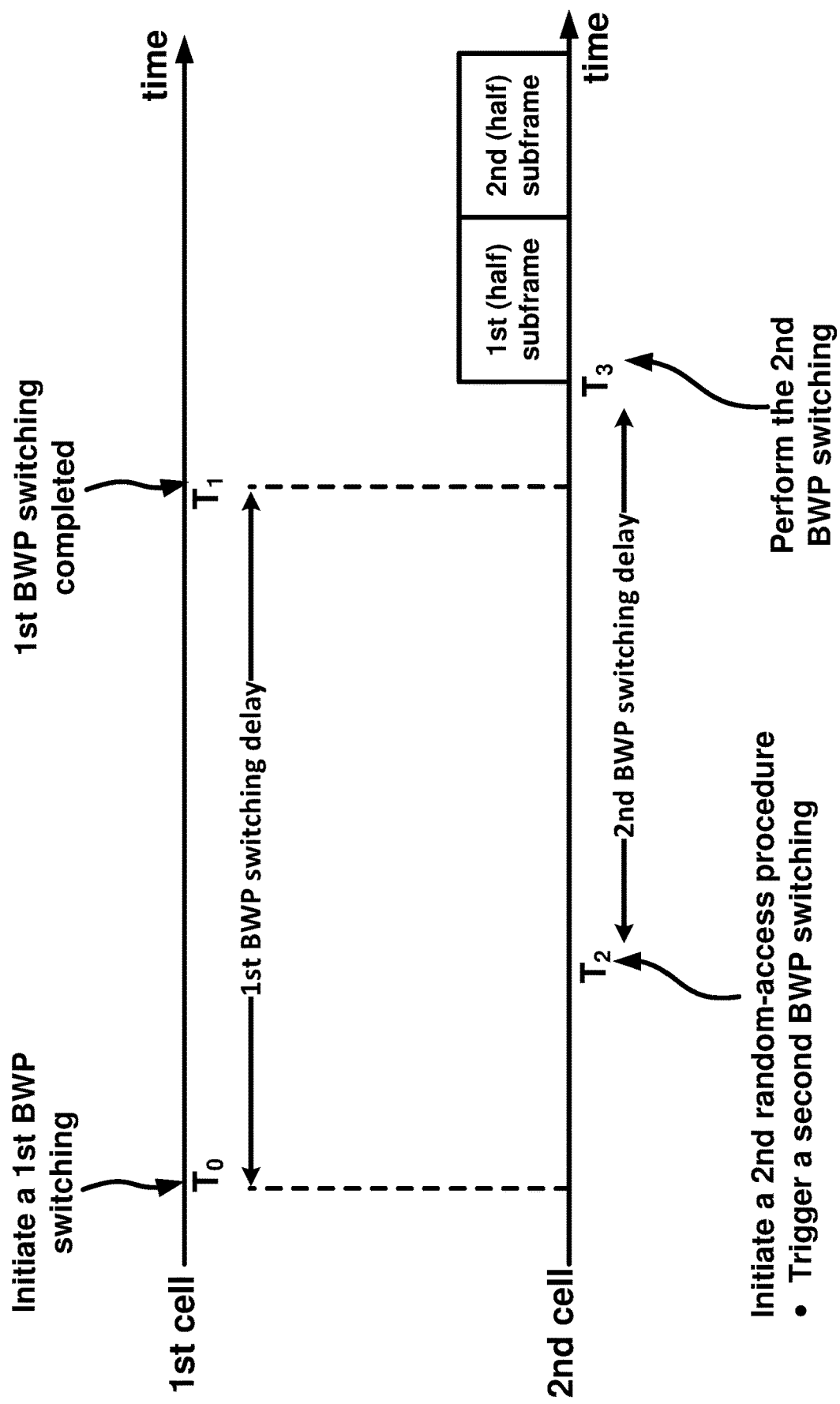
FIG. 21 is an example of a BWP operation as per an aspect of an embodiment of the present disclosure.

FIG. 21 shows an example of a BWP operation as per an aspect of an embodiment of the present disclosure.

In an example, the wireless device may initiate/trigger the first BWP switching for the first cell at time T0 in FIG. 21. In an example, the wireless device may complete the first BWP switching at time T1 in FIG. 21.

In an example, the wireless device may complete the first BWP switching in a first completion time (e.g., time T1 in FIG. 21). In an example, for FR1, a first subframe (immediately) after the first completion time may occur in a switching time (e.g., T3 in FIG. 21) of the second cell. In an example, for FR2, a first half a subframe (immediately) after the first completion time may occur in a switching time (e.g., T3 in FIG. 21) of the second cell.

In an example, the wireless device may initiate the second random-access procedure (e.g., contention-based random-access procedure, contention-free random-access procedure) for the second cell at time T2 in FIG. 21. In an example, the second cell may be a SpCell (e.g., PCell). In an example, the wireless device may initiate/trigger the second BWP switching for the second random-access procedure (e.g., in response to the sixth BWP specific index being different from the fourth BWP specific index). In an example, the wireless device may initiate/trigger the second BWP switching for the second random-access procedure within the time duration (e.g., the first BWP switching delay of the first cell between T0 and T1 in FIG. 21).

In an example, in response to the initiating/triggering the second BWP switching for the second random-access procedure of the second cell within the time duration, the wireless device may delay the second BWP switching for the second cell till the switching time (e.g., T3 in FIG. 21).

In an example, in response to the delaying the second BWP switching, the wireless device may start switching from the fourth BWP to the fifth BWP (e.g., in response to the fifth BWP specific index and the sixth BWP specific index being the same) at the switching time (e.g., T3 in FIG. 21). In an example, the delaying the second BWP switching may comprise delaying a start time of the second BWP switching to the switching time (e.g., from T2 to T3 in FIG. 21).

In an example, in response to the initiating/triggering the second BWP switching for the second random-access procedure of the second cell within the time duration, the wireless device may delay the second BWP switching for the second cell till the first completion time (e.g., T1 in FIG. 21).

In an example, in response to the delaying the second BWP switching, the wireless device may start switching from the fourth BWP to the fifth BWP (e.g., in response to the fifth BWP specific index and the sixth BWP specific index being the same) at the first completion time (e.g., T1 in FIG. 21). In an example, the delaying the second BWP switching may comprise delaying a start time of the second BWP switching to the first completion time (e.g., from T2 to T1 in FIG. 21).

In an example, the wireless device may initiate/trigger the second BWP switching for the second random-access procedure in the first slot (e.g., Slot 1 in FIG. 19) of the set of slots. In an example, the wireless device may initiate the second random-access procedure in the first slot (e.g., Slot 1 in FIG. 19) of the set of slots. In an example, when the wireless device initiates/triggers the second BWP switching for the second random-access procedure in the first slot, the first BWP switching of the first cell and the second BWP switching of the second cell may be aligned. In response to the alignment, the wireless device may perform the second BWP switching for the second cell.

In an example, the wireless device may initiate/trigger the second BWP switching for the second random-access procedure in a slot of the set of slots. In an example, the slot may be different from the first slot (e.g., Slot 1 in FIG. 19) of the set of slots. In an example, the slot may be Slot 2, Slot 3, Slot 4, Slot 5, Slot 6 or Slot 7 in FIG. 19. In an example, in response to the initiating/triggering the second BWP switching for the second random-access procedure in the slot different from the first slot, the wireless device may delay the second BWP switching for the second cell till the switching time (e.g., T3 in FIG. 21). In an example, in response to the initiating/triggering the second BWP switching for the second random-access procedure in the slot different from the first slot, the wireless device may delay the second BWP switching for the second cell till the first completion time (e.g., T1 in FIG. 21).

Figure 22:
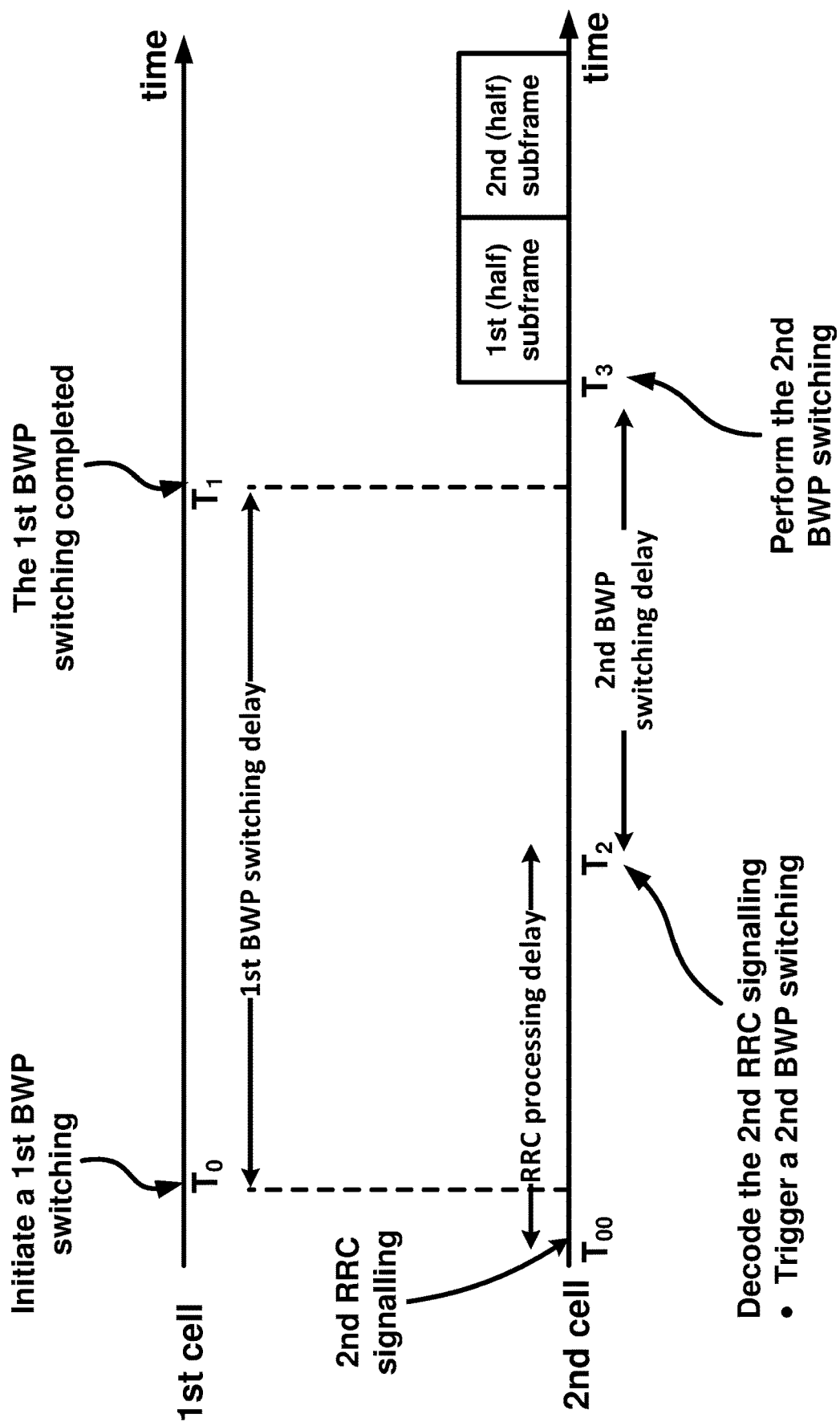
FIG. 22 is an example of a BWP operation as per an aspect of an embodiment of the present disclosure.

FIG. 22 shows an example of a BWP operation as per an aspect of an embodiment of the present disclosure.

Figure 24:
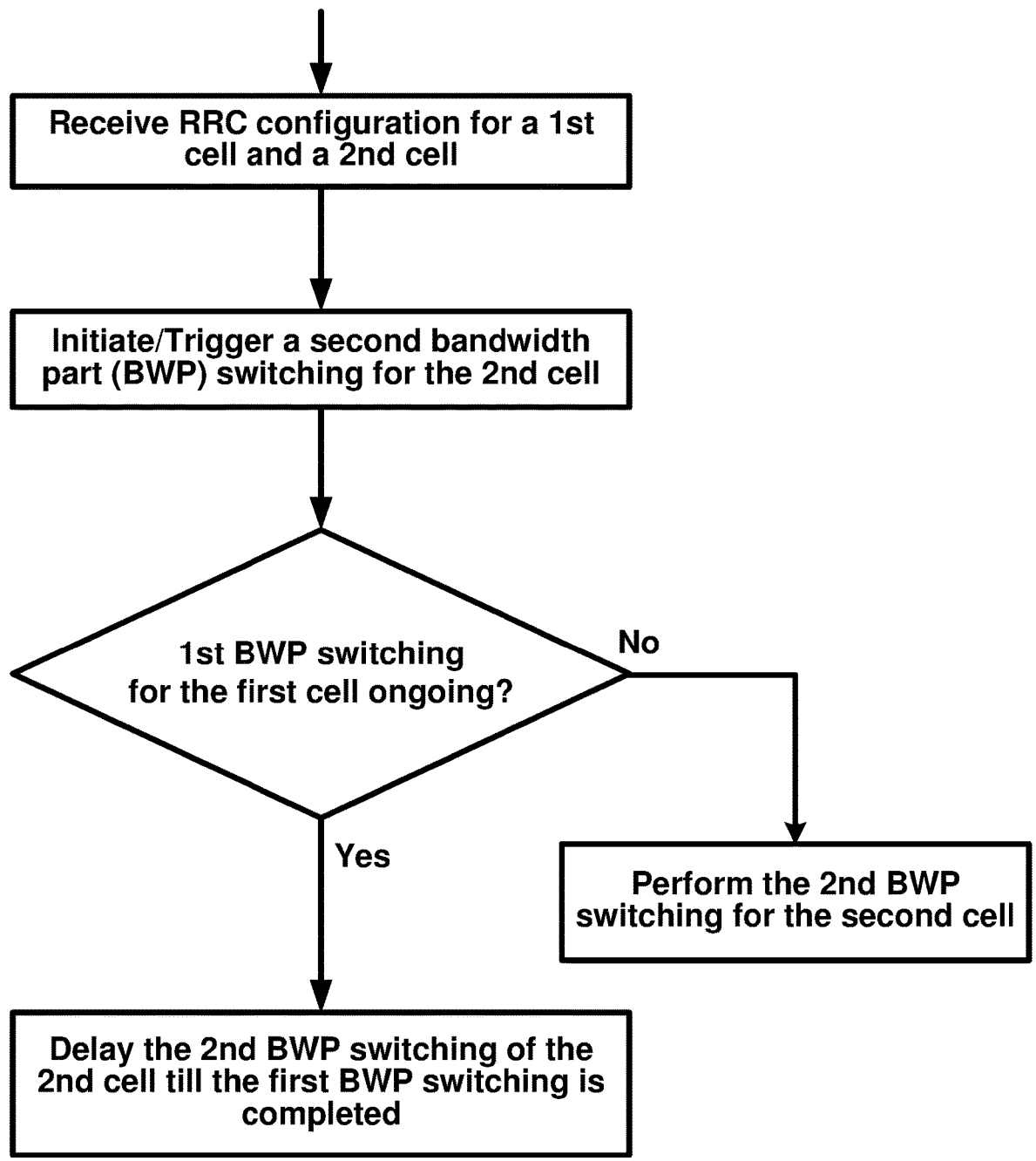
FIG. 24 is an example flowchart of a BWP operation as per an aspect of an embodiment of the present disclosure.

FIG. 24 shows an example flowchart of a BWP operation as per an aspect of embodiments disclosed in FIG. 21 and FIG. 22.

In an example, the wireless device may initiate/trigger the first BWP switching for the first cell at time T0 in FIG. 22. In an example, the wireless device may complete the first BWP switching at time T1 in FIG. 22.

In an example, the wireless device may complete the first BWP switching in a first completion time (e.g., time T1 in FIG. 22). In an example, for FR1, a first subframe (immediately) after the first completion time may occur in a switching time (e.g., T3 in FIG. 22) of the second cell. In an example, for FR2, a first half a subframe (immediately) after the first completion time may occur in a switching time (e.g., T3 in FIG. 22) of the second cell.

In an example, the wireless device may receive the second RRC signaling for the second cell at time T00 in FIG. 22.

In an example, the wireless device may start processing of the second RRC signaling at a first time (e.g., T00 in FIG. 22). In an example, the wireless device may complete the processing of the second RRC signaling at a second time (e.g., T2 in FIG. 22). In an example, a processing delay of the second RRC signaling may be a difference between the second time and the first time (e.g., RRC processing delay in FIG. 22, (T2-T00) in FIG. 22).

In an example, the wireless device may initiate/trigger the second BWP switching in response to receiving the second RRC signaling (e.g., RRC reconfiguration of a firstActiveDownlinkBWP-Id, RRC reconfiguration of a firstActiveUplinkBWP-Id, activation of an SCell, etc.).

In an example, the wireless device may initiate/trigger the second BWP switching, triggered by the second RRC signaling, for the second cell (e.g., T2 in FIG. 22) within the time duration (e.g., the first BWP switching delay of the first cell between T0 and T1 in FIG. 22).

In an example, in response to the initiating/triggering the second BWP switching, triggered by the second RRC signaling, for the second cell within the time duration, the wireless device may delay the second BWP switching for the second cell till the switching time (e.g., T3 in FIG. 22).

In an example, in response to the delaying the second BWP switching, the wireless device may start switching from the fourth BWP to the fifth BWP (e.g., in response to the firstActiveDownlinkBWP-Id indicating the fifth BWP, in response to the firstActiveUplinkBWP-Id indicating the fifth BWP) at the switching time (e.g., T3 in FIG. 22). In an example, the delaying the second BWP switching may comprise delaying a start time of the second BWP switching to the switching time (e.g., from T2 to T3 in FIG. 22).

In an example, in response to the initiating/triggering the second BWP switching, triggered by the second RRC signaling, for the second cell within the time duration, the wireless device may delay the second BWP switching for the second cell till the first completion time (e.g., T1 in FIG. 22).

In an example, in response to the delaying the second BWP switching, the wireless device may start switching from the fourth BWP to the fifth BWP (e.g., in response to the firstActiveDownlinkBWP-Id indicating the fifth BWP, in response to the firstActiveUplinkBWP-Id indicating the fifth BWP) at the first completion time (e.g., T1 in FIG. 22). In an example, the delaying the second BWP switching may comprise delaying a start time of the second BWP switching to the first completion time (e.g., from T2 to T1 in FIG. 22).

In an example, the wireless device may complete the processing of the second RRC signaling for the second cell in the first slot (e.g., Slot 1 in FIG. 19) of the set of slots. In an example, when the wireless device completes the processing of the second RRC signaling in the first slot (e.g., Slot 1 in FIG. 19), the first BWP switching of the first cell and the second BWP switching of the second cell may be aligned. In response to the alignment, the wireless device may perform the second BWP switching for the second cell.

In an example, the wireless device may initiate/trigger the second BWP switching triggered by the second RRC signaling in the first slot (e.g., Slot 1 in FIG. 19) of the set of slots. In an example, when the wireless device performs the second BWP switching triggered by the second RRC signaling in the first slot (e.g., Slot 1 in FIG. 19), the first BWP switching of the first cell and the second BWP switching of the second cell may be aligned. In response to the alignment, the wireless device may perform the second BWP switching for the second cell.

In an example, the wireless device may complete the processing of the second RRC signaling in a slot of the set of slots. In an example, the slot may be different from the first slot (e.g., Slot 1) of the set of slots. In an example, the slot may be Slot 2, Slot 3, Slot 4, Slot 5, Slot 6 or Slot 7 in FIG. 19. In an example, in response to the completing the processing of the second RRC signaling in the slot different from the first slot, the wireless device may delay the second BWP switching for the second cell till the switching time (e.g., T3 in FIG. 22). In an example, in response to the completing the processing of the second RRC signaling in the slot different from the first slot, the wireless device may delay the second BWP switching for the second cell till the first completion time (e.g., T1 in FIG. 22).

In an example, the wireless device may initiate/trigger the second BWP switching triggered by the second RRC signaling in a slot of the set of slots. In an example, the slot may be different from the first slot (e.g., Slot 1) of the set of slots. In an example, the slot may be Slot 2, Slot 3, Slot 4, Slot 5, Slot 6 or Slot 7 in FIG. 19. In an example, in response to the initiating/triggering the second BWP switching triggered by the second RRC signaling in the slot different from the first slot, the wireless device may delay the second BWP switching for the second cell till the switching time (e.g., T3 in FIG. 22). In an example, in response to the initiating/triggering the second BWP switching triggered by the second RRC signaling in the slot different from the first slot, the wireless device may delay the second BWP switching for the second cell till the first completion time (e.g., T1 in FIG. 22).

Figure 23:
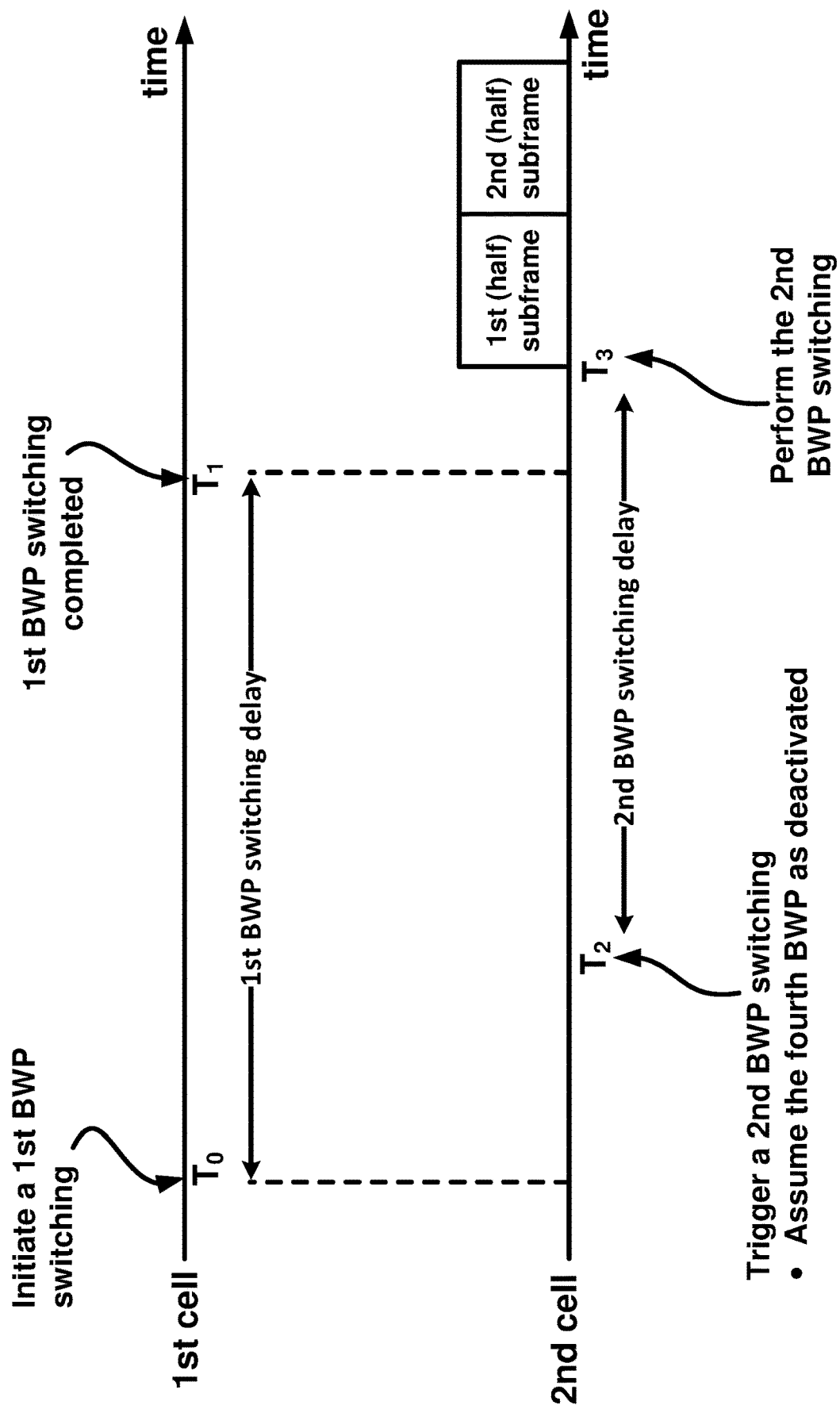
FIG. 23 is an example of a BWP operation as per an aspect of an embodiment of the present disclosure.
Figure 25:
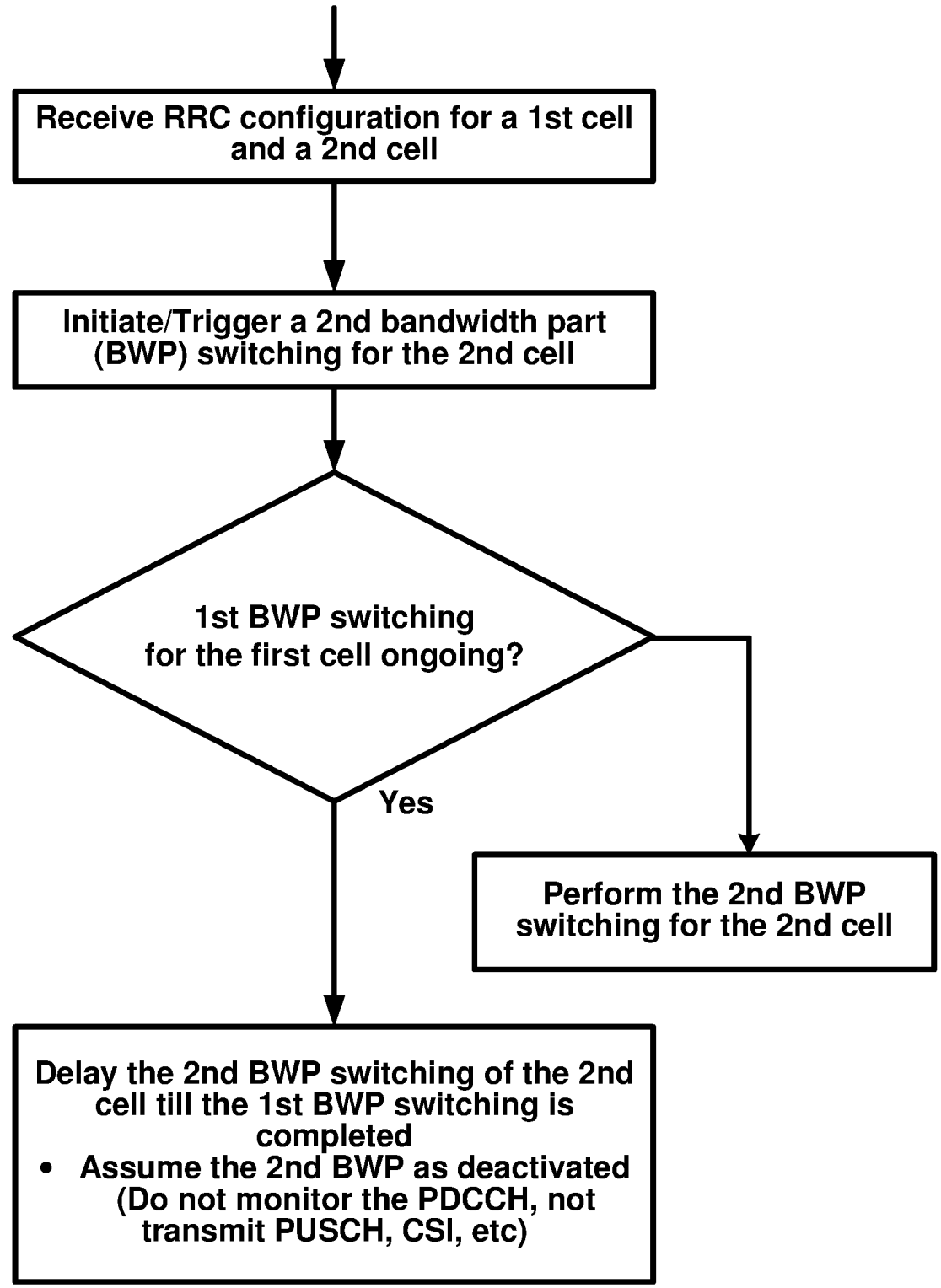
FIG. 25 is an example flowchart of a BWP operation as per an aspect of an embodiment of the present disclosure.

FIG. 23 shows an example of a BWP operation as per an aspect of an embodiment of the present disclosure. FIG. 25 shows an example flowchart of a BWP operation as per an aspect of an embodiment disclosed in FIG. 23.

In an example, the wireless device may initiate/trigger the first BWP switching for the first cell at time T0 in FIG. 23. In an example, the wireless device may complete the first BWP switching at time T1 in FIG. 23.

In an example, the wireless device may complete the first BWP switching in a first completion time (e.g., time T1 in FIG. 23). In an example, for FR1, a first subframe (immediately) after the first completion time may occur in a switching time (e.g., T3 in FIG. 23) of the second cell. In an example, for FR2, a first half a subframe (immediately) after the first completion time may occur in a switching time (e.g., T3 in FIG. 23) of the second cell.

In an example, the wireless device may initiate/trigger the second BWP switching for the second cell at time T2 in FIG. 23. In an example, the second BWP switching may be triggered in response to receiving the second RRC signaling. In an example, the second BWP switching may be triggered in response to initiating the second random-access procedure. In an example, the second BWP switching may be triggered in response to the second BWP inactivity timer expiring. In an example, the second BWP switching may be triggered in response to the receiving the second DCI.

In an example, the wireless device may delay the second BWP switching for the second cell till the first completion time (e.g., T1 in FIG. 23). In an example, in response to the delaying the second BWP switching, the wireless device may start switching from the fourth BWP to the fifth BWP at the first completion time.

In an example, the wireless device may delay the second BWP switching for the second cell till the switching time (e.g., T3 in FIG. 23). In an example, in response to the delaying the second BWP switching, the wireless device may start switching from the fourth BWP to the fifth BWP at the switching time.

In an example, in response to the delaying the second BWP switching (e.g., at time T2 in FIG. 23), the wireless device may assume the fourth BWP (e.g., the first active BWP of the second cell) of the second cell as deactivated.

In an example, assuming the fourth BWP of the second cell as deactivated may comprise not performing at least one of: transmitting on UL-SCH on the fourth BWP; transmitting on RACH on the fourth BWP; monitoring a PDCCH on the fourth BWP; transmitting PUCCH on the fourth BWP; reporting CSI for the fourth BWP; transmitting SRS on the fourth BWP, receiving DL-SCH on the fourth BWP. In an example, assuming the fourth BWP as deactivated may comprise clearing one or more configured downlink assignments and/or one or more configured uplink grants of configured grant Type 2 on the fourth BWP. In an example, assuming the fourth BWP as deactivated may comprise suspending one or more configured uplink grants of configured Type 1 on the fourth BWP.

In an example, assuming the fourth BWP as deactivated may comprise stopping at least one of: transmitting on UL-SCH on the fourth BWP; transmitting on RACH on the fourth BWP; monitoring a PDCCH on the fourth BWP; transmitting PUCCH on the fourth BWP; reporting CSI for the fourth BWP; transmitting SRS on the fourth BWP, receiving DL-SCH on the fourth BWP.

In an example, the wireless device may determine delaying the second BWP switching for the second cell at a first time (e.g., at time T2 in FIG. 23). In an example, in response to the delaying the second BWP switching, the wireless device may start switching from the fourth BWP to the fifth BWP at a second time. In an example, the second time may be the switching time (e.g., T3 in FIG. 23). In an example, the second time may be the first completion time (e.g., T1 in FIG. 23). In an example, a second time duration may comprise a time duration (e.g., Second BWP switching delay in FIG. 23) between the second time and the first time (e.g., between T3 and T2 in FIG. 23 or between T1 and T2 in FIG. 23). In an example, when the wireless device determines delaying the second BWP switching, the wireless device may delay the second BWP switching by the second time duration (e.g., Second BWP switching delay in FIG. 23).

In an example, the wireless device may receive a PDCCH, on/for the fourth BWP (e.g., the first active DL BWP) of the second cell, in the second time duration. In an example, the PDCCH may indicate a downlink assignment or an uplink grant. In an example, the PDCCH may be addressed to C-RNTI. In an example, the PDCCH may be addressed to CS-RNTI. In an example, in response to the receiving the PDCCH, on/for the fourth BWP of the second cell, in the second time duration, the wireless device may not start or restart the second BWP inactivity timer of the second cell. In an example, the wireless device may receive the PDCCH when there is no ongoing random-access procedure associated with the second cell.

In an example, the wireless device may transmit a first MAC PDU in a configured uplink assignment, on the fourth BWP (e.g., the first active DL BWP) of the second cell, in the second time duration. In an example, in response to the transmitting the first MAC PDU, on the fourth BWP of the second cell, in the second time duration, the wireless device may not start or restart the second BWP inactivity timer of the second cell. In an example, the wireless device may transmit the first MAC PDU when there is no ongoing random-access procedure associated with the second cell.

In an example, the wireless device may receive a second MAC PDU in a configured downlink assignment, on the fourth BWP (e.g., the first active DL BWP) of the second cell, in the second time duration. In an example, in response to the receiving the second MAC PDU, on the fourth BWP of the second cell, in the second time duration, the wireless device may not start or restart the second BWP inactivity timer of the second cell. In an example, the wireless device may receive the second MAC PDU when there is no ongoing random-access procedure associated with the second cell.

Figure 26:
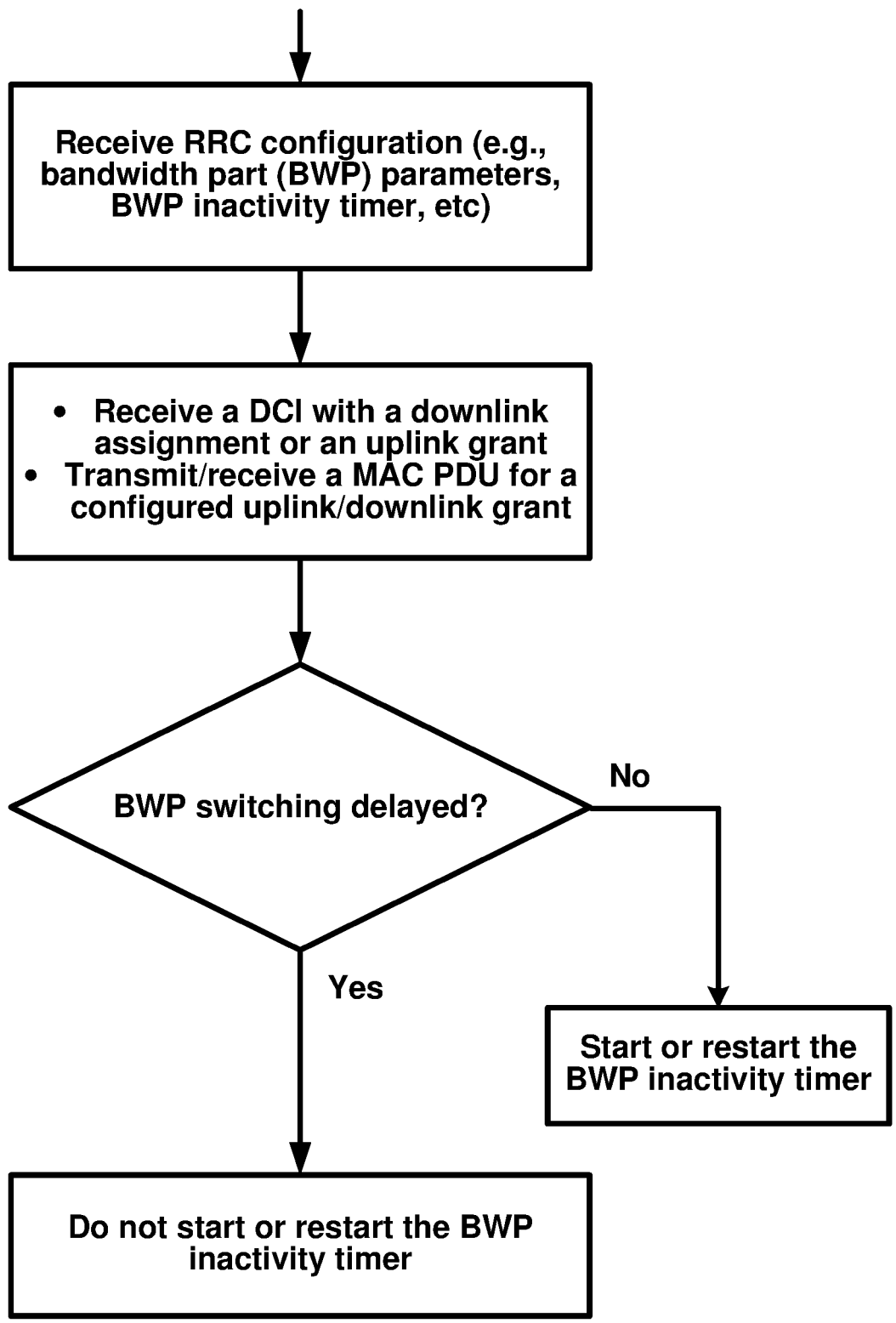
FIG. 26 is an example flowchart of a BWP operation as per an aspect of an embodiment of the present disclosure.

FIG. 26 shows an example flowchart of a BWP operation as per an aspect of an embodiment of the present disclosure, where the wireless device does not start or restart the second BWP inactivity timer.

In an example, in response to the receiving the PDCCH, on/for the fourth BWP of the second cell, in the second time duration, the wireless device may start or restart the second BWP inactivity timer of the second cell. In an example, in response to the starting or the restarting the second BWP inactivity timer, the wireless device may cancel the delaying the second BWP switching for the second cell. In an example, the cancelling the delaying the second BWP switching may comprise not starting switching from the fourth BWP to the fifth BWP at the second time (e.g., the first completion time T1 in FIG. 23, the switching time T3 in FIG. 23). In an example, the cancelling the delaying the second BWP switching may comprise refraining from switching from the fourth BWP to the fifth BWP at the second time (e.g., the first completion time T1 in FIG. 23, the switching time T3 in FIG. 23). In an example, the cancelling the delaying the second BWP switching may comprise, at the second time, the wireless device may keep operating on the fourth BWP (e.g., the first active BWP of the second cell) of the second cell. In an example, the cancelling the delaying the second BWP switching may comprise, at the second time, the wireless device may keep the fourth BWP as the first active BWP of the second cell.

Figure 27:
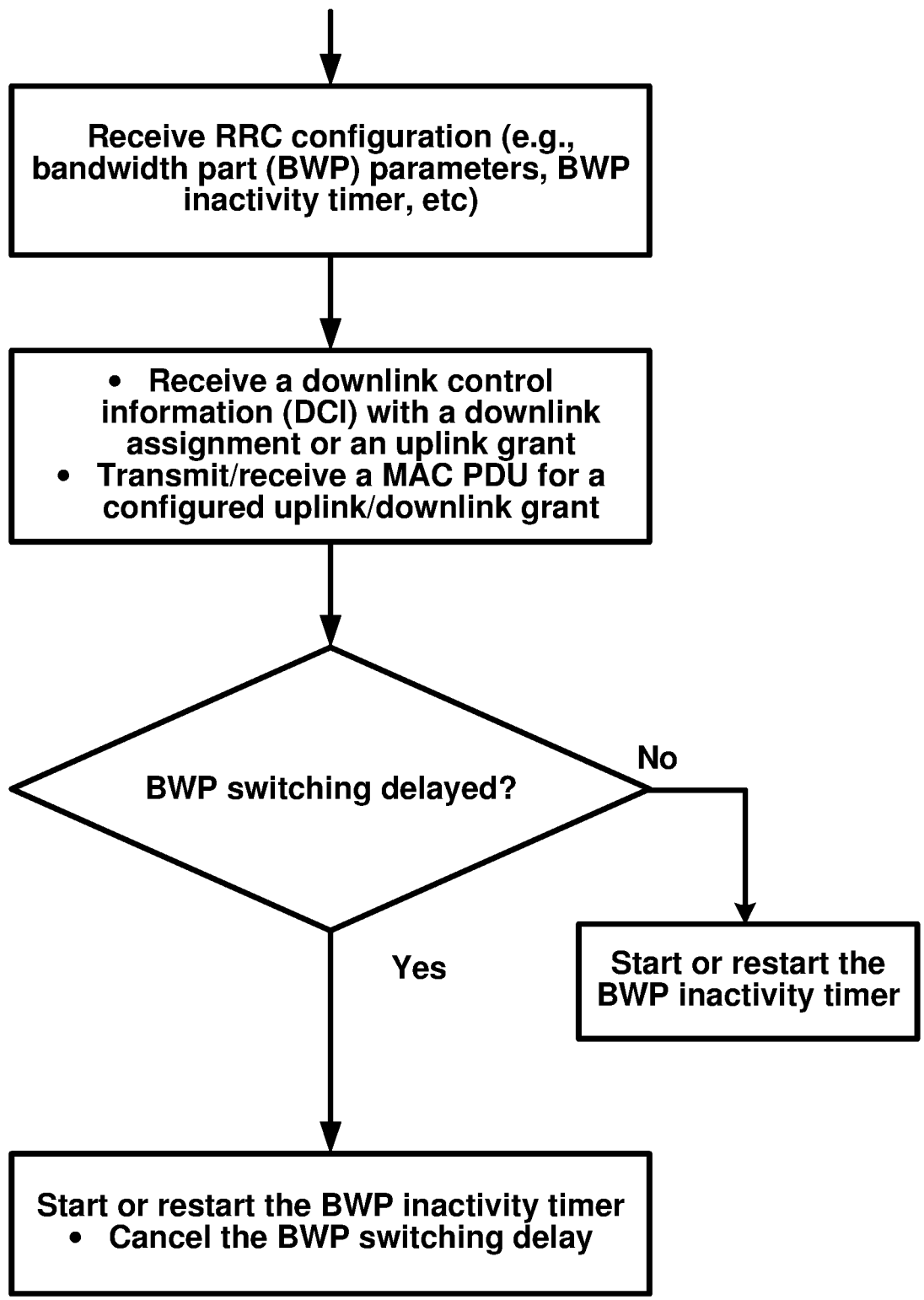
FIG. 27 is an example flowchart of a BWP operation as per an aspect of an embodiment of the present disclosure.

FIG. 27 shows an example flowchart of a BWP operation as per an aspect of an embodiment of the present disclosure, where the wireless device cancels delaying the second BWP switching.

In an example, a wireless device may receive, from a base station, one or more messages. The one or more messages may comprise one or more configuration parameters of a plurality of cells. In an example, the plurality of cells may comprise a first cell and a second cell.

In an example, the wireless device may initiate a second random-access procedure for the second cell. In an example, in response to the initiating the second random access-procedure, the wireless device may initiate/trigger a second BWP switching for a first active BWP (e.g., the fourth BWP) of the second cell. In an example, the first active BWP may be a downlink BWP of the second cell.

In an example, the wireless device may initiate/trigger a first BWP switching of a second active BWP (e.g., the first BWP) of the first cell. In an example, the wireless device may determine that the initiating/triggering the second BWP switching occurs in a time duration (e.g., the first BWP switching delay in FIG. 21) of the first BWP switching.

In an example, the wireless device may delay, in response to the determining, the second BWP switching of the first active BWP until the first BWP switching of the second active BWP is completed.

In an example, a wireless device may receive, from a base station, one or more messages. The one or more messages may comprise one or more configuration parameters of a plurality of cells. In an example, the plurality of cells may comprise a first cell and a second cell.

In an example, the wireless device may receive a second radio resource control (RRC) signaling for the second cell. In an example, the wireless device may start processing of the second RRC signaling in response to the receiving the second RRC signaling. In an example, the second RRC signaling may indicate an active BWP change (e.g., RRC reconfiguration of a firstActiveDownlinkBWP-Id, RRC reconfiguration of a firstActiveUplinkBWP-Id, activation of an SCell, etc.) for the second cell.

In an example, the wireless device may initiate/trigger a second BWP switching of a first active BWP (e.g., the fourth BWP) of the second cell in a slot in response to completing the processing of the second RRC signaling indicating the active BWP change.

In an example, the wireless device may initiate/trigger a first BWP switching of a second active BWP (e.g., the first BWP) of the first cell.

In an example, the wireless device may determine that the initiating/triggering the second BWP switching for the second cell occurs in a time duration (e.g., the first BWP switching delay in FIG. 21) of the first BWP switching of the first cell.

In an example, the wireless device may determine that the slot overlaps with the time duration of the first BWP switching of the first cell.

In an example, the wireless device may delay, in response to the determining, the second BWP switching of the first active BWP of the second cell until the first BWP switching of the second active BWP of the first cell is completed.

In an example, the wireless device may initiate/trigger a first BWP switching for a second active BWP (e.g., the first BWP) of the first cell. In an example, the wireless device may start the first BWP switching in a first time (e.g., time T0 in FIG. 22). In an example, the first time may be a slot, a symbol, a subframe or a frame. In an example, for the first BWP switching, the wireless device may start switching from the first BWP of the first cell to the second BWP of the first cell in the first time. In an example, the wireless device may complete the first BWP switching in a second time (e.g., the first completion time, time T1 in FIG. 22). In an example, the second time may be a second slot, a second symbol, a second subframe or a second frame. In an example, the second time may be the first time plus a first BWP switching delay for the first BWP switching (e.g., T1=T0+First BWP switching delay in FIG. 22).

In an example, in response to determining that the first BWP switching starting in the first time and completing in the second time, the wireless device may not expect to receive a second RRC signaling triggering a second BWP switching for a first active BWP (e.g., the fourth BWP) of the second cell between a starting time and an ending time. In an example, the starting time may be the processing delay plus a second BWP switching delay of the second BWP switching prior/before the first time (e.g., T0-(RRC processing delay+Second BWP switching delay) in FIG. 22). In an example, the ending time may be the processing delay prior/before the second time (e.g., (T1-RRC processing delay) in FIG. 22).

In an example, in response to determining that the first BWP switching starting in the first time and completing in the second time, the base station may not transmit a second RRC signaling triggering a second BWP switching for a first active BWP (e.g., the fourth BWP) of the second cell between the starting time and the ending time. In an example, in response to determining that the first BWP switching starting in the first time and completing in the second time, the base station may transmit the second RRC signaling before the starting time. In an example, in response to determining that the first BWP switching starting in the first time and completing in the second time, the base station may transmit the second RRC signaling after the ending time.

In an example, the one or more configuration parameters may comprise a timer for the second cell. In an example, the timer may be at least one of: drx-HARQ-RTT-TimerDL, drx-HARQ-RTT-TimerUL, drx-RetransmissionTimerDL, drx-RetransmissionTimerUL, configuredGrantTimer.

In an example, in response to the delaying the second BWP switching for the second cell, the wireless device may stop the timer. In an example, the wireless device may restart the timer in response to the starting switching (e.g., from the fourth BWP to the first BWP) after the delay. In an example, the wireless device may restart the timer in the first completion time (e.g., time T1 in FIG. 23). In an example, the wireless device may restart the timer in the switching time (e.g., time T3 in FIG. 23).

In an example, in response to the delaying the second BWP switching for the second cell, the wireless device may update a duration of the timer. In an example, the wireless device may increment the duration of the timer by the second time duration (e.g., Second BWP switching delay between T3 and T2 in FIG. 23).

Figure 28:
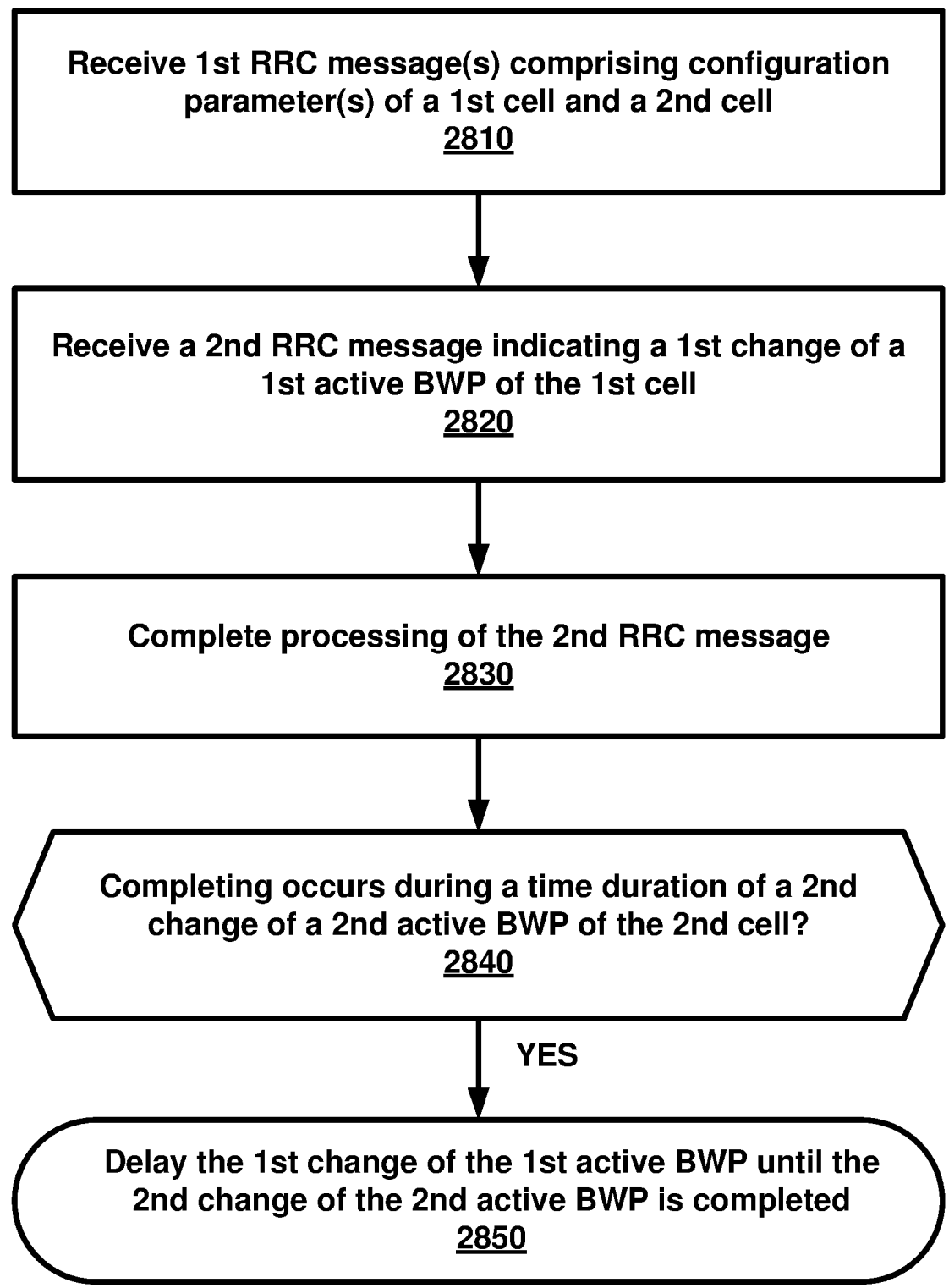
FIG. 28 is a flow diagram of an aspect of an example embodiment of the present disclosure.

FIG. 28 is a flow diagram as per an aspect of an example embodiment of the present disclosure. At 2810, a wireless device may receive one or more first radio resource control (RRC) messages. The one or more first RRC messages may comprise one or more configuration parameters of a first cell and a second cell. At 2820, a second RRC message indicating a first change of a first active bandwidth part (BWP) of the first cell may be received. At 2830, the wireless device may complete processing of the second RRC message. At 2840, a determination may be made that the completing occurs during a time duration of a second change of a second active BWP of the second cell. At 2850, based on the determination, the first change of the first active BWP may be delayed until the second change of the second active BWP is completed.

According to an example embodiment, a wireless device may receive one or more first radio resource control (RRC) messages. The one or more first RRC messages may comprise one or more configuration parameters of a first cell and a second cell. A second RRC message indicating a first change of a first active bandwidth part (BWP) of the first cell may be received. The wireless device may complete processing of the second RRC message. A determination may be made that the completing occurs during a time duration of a second change of a second active BWP of the second cell. Based on the determination, the first change of the first active BWP may be delayed until the second change of the second active BWP is completed.

According to an example embodiment, the wireless device may not receive, for the second change of the second active BWP, in the second cell within the time duration. According to an example embodiment, the wireless device may not transmit, for the second change of the second active BWP, in the second cell within the time duration.

According to an example embodiment, the second change of the second active BWP may be completed in a completion time. According to an example embodiment, the wireless device may start, at the completion time a configured grant timer. According to an example embodiment, the wireless device may start, at the completion time, a drx-HARQ-RTT-TimerDL. According to an example embodiment, the wireless device may start, at the completion time, a drx-HARQ-RTT-TimerUL. According to an example embodiment, the wireless device may start, at the completion time, a drx-RetransmissionTimerDL. According to an example embodiment, the wireless device may start, at the completion time, a drx-RetransmissionTimerUL. According to an example embodiment, the wireless device may increment, based on the delaying, a configured grant timer. According to an example embodiment, the wireless device may increment, based on the delaying, a drx-HARQ-RTT-TimerDL. According to an example embodiment, the wireless device may increment, based on the delaying, a drx-HARQ-RTT-TimerUL. According to an example embodiment, the wireless device may increment, based on the delaying, a drx-RetransmissionTimerDL. According to an example embodiment, the wireless device may increment, based on the delaying, a drx-RetransmissionTimerUL. According to an example embodiment, the incrementing the duration may comprise incrementing the duration by a time value that is a difference between the completion time and a time that the processing of the second RRC message is completed.

According to an example embodiment, the delaying the first change of the first active BWP may comprise starting switching the first active BWP of the first cell to a BWP of the first cell based on the completion time. According to an example embodiment, the second RRC message may indicate the BWP for the first change. According to an example embodiment, the switching the first active BWP to the BWP based on the completion time may comprise switching the first active BWP to the BWP at a first subframe after the completion time. According to an example embodiment, the switching the first active BWP to the BWP based on the completion time may comprise switching the first active BWP to the BWP at a first half subframe after the completion time.

According to an example embodiment, a bandwidth part inactivity timer of the first cell may be started: after the delaying the first change of the first active BWP; and before the completion time of the second change. According to an example embodiment, the first change may be cancelled based on the starting the bandwidth part inactivity timer. According to an example embodiment, the cancelling the first change may comprise not starting switching of the first active BWP to the BWP based on the completion time. According to an example embodiment the cancelling the first change may comprise refraining from switching the first active BWP to the BWP. According to an example embodiment, the cancelling the first change may comprise keeping the first active BWP as an active BWP of the first cell.

According to an example embodiment, the determining that the completing occurs during the time duration may comprise determining that the completing occurs in a time slot different from a first slot of a set of slots of the first cell that overlaps with the time duration.

According to an example embodiment, the first active BWP may be deactivated based on the delaying.

According to an example embodiment, the wireless device may not transmit, via the first active BWP based on the delaying the first change of the first active BWP, an uplink shared channel. According to an example embodiment, the wireless device may not transmit, via the first active BWP based on the delaying the first change of the first active BWP, a random-access channel. According to an example embodiment, the wireless device may not transmit, via the first active BWP based on the delaying the first change of the first active BWP, an uplink control channel. According to an example embodiment, the wireless device may not transmit, via the first active BWP based on the delaying the first change of the first active BWP, a channel state information report. According to an example embodiment, the wireless device may not transmit, via the first active BWP based on the delaying the first change of the first active BWP, a sounding reference signal.

According to an example embodiment, the wireless device may not monitor a downlink control channel via the first active BWP based on the delaying the first change of the first active BWP. According to an example embodiment, the wireless device may not receive a downlink shared channel via the first active BWP based on the delaying the first change of the first active BWP.

According to an example embodiment, the wireless device, based on the delaying the first change of the first active BWP, may not start a bandwidth part inactivity timer of the first cell until the second change of the second active BWP is completed.

According to an example embodiment, the wireless device may stop, based on the delaying the first change of the first active BWP, a configured grant timer. According to an example embodiment, the wireless device may stop, based on the delaying the first change of the first active BWP, a drx-HARQ-RTT-TimerDL. According to an example embodiment, the wireless device may stop, based on the delaying the first change of the first active BWP, a drx-HARQ-RTT-TimerUL. According to an example embodiment, the wireless device may stop, based on the delaying the first change of the first active BWP, a drx-RetransmissionTimerDL. According to an example embodiment, the wireless device may stop, based on the delaying the first change of the first active BWP, a drx-RetransmissionTimerUL.

According to an example embodiment, a wireless device may receive one or more messages. The one or more messages may comprise one or more configuration parameters of a first cell and a second cell. A radio resource control (RRC) message indicating a first change of a first active bandwidth part (BWP) of the first cell may be received. The wireless device may complete processing of the RRC message. A determination may be made that the completing occurs in a time slot different from a first slot of a set of slots of the first cell that overlaps with a time duration of a second change of a second active BWP of the second cell. Based on the determination, the first change of the first active BWP may be delayed until the second change of the second active BWP is completed.

According to an example embodiment, a wireless device may receive one or more messages. The one or more messages may comprise one or more configuration parameters of a first cell. The one or more messages may comprise one or more configuration parameters of a second cell. A first change of a first active bandwidth part (BWP) of the first cell may be triggered. A determination may be made that the triggering the first change occurs in a time duration of a second change of a second active BWP of the second cell. Based on the determination, a configured transmission of a transport block via the first active BWP may be stopped until the second change of the second active BWP is completed.

According to an example embodiment, the transport block may be a medium access control protocol data unit (MAC PDU) in a configured uplink grant.

According to an example embodiment, a base station may determine that a first change of a first active bandwidth part (BWP) of a first cell: starts in a first time slot; and completes in the first time slot plus a first delay for the first change. According to an example embodiment, based on the determining, the base station may transmit a radio resource control (RRC) message indicating a second change of a second active BWP of a second cell a second time delay prior the first time slot. The second time delay may be a processing delay of the RRC message plus a second delay for the second change. According to an example embodiment, based on the determining, the base station may transmit a radio resource control (RRC) message indicating a second change of a second active BWP of a second cell after the first time slot plus the first delay minus a processing delay of the RRC message.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device, one or more first radio resource control (RRC) messages comprising one or more configuration parameters of a first cell and a second cell;
   receiving a second RRC message indicating a first change of a first active bandwidth part (BWP) of the first cell;
   completing processing of the second RRC message;
   determining that the completing occurs during a time duration of a second change of a second active BWP of the second cell; and
   delaying, based on the determining, the first change of the first active BWP until the second change of the second active BWP is completed.

2. The method of claim 1, further comprising not receiving and not transmitting, for the second change of the second active BWP, in the second cell within the time duration.

3. The method of claim 1, further comprising completing the second change of the second active BWP in a completion time.

4. The method of claim 3, further comprising starting, at the completion time, at least one of:
   a configured grant timer;
   a drx-HARQ-RTT-TimerDL;
   drx-HARQ-RTT-TimerUL;
   drx-RetransmissionTimerDL; and
   drx-RetransmissionTimerUL.

5. The method of claim 3, further comprising incrementing, based on the delaying, a duration of at least one of:
   a configured grant timer;
   a drx-HARQ-RTT-TimerDL;
   drx-HARQ-RTT-TimerUL;
   drx-RetransmissionTimerDL; and
   drx-RetransmissionTimerUL.

6. The method of claim 5, wherein the incrementing the duration comprises incrementing the duration by a time value that is a difference between the completion time and a time that the processing of the second RRC message is completed.

7. The method of claim 3, wherein the delaying comprises starting switching the first active BWP of the first cell to a BWP of the first cell based on the completion time.

8. The method of claim 7, wherein the switching the first active BWP to the BWP based on the completion time comprises switching the first active BWP to the BWP at a first subframe after the completion time.

9. The method of claim 7, wherein the switching the first active BWP to the BWP based on the completion time comprises switching the first active BWP to the BWP at a first half subframe after the completion time.

10. The method of claim 3, further comprising starting a bandwidth part inactivity timer of the first cell:
    after the delaying the first change; and
    before the completion time of the second change.

11. The method of claim 10, further comprising cancelling the first change based on the starting the bandwidth part inactivity timer.

12. The method of claim 11, wherein the cancelling the first change comprises not starting switching of the first active BWP to the BWP based on the completion time.

13. The method of claim 1, wherein the determining that the completing occurs during the time duration comprises determining that the completing occurs in a time slot different from a first slot of a set of slots of the first cell that overlaps with the time duration.

14. The method of claim 1, further comprising deactivating the first active BWP based on the delaying.

15. The method of claim 1, further comprising not transmitting, via the first active BWP based on the delaying, at least one of the following:
    an uplink shared channel;
    a random-access channel;
    an uplink control channel;
    a channel state information report; and
    a sounding reference signal.

16. The method of claim 1, further comprising at least one of the following:
    not monitoring a downlink control channel via the first active BWP based on the delaying; and
    not receiving a downlink shared channel via the first active BWP based on the delaying.

17. The method of claim 1, further comprising based on the delaying, not starting a bandwidth part inactivity timer of the first cell until the second change of the second active BWP is completed.

18. The method of claim 1, further comprising stopping, based on the delaying, at least one of:
    a configured grant timer;
    a drx-HARQ-RTT-TimerDL;
    drx-HARQ-RTT-TimerUL;
    drx-RetransmissionTimerDL; and
    drx-RetransmissionTimerUL.

19. A wireless device comprising:
    one or more processors; and
    memory storing instructions that, when executed by the one or more processors, cause the wireless device to:
       receive one or more first radio resource control (RRC) messages comprising one or more configuration parameters of a first cell and a second cell;
       receive a second RRC message indicating a first change of a first active bandwidth part (BWP) of the first cell;
       complete processing of the second RRC message;
       determine that the completion occurs during a time duration of a second change of a second active BWP of the second cell; and
       delay, based on the determination, the first change of the first active BWP until the second change of the second active BWP is completed.

20. A system comprising:
a base station comprising:
  one or more processors; and
  memory storing instructions that, when executed by the one or more processors of the base station, cause the base station to:
    transmit one or more first radio resource control (RRC) messages comprising one or more configuration parameters of a first cell and a second cell;
    transmit a second RRC message indicating a first change of a first active bandwidth part (BWP) of the first cell;
a wireless device comprising:
  one or more processors; and
  memory storing instructions that, when executed by the one or more processors of the wireless device, cause the wireless device to:
    receive the one or more first RRC messages;
    receive the second RRC message;
    complete processing of the second RRC message;
    determine that the completion occurs during a time duration of a second change of a second active BWP of the second cell; and
    delay, based on the determination, the first change of the first active BWP until the second change of the second active BWP is completed.

* * * * *